(12) United States Patent
Akimoto et al.

(10) Patent No.: US 12,498,586 B2
(45) Date of Patent: *Dec. 16, 2025

(54) IMAGE DISPLAY DEVICE

(71) Applicant: NICHIA CORPORATION, Anan (JP)

(72) Inventors: Hajime Akimoto, Anan (JP); Hiroshi Miyairi, Yokohama (JP); Kazuhiro Miyagi, Anan (JP); Masakazu Kotani, Anan (JP); Keiko Ono, Anan (JP); Atsushi Kojima, Tokushima (JP)

(73) Assignee: NICHIA CORPORATION, Anan (JP)

( * ) Notice: Subject to any disclaimer, the term of this patent is extended or adjusted under 35 U.S.C. 154(b) by 99 days.

This patent is subject to a terminal disclaimer.

(21) Appl. No.: 18/390,715

(22) Filed: Dec. 20, 2023

(65) Prior Publication Data

US 2024/0210725 A1 Jun. 27, 2024

(30) Foreign Application Priority Data

Dec. 22, 2022 (JP) .................. 2022-205376

(51) Int. Cl.
| | |
|---|---|
| *G02B 30/56* | (2020.01) |
| *G06F 3/01* | (2006.01) |
| *G06F 3/042* | (2006.01) |
| *G06V 10/74* | (2022.01) |
| *G06V 40/10* | (2022.01) |

(Continued)

(52) U.S. Cl.
CPC ............ *G02B 30/56* (2020.01); *G06F 3/013* (2013.01); *G06F 3/042* (2013.01); *G06V 10/74* (2022.01); *G06V 40/10* (2022.01); *G09G 3/003* (2013.01); *G02B 5/124* (2013.01); *G02B 30/60* (2020.01); *G09G 2354/00* (2013.01)

(58) Field of Classification Search
CPC ............ G06F 3/13; G06F 3/042; G02B 30/56; G02B 5/124; G02B 30/60; G06V 10/74; G06V 40/10; G09G 3/003; G09G 2354/00

See application file for complete search history.

(56) References Cited

U.S. PATENT DOCUMENTS

| | | |
|---|---|---|
| 11,892,572 B1 | 2/2024 | Dunphy et al. |
| 12,025,798 B1 | 7/2024 | Dehkordi et al. |

(Continued)

FOREIGN PATENT DOCUMENTS

| | | |
|---|---|---|
| JP | 2009-042337 A | 2/2009 |
| JP | 2013-238681 A | 11/2013 |

(Continued)

OTHER PUBLICATIONS

Notice of Allowance on U.S. Appl. No. 18/520,041 dated Apr. 9, 2025.

(Continued)

*Primary Examiner* — Adam J Snyder
(74) *Attorney, Agent, or Firm* — Foley & Lardner LLP

(57) ABSTRACT

An image display device includes: a first display device configured to output a first image representing an operation part for an apparatus; an imaging element configured to reflect the first image and to form the first image in mid-air as a mid-air image; a first sensor configured to detect an approach of a detection object to the mid-air image and to output a first signal; and a controller configured to output a second signal to the apparatus based on the first signal.

20 Claims, 34 Drawing Sheets

(51) Int. Cl.
*G09G 3/00* (2006.01)
*G02B 5/124* (2006.01)
*G02B 30/60* (2020.01)

(56) References Cited

U.S. PATENT DOCUMENTS

| | | | |
|---|---|---|---|
| 2010/0110384 A1* | 5/2010 | Maekawa | G06F 3/011 |
| | | | 353/10 |
| 2011/0074657 A1 | 3/2011 | Sugiyama | |
| 2011/0235201 A1 | 9/2011 | Maekawa | |
| 2018/0081058 A1 | 3/2018 | Kalscheur | |
| 2018/0101087 A1 | 4/2018 | Shinohara | |
| 2018/0164596 A1 | 6/2018 | Houzyou et al. | |
| 2018/0203244 A1 | 7/2018 | Hatanaka et al. | |
| 2018/0267216 A1 | 9/2018 | Otsubo | |
| 2019/0196020 A1 | 6/2019 | Aceti et al. | |
| 2020/0290513 A1 | 9/2020 | Karafin et al. | |
| 2021/0103161 A1 | 4/2021 | Daiku | |
| 2021/0379993 A1 | 12/2021 | Xu et al. | |
| 2022/0043277 A1 | 2/2022 | Karafin et al. | |
| 2022/0176869 A1 | 6/2022 | Maruyama | |
| 2023/0128022 A1 | 4/2023 | Weindorf et al. | |
| 2024/0184109 A1 | 6/2024 | Kitahara et al. | |
| 2024/0210683 A1 | 6/2024 | Aruga et al. | |
| 2024/0210684 A1 | 6/2024 | Kitahara et al. | |
| 2024/0253465 A1 | 8/2024 | Shintani et al. | |
| 2024/0427169 A1 | 12/2024 | Daiku | |

FOREIGN PATENT DOCUMENTS

| | | |
|---|---|---|
| JP | 2015-146009 A | 8/2015 |
| JP | 2017-156466 A | 9/2017 |
| JP | 2017-156467 A | 9/2017 |
| JP | 2017-156468 A | 9/2017 |
| WO | WO-2016/199902 A1 | 12/2016 |
| WO | WO-2017/018204 A1 | 2/2017 |
| WO | WO-2017/051598 A1 | 3/2017 |
| WO | WO-2017/146172 A1 | 8/2017 |

OTHER PUBLICATIONS

U.S. Appl. No. 18/390,715, filed Dec. 20, 2023, Akimoto et al.
U.S. Appl. No. 18/392,314, filed Dec. 21, 2023, Hajime Akimoto.
U.S. Appl. No. 18/741,019, filed Jun. 12, 2024, Hajime Akimoto.
U.S. Appl. No. 18/493,167, filed Oct. 24, 2023, Akimoto et al.
U.S. Appl. No. 18/504,237, filed Nov. 8, 2023, Akimoto et al.
U.S. Appl. No. 18/508,974, filed Nov. 14, 2023, Akimoto et al.
U.S. Appl. No. 18/520,041, filed Nov. 27, 2023, Akimoto et al.
U.S. Appl. No. 18/526,318, filed Dec. 1, 2023, Akimoto et al.

* cited by examiner

Press "ON" for turning on the 2nd Light

Press "■" for finalization

Sound Level

IMAGE DISPLAY DEVICE

CROSS-REFERENCE TO RELATED APPLICATIONS

This application is based upon and claims priority to Japanese Patent Application No. 2022-205376, filed on Dec. 22, 2022, the entire contents of which are incorporated herein by reference.

FIELD

The present disclosure relates to a method for manufacturing an image display device.

A reflective imaging optical element that displays a real image of an object to be observed in mid-air and an image display device using the reflective imaging optical element have been proposed (see, e.g., Japanese Patent Publication No. 2015-146009).

Such an image display device can display an image when needed by a user, and may not display the image at other times. Such an image display device does not require a device to be employed as a display part because the image is displayed in mid-air. Such an image display device therefore has advantages such as more effective utilization of the limited space inside an automobile or the like.

Further, a non-contact operation panel can be realized by applying such an image display device. Therefore, there are expectations for expanding the field of application beyond the utilization in automobiles and the like.

Reflective imaging optical elements that can display images in mid-air, such as those that use dihedral corner reflectors or retroreflective function optical elements called corner cube reflectors, have been put into practical use (see, e.g., PCT Publication No. WO2016/199902). Attention has been called to problems resulting from the operation principles of these devices. For example, in an image display device using imaging elements having dihedral corner reflectors, it is said to be difficult to avoid the display of virtual images at locations unintended by the user.

In an image display device using a corner cube reflector, the image formation position can be set relatively freely by using an optical element in addition to a light source and imaging element. On the other hand, the configuration of such an optical element is complex.

There is a demand for an image display device having a simple structure that can display an image in mid-air.

SUMMARY

According to certain embodiment of the invention, an image display device can be provided having a simple structure that can display an image in mid-air.

An image display device according to one embodiment of the invention includes a first display device, an imaging element, a first sensor, and a control device; the first display device outputs a first image representing an operation part for an apparatus; the imaging element reflects the first image and forms the first image in mid-air as a mid-air image; the first sensor detects an approach of a detection object to the mid-air image and outputs a first signal; and the control device outputs a second signal to the apparatus based on the first signal. The imaging element includes a base member and a reflector array provided on the base member, the base member including a first surface and a second surface positioned at a side opposite to the first surface, or a base member including a reflector array, the base member including a first surface and a second surface positioned at a side opposite to the first surface, The reflector array includes a plurality of reflector rows, the plurality of reflector rows including a plurality of dihedral corner reflectors arranged along a first direction. Each of the plurality of dihedral corner reflectors includes a first reflecting surface configured to reflect light from the first surface side, and a second reflecting surface oriented to be orthogonal to the first reflecting surface and configured to reflect a reflected light from the first reflecting surface toward the first surface side. In each reflector row of the plurality of reflector rows, an angle between a straight line at which the first reflecting surface and the second reflecting surface meet and a plane in which the first direction and a second direction intersecting the first direction extend is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in the second direction. The first display device is provided at the first surface side. Each of the plurality of dihedral corner reflectors is configured to cause a portion of a once-reflected light to travel toward the second reflecting surface, the once-reflected light being light that is emitted from the first display device and reflected at the first reflecting surface.

An image display device according to an embodiment of the invention includes a first display device, an imaging element, a first sensor, and a control device; the first display device outputs a first image representing an operation part for an apparatus; the imaging element reflects the first image and forms the first image in mid-air as a mid-air image; the first sensor detects an approach of a detection object and outputs a first signal; and the control device outputs a second signal to the apparatus based on the first signal. The imaging element includes a base member, and a reflector array provided on the base member, the base member including a first surface and a second surface positioned at a side opposite to the first surface, or a base member comprising a reflector array provided in a base member, the base member including a first surface and a second surface positioned at a side opposite to the first surface. The reflector array includes a plurality of reflector rows, the plurality of reflector rows including a plurality of dihedral corner reflectors arranged along a first direction. The plurality of reflector rows are arranged in a second direction to be parallel to each other with a spacing therebetween, the second direction intersecting the first direction. Each of the plurality of dihedral corner reflectors includes a first reflecting surface configured to reflect light from the first surface side, and a second reflecting surface orthogonal to the first reflecting surface and configured to reflect a reflected light reflected from the first reflecting surface toward the first surface side. In each reflector row of the plurality of reflector rows, an angle between a straight line at which the first reflecting surface and the second reflecting surface meet and a plane in which the first direction and the second direction intersect is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in one direction along the second direction. The first display device is provided at the first surface side. Each of the plurality of dihedral corner reflectors is configured such that a portion of a reflected light travels toward the second reflecting surface, and another portion of the reflected light travels toward the second surface side, the reflected light being light that is emitted from the first display device and reflected once at the first reflecting surface. The light-transmitting member is configured to transmit a twice-reflected light, the twice-reflected light being a portion of the reflected light, the portion being reflected at the second reflecting surface.

DETAILED DESCRIPTION

Figure 1:
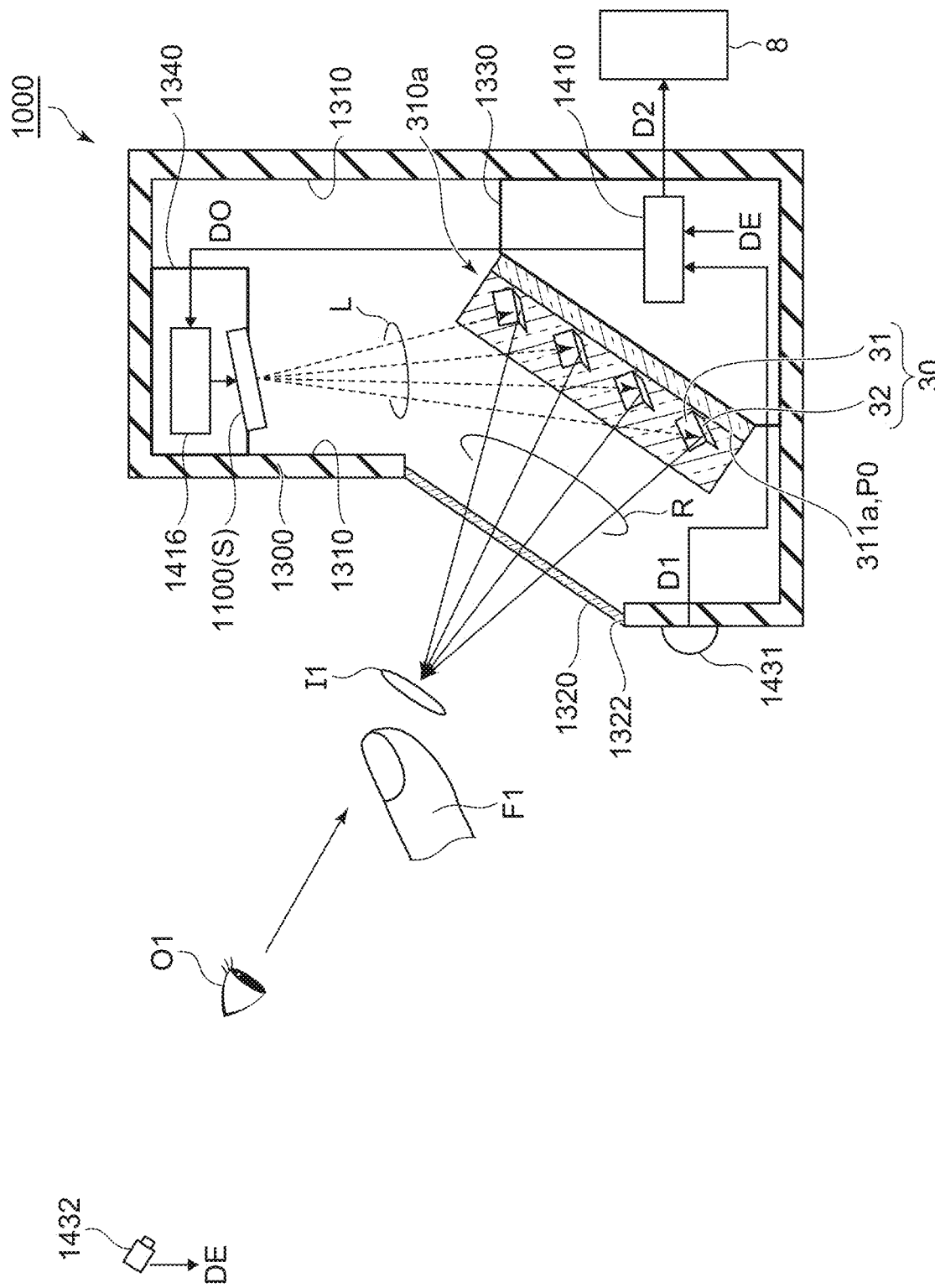
FIG. 1 is a schematic cross-sectional view illustrating an image display device according to a first embodiment.

Exemplary embodiments will now be described with reference to the drawings.

The drawings are schematic or conceptual, and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals, and a detailed description is omitted as appropriate.

First Embodiment

FIG. 1 is a schematic cross-sectional view illustrating an image display device according to a first embodiment.

As shown in FIG. 1, the image display device 1000 according to the embodiment includes a display device 1100(S), an imaging element 310a, an infrared sensor (a first sensor) 1431, and a control device 1410.

The display device 1100(S), the imaging element 310a, and the control device 1410 are located inside a housing 1300. The display device 1100(S) is located at the lower surface of a display device mounting part 1340 located at the upper portion inside the housing 1300. The imaging element 310a is located on an imaging element mounting part 1330 located at the lower portion inside the housing 1300. The control device 1410 is located inside the imaging element mounting part 1330 located at the lower portion inside the housing 1300.

The infrared sensor 1431 includes a light source emitting infrared light, and a sensor detecting the reflection or shielding of the infrared light emitted by the light source. The infrared sensor 1431 is arranged so that the light source and the sensor both are exposed outside the housing 1300. The infrared sensor 1431 is located in front of the housing 1300 to detect when an operator O1 operating the image display device 1000 approaches the image display device 1000. More specifically, the infrared sensor 1431 is arranged to detect a fingertip (a detection object) F1 of the operator O1 approaching a mid-air image I1 formed in mid-air.

The image display device 1000 according to the embodiment can further include an imaging part (a second sensor) 1432. The imaging part 1432 is located at the vicinity of the image display device 1000 to detect the brightness of the location of the image display device 1000. The imaging part 1432 is favorably positioned to detect the brightness of a location that includes the position at which the mid-air image I1 is formed. In the example of FIG. 1, the imaging part 1432 is located behind the operator O1 and detects the brightness of the location including the position at which the mid-air image I1 is formed from behind the operator O1.

The image display device 1000 according to the embodiment further includes a display controller 1416. In the example of FIG. 1, the display controller 1416 is located inside the display device mounting part 1340. The display controller 1416 may be located inside the imaging element mounting part 1330 with the control device 1410.

An opening that is defined by a window frame 1322 is provided in the housing 1300, and a light-transmitting member 1320 is located in the window frame 1322. The light-transmitting member 1320 is formed of a light-transmitting material and is formed of, for example, glass, a light-transmitting resin, etc. The light-transmitting member 1320 is arranged to transmit a reflected light R emitted by the imaging element 310*a* located on the imaging element mounting part 1330.

The infrared sensor 1431, the imaging part 1432, and the display controller 1416 are electrically connected to the control device 1410. The control device 1410, the infrared sensor 1431, the imaging part 1432, and the display controller 1416 are not limited to being connected in a star connection centered on the control device 1410, and may be communicably connected on a communication network. The connections of the control device 1410, the infrared sensor 1431, the imaging part 1432, and the display controller 1416 are not limited to electrical connections, and may be connected by optical signals. Hereinbelow, a connection capable of communication is called an electrical connection.

The infrared sensor 1431 detects the approach of the detection object by detecting the reflection or shielding of infrared light of the light source that emits infrared light. When the detection object is detected, the infrared sensor 1431 generates a detection signal, i.e., a first signal D1, and outputs the first signal D1 to the control device 1410.

The imaging part 1432 collects data including environmental information, which is the information of the environment around the mid-air image I1. The environmental information is, for example, information of the brightness around the mid-air image I1. For example, the imaging part 1432 generates data DE corresponding to the brightness and outputs the data DE to the control device 1410. For example, the data DE that corresponds to the brightness is set in steps. The imaging part 1432 generates the data DE that is set in steps according to the brightness, and outputs the data DE to the control device 1410. The imaging part 1432 may detect the surrounding chromaticity in addition to the surrounding brightness. The imaging part 1432 generates data that is set according to the chromaticity, and outputs the data to the control device 1410. The imaging part 1432 is a camera that generates image data including information of the brightness and chromaticity around the mid-air image I1. The imaging part 1432 may be an illuminance meter or the like that collects data of the brightness around the mid-air image I1.

When receiving the first signal D1 from the infrared sensor 1431, the control device 1410 generates a second signal D2, i.e., an operation signal for the operation of an apparatus 8, and outputs the second signal D2 to the apparatus 8. The apparatus 8 is located outside the image display device 1000 and operates according to the second signal D2. For example, the second signal D2 is a turn-on signal that turns on a power supply for the operation of the apparatus 8, and the operation of the apparatus 8 is started by the second signal D2.

The display controller 1416 includes a reference image for forming the mid-air image I1. The display controller 1416 may read the reference image from a not-illustrated storage part and output the reference image to the display device 1100(S). The display controller 1416 includes multiple reference images. The multiple reference images correspond respectively to multiple types of mid-air images. The display controller 1416 selects one of the multiple reference images and outputs the one to the display device 1100(S). The display device 1100(S) emits light L that forms an image according to the selected reference image.

When receiving the data DE including the environmental information from the imaging part 1432, the control device 1410 outputs a command DO to the display controller 1416 to select a reference image corresponding to the data DE from among the multiple reference images. The display controller 1416 selects and applies the reference image according to the received command DO.

FIGS. 2A to 2D are schematic views illustrating reference images for the mid-air image displayed by the image display device according to the first embodiment.

Figure 2A:
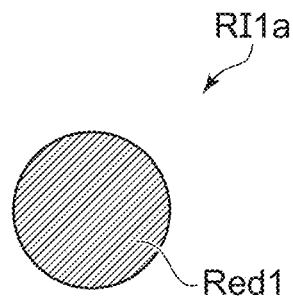
FIG. 2A is a schematic view illustrating a reference image for a mid-air image displayed by the image display device according to the first embodiment.
Figure 2B:
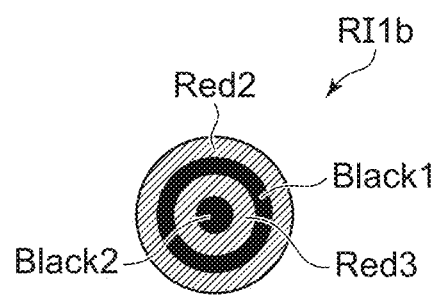
FIG. 2B is a schematic view illustrating a reference image for the mid-air image displayed by the image display device according to the first embodiment.
Figure 2C:
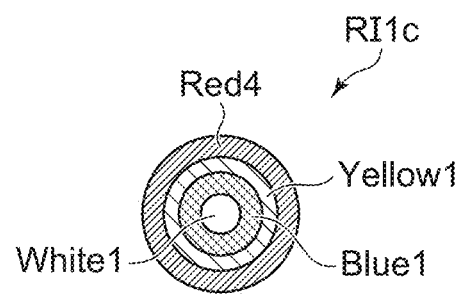
FIG. 2C is a schematic view illustrating a reference image for the mid-air image displayed by the image display device according to the first embodiment.
Figure 2D:
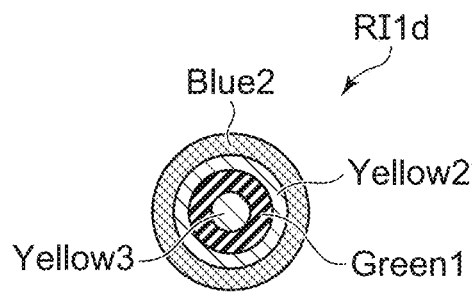
FIG. 2D is a schematic view illustrating a reference image for the mid-air image displayed by the image display device according to the first embodiment.

The image display device 1000 selects one of reference images RI1*a* to RI1*d* according to the brightness or chromaticity around where the mid-air image is displayed. The examples of FIGS. 2A to 2C show the reference images RI1*a* to RI1*c* selected according to the surrounding brightness. The example of FIG. 2D shows the reference image RI1*d* selected according to the surrounding chromaticity.

FIG. 2A is an example of the reference image RI1*a* selected when the surrounding brightness is standard. In the example of FIG. 2A, the reference image RI1*a* is in a circle Red1 of one red color.

FIG. 2B is an example of the reference image RI1*b* selected when the surrounding brightness is darker than standard. In the example of FIG. 2B, the reference image RI1*b* is four concentric circles. The reference image RI1*b* includes a red circular ring Red2 at the outermost circumference, a black circular ring Black1 next inward, a red circular ring Red3 next inward, and an innermost black circle Black2. By using such a color scheme, the operator O1 can observe a clearer mid-air image I1 even when the brightness around where the mid-air image I1 is displayed is dark.

FIG. 2C is an example of the reference image RI1*c* selected when the surrounding brightness is brighter than standard. In the example of FIG. 2C, the reference image RI1*c* is four concentric circles. The reference image RI1*c* includes a red circular ring Red4 at the outermost circumference, a yellow circular ring Yellow1 next inward, a blue circular ring Blue1 next inward, and an innermost white circle White1. By using such a color scheme, the operator O1 can observe a clearer mid-air image I1 even when the brightness around where the mid-air image I1 is displayed is bright.

FIG. 2D is an example of the reference image RI1*d* selected when the surrounding environment has a hint of red. In the example of FIG. 2D, the reference image RI1*d* is four concentric circles. The reference image RI1*d* includes a blue circular ring Blue2 at the outermost circumference, a yellow circular ring Yellow2 next inward, a green circular ring Green1 next inward, and an innermost yellow circle Yellow3. By using such a color scheme, the operator O1 can observe a clearer mid-air image I1 when the mid-air image I1 is displayed during a sunset in the evening in clear weather by using a color scheme with fewer red color components.

The description continues now by returning to FIG. 1.

The imaging element 310*a* is arranged on the imaging element mounting part 1330 so that a first surface 311*a* and a virtual plane P0 are tilted with respect to the bottom surface of the housing 1300. The light L that is emitted by the display device 1100(S) is incident on the imaging element 310*a*, and the imaging element 310*a* emits the light L obliquely upward as the reflected light R. The reflected light R is emitted in the normal direction of the first surface 311*a* and the virtual plane P0. The imaging element 310*a* is located at the imaging element mounting part 1330, which is provided to support the first surface 311*a* in the direction in which the reflected light R is emitted. The virtual plane P0 is described below with reference to FIG. 7, and the first surface 311*a* is described below with reference to FIGS. 12A and 12B.

The housing 1300 has any appropriate exterior shape such that the imaging element 310*a*, the display device 1100(S), and the control device 1410 are located at appropriate positions in the interior.

The housing 1300 includes a light-shielding member 1310. In the image display device 1000, the light-shielding member 1310 is a portion of the housing 1300. The light-shielding member 1310 is, for example, a light-absorbing layer located at the interior wall of the housing 1300. The light-absorbing layer is, for example, a coating layer of a black coating material. By providing the light-shielding member 1310 at the interior wall of the housing 1300 in the image display device 1000, a portion of the light emitted from the display device 1100(S) and the imaging element 310*a* is prevented from being reflected inside the housing 1300 to become stray light. The light-shielding member 1310 is a coating layer of a coating material and is sufficiently thin compared to the thickness of the constituent material of the housing 1300, and is therefore illustrated as the surface of the interior wall of the housing 1300 in FIG. 1.

The window frame 1322 is located at a position facing the first surface 311*a* of the imaging element 310*a*. The light-transmitting member 1320 is formed of a light-transmitting material such as glass, a transparent resin, etc., so that the imaging element 310*a* can emit the reflected light R outside the image display device 1000.

The imaging element 310*a* includes multiple dihedral corner reflectors 30 arranged in a matrix configuration on the first surface 311*a*. The first surface 311*a* is arranged to be substantially parallel to the light-transmitting member 1320 and the opening of the window frame 1322. The dihedral corner reflector 30 includes a first reflecting surface 31 and a second reflecting surface 32, the reflecting surfaces reflect the light once each, and the twice-reflected light of the dihedral corner reflector 30 is emitted as the reflected light R. The configuration of the imaging element 310*a* is described below with reference to FIGS. 6 to 15. The light-transmitting member 1320 and the window frame 1322 are arranged to transmit the twice-reflected light of the imaging element 310*a*.

In the image display device 1000, the display device 1100(S) and the imaging element 310*a* are arranged to form the mid-air image I1 directly above the imaging element 310*a*. "Directly above the imaging element 310*a*" is a position in the normal direction of the first surface 311*a*. In such an arrangement, there are cases where the imaging element 310*a* also emits a portion of the once-reflected light toward the first surface 311*a* side and forms false images and/or ghosts at the first surface 311*a* side. According to the configuration of the imaging element 310*a*, there are also cases where light that is not reflected by any reflecting surface is emitted toward the first surface 311*a* side. Accordingly, the light-shielding member 1310 is located at the interior wall of the housing 1300 at positions that shield at least the leakage light from the display device 1100(S) and the light other than the twice-reflected light of the imaging element 310*a*.

The reflected light R that is emitted from the imaging element 310*a* passes through the light-transmitting member 1320 and forms the mid-air image I1 outside the housing 1300. The light-transmitting member 1320 is located between the imaging element 310*a* and the position at which the mid-air image I1 is formed. When the operator O1 is present, the mid-air image I1 is formed between the operator O1 and the light-transmitting member 1320.

Although the light-shielding member 1310 is located at the interior wall of the housing 1300 in the specific example above, the light-shielding member 1310 is not limited to being located at the interior wall as long as the leakage light radiated from the display device 1100(S) and/or the imaging element 310*a* can be shielded. For example, the leakage light from the display device 1100(S) can be shielded by surrounding the periphery of the display device 1100(S) with a tubular body coated in black. The leakage light of the imaging element 310*a* can be shielded by forming the base member of the imaging element 310*a* from a black resin, etc.

The configuration of the display device 1100(S) will now be described in detail.

Figure 3A:
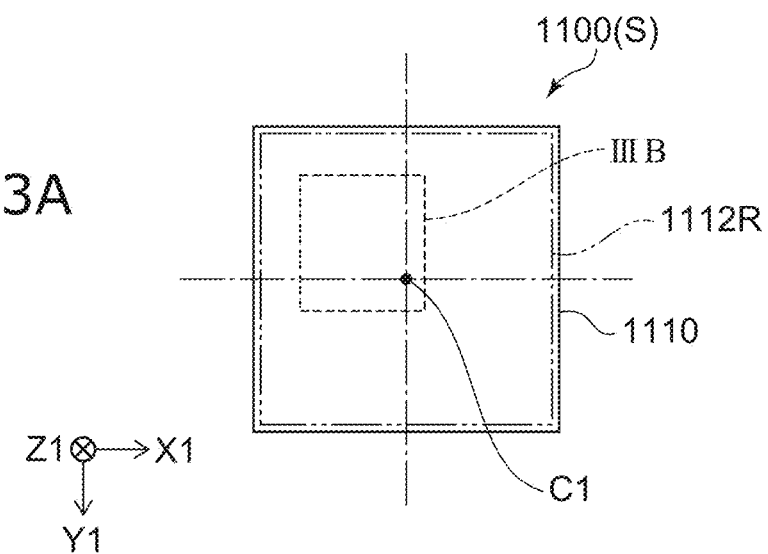
FIG. 3A is a schematic plan view illustrating a portion, i.e., a display device, of the image display device according to the first embodiment.

FIG. 3A is a schematic plan view illustrating a portion, i.e., the display device, of the image display device according to the first embodiment.

Figure 3B:
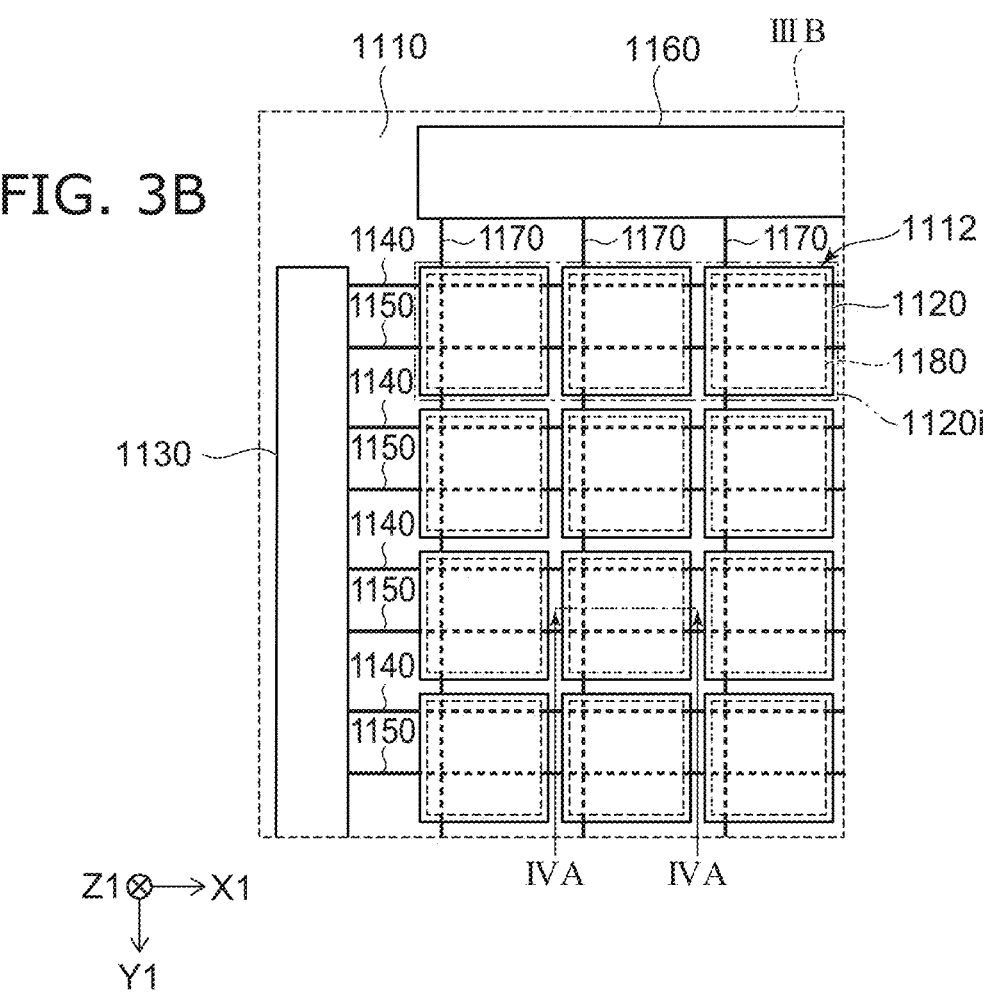
FIG. 3B is an enlarged schematic view of portion IIIB of FIG. 3A.

FIG. 3B is an enlarged schematic view of portion IIIB of FIG. 3A.

Figure 4A:
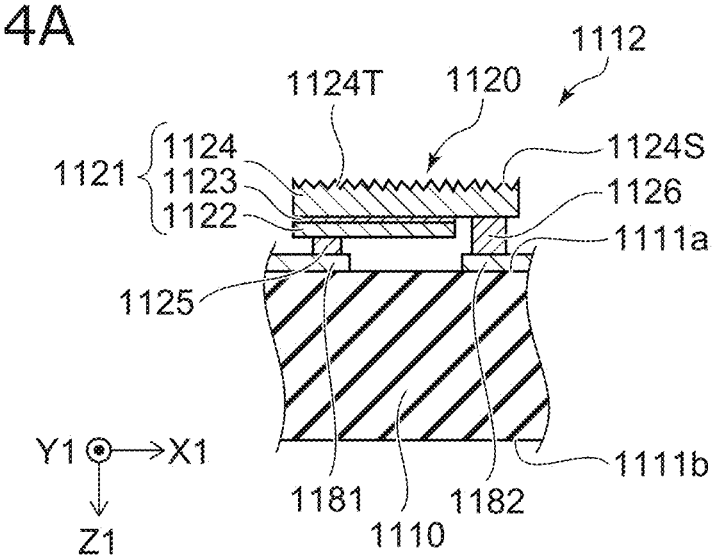
FIG. 4A is a schematic auxiliary cross-sectional view along line IVA-IVA of FIG. 3B.

FIG. 4A is a schematic auxiliary cross-sectional view along line IVA-IVA of FIG. 3B.

A three-dimensional orthogonal coordinate system may be used in the description of the display device 1100(S). The three-dimensional orthogonal coordinate system for the description of the display device 1100(S) is an orthogonal coordinate system including an X1-axis, a Y1-axis, and a Z1-axis. A direction parallel to the X1-axis may be called an "X1-direction," a direction parallel to the Y1-axis may be called a "Y1-direction," and a direction parallel to the Z1-axis may be called a "Z1-direction." The X1Y1-plane that includes the X1-axis and the Y1-axis is parallel to a first surface 1111*a* of the substrate of the display device 1100(S). The first surface 1111*a* is a surface at which the LED elements are arranged and a pixel formation region 1112R is located. The X1-axis is parallel to the rows of pixels of the display device 1100(S). The Y1-axis is orthogonal to the X1-axis. The Z1-axis is orthogonal to the X1-axis and the Y1-axis and is the positive direction from the first surface 1111*a* toward a second surface 1111*b*. The second surface 1111*b* is positioned at the side opposite to the first surface 1111*a* of a substrate 1110.

According to the X1Y1Z1-orthogonal coordinate system, the display device 1100(S) emits light mainly in the negative direction of the Z1-axis. As shown in FIG. 1, the imaging element 310*a* is located at the side at which the display device 1100(S) emits light. That is, the imaging element 310*a* is located at the negative Z1-axis side of the display device 1100(S).

As shown in FIG. 3A, the display device 1100(S) includes the substrate 1110 that is substantially rectangular in a plan view of the X1Y1-plane. The substrate 1110 can be, for example, glass, a resin such as polyimide or the like, or a Si substrate may be used. In the display device 1100(S), an optical axis C1 is aligned with the center of the shape of the outer perimeter of the substrate 1110 in a plan view of the X1Y1-plane. The optical axis C1 is parallel to the Z1-axis.

By aligning the optical axis C1 with the Z1-axis, the display device 1100(S) can be rotated around the optical axis C1 by six-axis control.

The pixel formation region 1112R is located on the substrate 1110 with the optical axis C1 at the center. Pixels 1112 shown in FIG. 3B are arranged in a matrix configuration in the pixel formation region 1112R. Although the pixel formation region 1112R is substantially square in the example shown in FIG. 3A, the pixel formation region 1112R can have any shape. That is, the outer perimeter formed by the arrangement of the pixels 1112 can have any shape.

As shown in FIG. 3B, the display device 1100(S) includes the multiple pixels 1112 as a light source. The display device 1100(S) uses the multiple pixels 1112 to display the desired image. The display device 1100(S) is electrically connected to the display controller 1416 shown in FIG. 1. The display controller 1416 supplies, to the display device 1100(S), data related to the image displayed by the display device 1100(S). The display device 1100(S) displays a still image, a video image, etc., based on the data related to the image supplied from the display controller 1416.

The display device 1100(S) includes the substrate 1110, the multiple pixels 1112, a scanning circuit 1130, multiple scanning lines 1140, multiple lighting control lines 1150, a drive circuit 1160, and multiple signal lines 1170. The pixel 1112 includes LED elements 1120 and individual circuits 1180. The LED elements 1120, the scanning circuit 1130, the drive circuit 1160, and the individual circuits 1180 are shown simply as quadrilaterals to avoid complexity in the illustration of FIG. 3B.

The multiple LED elements 1120 are arranged in a matrix configuration. Hereinbelow, the multiple LED elements 1120 arranged in one row in the X1-direction are called the "row 1120*i*".

As shown in FIG. 4A, the substrate 1110 includes the first surface 1111*a* and the second surface 1111*b*. The second surface 1111*b* is at the side opposite to the first surface 1111*a*. The LED elements 1120 are arranged in a matrix configuration on the first surface 1111*a*. The LED elements 1120 are mounted face-down on the first surface 1111*a*. The LED elements are not limited to face-down mounting and may be mounted face-up on the first surface 1111*a*.

The LED element 1120 includes a semiconductor stacked body 1121, an anode electrode 1125, and a cathode electrode 1126. The semiconductor stacked body 1121 includes a p-type semiconductor layer 1122, an active layer 1123 located on the p-type semiconductor layer 1122, and an n-type semiconductor layer 1124 located on the active layer 1123. The semiconductor stacked body 1121 includes, for example, a gallium nitride compound semiconductor of $In_XAl_YGa_{1-X-Y}N$ ($0 \leq X$, $0 \leq Y$, and $X+Y<1$). According to the embodiment, the light that is emitted by the LED element 1120 is visible light.

The anode electrode 1125 is electrically connected to the p-type semiconductor layer 1122. The anode electrode 1125 also is electrically connected to a wiring part 1181 of the individual circuit 1180 described below with reference to FIG. 5. In the example shown in FIGS. 4A and 4B, the individual circuit 1180 is formed in a Si substrate. The cathode electrode 1126 is electrically connected to the n-type semiconductor layer 1124. The cathode electrode 1126 also is electrically connected to another wiring part 1182 of the individual circuit 1180. The anode electrode 1125 and the cathode electrode 1126 can include, for example, metal materials.

In the example shown in FIG. 4A, multiple recesses 1124T are provided in a light-emitting surface 1124S of the LED element 1120. Hereinbelow, "the light-emitting surface of the LED element" means the surface of the LED element from which the light is mainly emitted. In the example shown in FIG. 4A, the light-emitting surface 1124S is one surface of the n-type semiconductor layer 1124. More specifically, the light-emitting surface 1124S is positioned at the side of the n-type semiconductor layer 1124 opposite to the surface facing the active layer 1123.

Methods of forming the multiple recesses 1124T in the light-emitting surface 1124S include a method in which an n-type semiconductor layer is grown on a growth substrate in which protrusions are formed, a method in which surface roughening of the surface of the n-type semiconductor layer is performed by anisotropic etching, etc. The growth substrate may be detached at the prescribed timing.

Thus, the LED element 1120 can emit light having a larger light distribution angle because the multiple recesses 1124T are provided in the light-emitting surface 1124S of the LED element 1120.

The configuration of the LED element is not limited to the configuration described above. For example, multiple protrusions instead of multiple recesses may be provided in the light-emitting surface of the LED element, or both multiple recesses and multiple protrusions may be provided. When the growth substrate is light-transmissive, the growth substrate may not be detached from the semiconductor stacked body, and at least one of multiple recesses or multiple protrusions may be provided in the surface of the growth substrate corresponding to the light-emitting surface.

The structure of the display device 1100(S) is not limited to the structure described above. Although the LED elements 1120 are individually mounted on the substrate 1110 in which the individual circuits 1180 are provided in the example above, the LED elements 1120 may be individually patterned from a semiconductor stacked body bonded on the substrate 1110 in which the individual circuits 1180 are provided, and then wired.

Figure 4B:
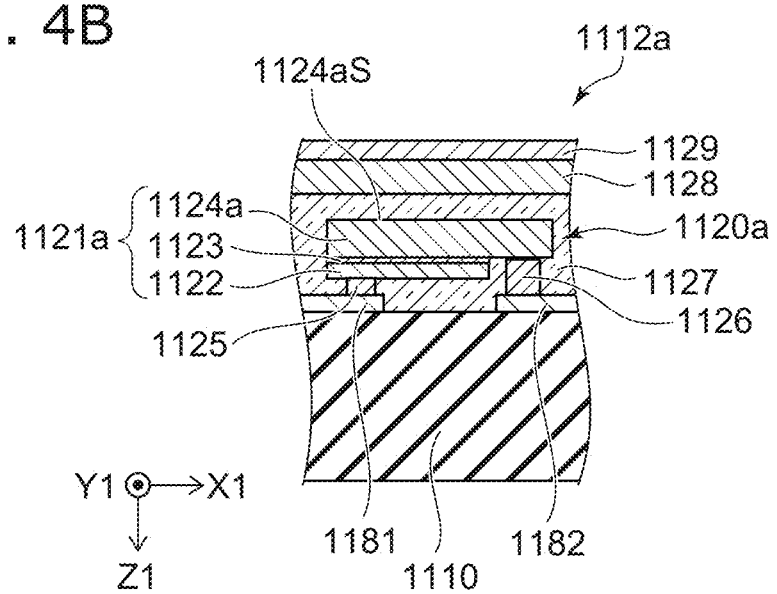
FIG. 4B is a schematic cross-sectional view illustrating a portion, i.e., a modification of the display device, of the image display device according to the first embodiment.

FIG. 4B is a schematic cross-sectional view illustrating a portion, i.e., a modification of the display device, of the image display device according to the first embodiment.

FIG. 4B corresponds to an auxiliary cross-sectional view along line IVA-IVA of FIG. 3B, and is an auxiliary cross-sectional view at the same position as the position shown in FIG. 4A.

As shown in FIG. 4B, a pixel 1112*a* includes an LED element 1120*a* and a wavelength conversion member 1128. Similarly to the pixel 1112 shown in FIG. 3B, the pixel 1112*a* includes the individual circuit 1180. As in the example shown in FIG. 4B, the pixel 1112*a* may further include a color filter 1129.

According to the modification, the LED element 1120*a* includes a semiconductor stacked body 1121*a*, the anode electrode 1125, and the cathode electrode 1126. The semiconductor stacked body 1121*a* includes the p-type semiconductor layer 1122, the active layer 1123, and an n-type semiconductor layer 1124*a*. The active layer 1123 is located on the p-type semiconductor layer 1122, and the n-type semiconductor layer 1124*a* is located on the active layer 1123. The n-type semiconductor layer 1124*a* includes a light-emitting surface 1124*a*S. The light-emitting surface 1124*a*S is a flat surface that does not include recesses or protrusions.

In the pixel 1112*a*, a protective layer 1127 covers the LED element 1120*a*, the wiring parts 1181 and 1182, and the first surface 1111*a* of the substrate 1110. The protective layer 1127 can include, for example, a light-transmitting material such as a polymer material including a sulfur (S)-including substituent group or phosphorus (P) atom-including group, a high refractive index nanocomposite material in which high refractive index inorganic nanoparticles are introduced to a polymer matrix of polyimide, etc.

The wavelength conversion member 1128 is located on the protective layer 1127. The wavelength conversion member 1128 includes at least one type of wavelength conversion material such as a general fluorescer material, a perovskite fluorescer material, a quantum dot (QD), etc. The light that is emitted from the LED element 1120a is incident on the wavelength conversion member 1128. The wavelength conversion material that is included in the wavelength conversion member 1128 converts the light into light of a different peak wavelength from the light emitted from the LED element 1120a, and emits the light. The light that is incident on the wavelength conversion member 1128 is scattered inside the wavelength conversion member 1128; therefore, the light that is emitted by the wavelength conversion member 1128 is emitted with a wider light distribution angle.

The color filter 1129 is located on the wavelength conversion member 1128. The color filter 1129 can shield the greater part of the light that is emitted from the LED element 1120a but does not undergo wavelength conversion by the wavelength conversion member 1128. As a result, the light that is emitted by the wavelength conversion member 1128 is the main light emitted from the pixel 1112a.

According to the modification, the light emission peak wavelength of the LED element 1120a may be in the ultraviolet region or the visible light region. When blue light is to be emitted from at least one pixel 1112a, blue light may be emitted from the LED element 1120a belonging to the pixel 1112a without providing the wavelength conversion member 1128 and the color filter 1129 in the pixel 1112a.

In the LED element, an n-type semiconductor layer may be arranged to face a substrate, an active layer and a p-type semiconductor layer may be stacked in this order on the n-type semiconductor layer, and the surface of the p-type semiconductor layer at the side opposite to the surface facing the active layer may be used as the light-emitting surface of the LED element.

As shown in FIG. 3B, for example, the scanning circuit 1130 is provided in the substrate 1110 to be adjacent to the multiple LED elements 1120, which are arranged in a matrix configuration, in the X1-direction in a plan view. That is, the scanning circuit 1130 is located adjacent to the outer edge parallel to the X1-direction of the pixel formation region 1112R shown in FIG. 3A. The scanning circuit 1130 is configured to sequentially switch, in the Y1-direction, the row 1120i that is driven. The multiple scanning lines 1140 extend in the X1-direction from the scanning circuit 1130. The multiple lighting control lines 1150 extend in the X1-direction from the scanning circuit 1130. The multiple scanning lines 1140 and the multiple lighting control lines 1150 are alternately arranged in the Y1-direction.

The drive circuit 1160 is provided in the substrate 1110 to be adjacent to the multiple LED elements 1120, which are arranged in a matrix configuration, in the Y1-direction in a plan view of the X1Y1-plane. That is, the drive circuit 1160 is located adjacent to the outer edge parallel to the Y1-direction of the pixel formation region 1112R shown in FIG. 3A. The drive circuit 1160 is configured to control the outputs of the LED elements 1120 belonging to the row 1120i that is driven. The multiple signal lines 1170 extend in the Y1-direction from the drive circuit 1160. The multiple signal lines 1170 are arranged in the X1-direction. The drive circuit 1160 may include an IC chip, and the IC chip may be mounted on the substrate 1110.

For example, the scanning circuit 1130, the multiple scanning lines 1140, the multiple lighting control lines 1150, the drive circuit 1160, the multiple signal lines 1170, and the individual circuits 1180 may be formed on the substrate 1110 by a low-temperature polysilicon (LTPS) process.

In the example, one pixel 1112 includes one individual circuit 1180 and one LED element 1120. Multiple LED elements 1120 may be included in one pixel 1112. When multiple LED elements 1120 are included in one pixel 1112, one individual circuit may correspond to multiple LED elements. Or, the individual circuits 1180 may be provided for each LED element 1120 in one pixel 1112.

Figure 5:
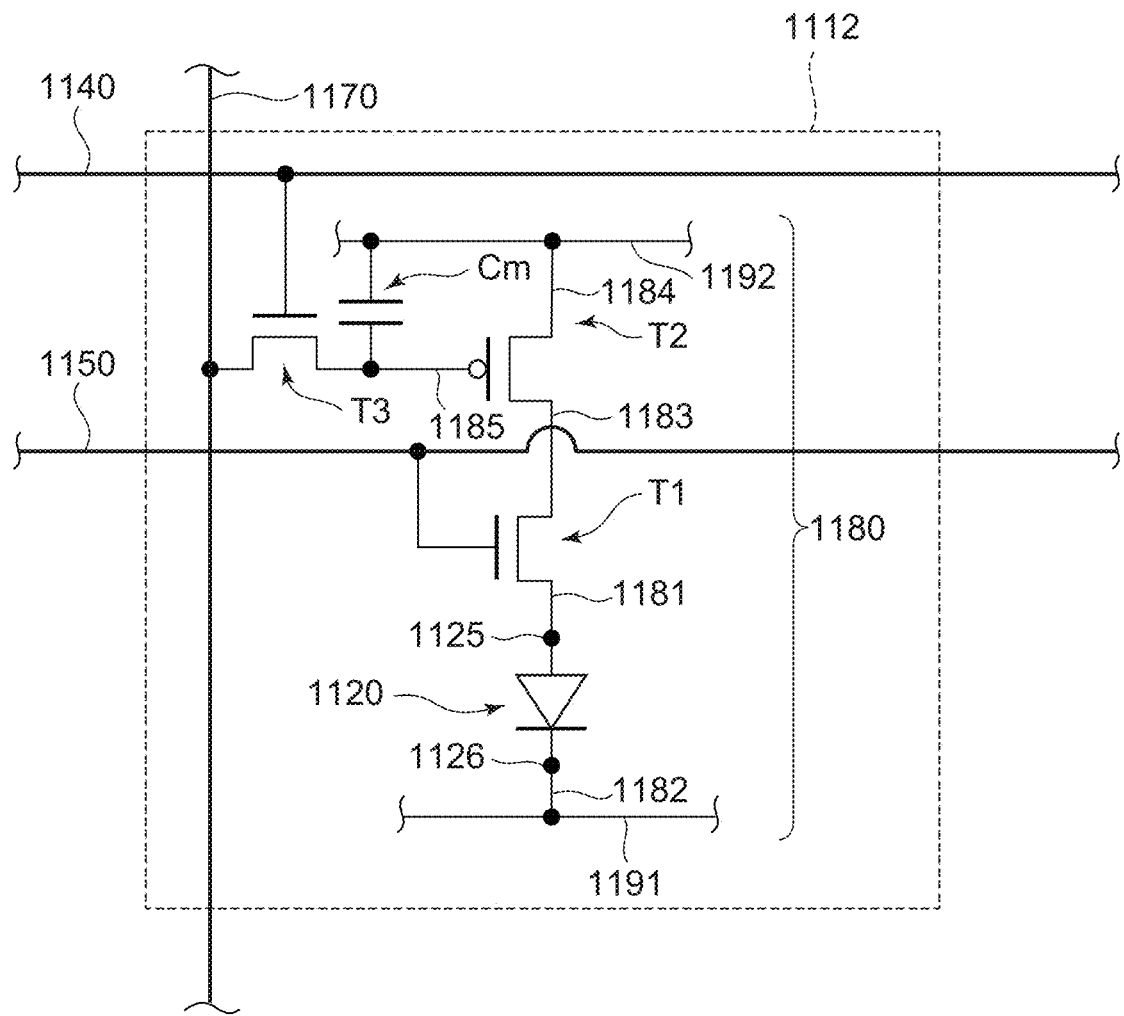
FIG. 5 is a schematic equivalent circuit diagram illustrating a portion, i.e., the display device, of the image display device according to the first embodiment.

FIG. 5 is a schematic equivalent circuit diagram illustrating a portion, i.e., the display device, of the image display device according to the first embodiment.

As shown in FIG. 5, the individual circuit 1180 includes a first transistor T1, a second transistor T2, a third transistor T3, a capacitor Cm, and multiple wiring parts 1181 to 1185. The first transistor T1 and the third transistor T3 are n-channel MOSFETs. The second transistor T2 is a p-channel MOSFET.

The cathode electrode 1126 of the LED element 1120 is electrically connected to a ground line 1191 via the wiring part 1182. For example, a voltage that is used as a reference is applied to the ground line 1191. The anode electrode 1125 of the LED element 1120 is electrically connected to the source electrode of the first transistor T1 via the wiring part 1181.

The gate electrode of the first transistor T1 is electrically connected to the lighting control line 1150. The drain electrode of the first transistor T1 is electrically connected to the drain electrode of the second transistor T2 via a wiring part 1183. The source electrode of the second transistor T2 is electrically connected to a power supply line 1192 via a wiring part 1184. A sufficiently higher voltage than the voltage used as the reference is applied to the power supply line 1192. Although not illustrated, a DC power supply is connected to the power supply line 1192 and the ground line 1191, and a positive DC voltage with respect to the reference voltage applied to the ground line 1191 is applied between the power supply line 1192 and the ground line 1191.

The gate electrode of the second transistor T2 is electrically connected to the drain electrode of the third transistor T3 via the wiring part 1185. The source electrode of the third transistor T3 is electrically connected to the signal line 1170. The gate electrode of the third transistor T3 is electrically connected to the scanning line 1140.

The wiring part 1185 is electrically connected to one terminal of the capacitor Cm. The other terminal of the capacitor Cm is electrically connected to the power supply line 1192.

The scanning circuit 1130 selects one row among the multiple rows 1120i and outputs an on-signal to the scanning line 1140 electrically connected to the row 1120i. As a result, the third transistors T3 of the individual circuits 1180 corresponding to the row 1120i are in a state in which the third transistors T3 can be switched on. The drive circuit 1160 outputs, to the signal lines 1170, drive signals including drive signal voltages corresponding to the set outputs of the LED elements 1120 belonging to the row 1120i. As a result, the drive signal voltages are stored in the capacitors Cm. The drive signal voltages set the second transistors T2 of the individual circuits 1180 corresponding to the row 1120*i* to a state in which the second transistor T2 can be switched on.

The scanning circuit 1130 outputs, to the lighting control line 1150 electrically connected to the row 1120*i*, a control signal that sequentially switches the first transistors T1 of the row 1120*i* on and off. When the first transistors T1 are in the on-state, the light emission luminances of the LED elements 1120 are controlled by currents corresponding to the drive signal voltages stored in the capacitors Cm flowing in the LED elements 1120 belonging to the row 1120*i*. The light emission periods of the LED elements 1120 are controlled for each row 1120*i* by switching the first transistors T1 on and off.

The scanning circuit 1130 sequentially switches, in the Y1-direction, the scanning line 1140 outputting the on-signal and the lighting control line 1150 outputting the control signal. Accordingly, the row 1120*i* that is driven is sequentially switched in the Y1-direction.

The configurations of the scanning circuit, the multiple scanning lines, the multiple lighting control lines, the drive circuit, the multiple signal lines, the multiple individual circuits, etc., are not limited to those described above. For example, the individual circuit may be made of a second transistor, a third transistor, a capacitor, and wiring parts without including a first transistor, multiple scanning lines may extend from the scanning circuit, and a lighting control line may not be provided. The scanning lines, the lighting control lines, the signal lines, the wiring parts of the individual circuits, etc., may not be on the surface of the substrate, and may be provided in the substrate. The electrical elements such as the transistors, capacitors, and the like included in the drive circuit may be separately manufactured and then mounted on the substrate instead of being formed on the substrate. Instead of separately manufacturing the LED elements and then mounting to the substrate, the LED elements may be formed on the substrate by using a semiconductor material such as Si or the like as the substrate. In such a case, each transistor element may be a silicon semiconductor element provided on the silicon substrate instead of a low-temperature polysilicon element provided on the glass substrate.

The display device that includes the LED element as described above is favorable in that a sufficient light emission luminance is realized with low power consumption; however, the display device is not limited thereto. Instead of an LED display using an LED element such as that described above, the display device may be an OLED display, a liquid crystal display, etc.

A configuration of the imaging element 310*a* will now be described in detail.

Figure 6:
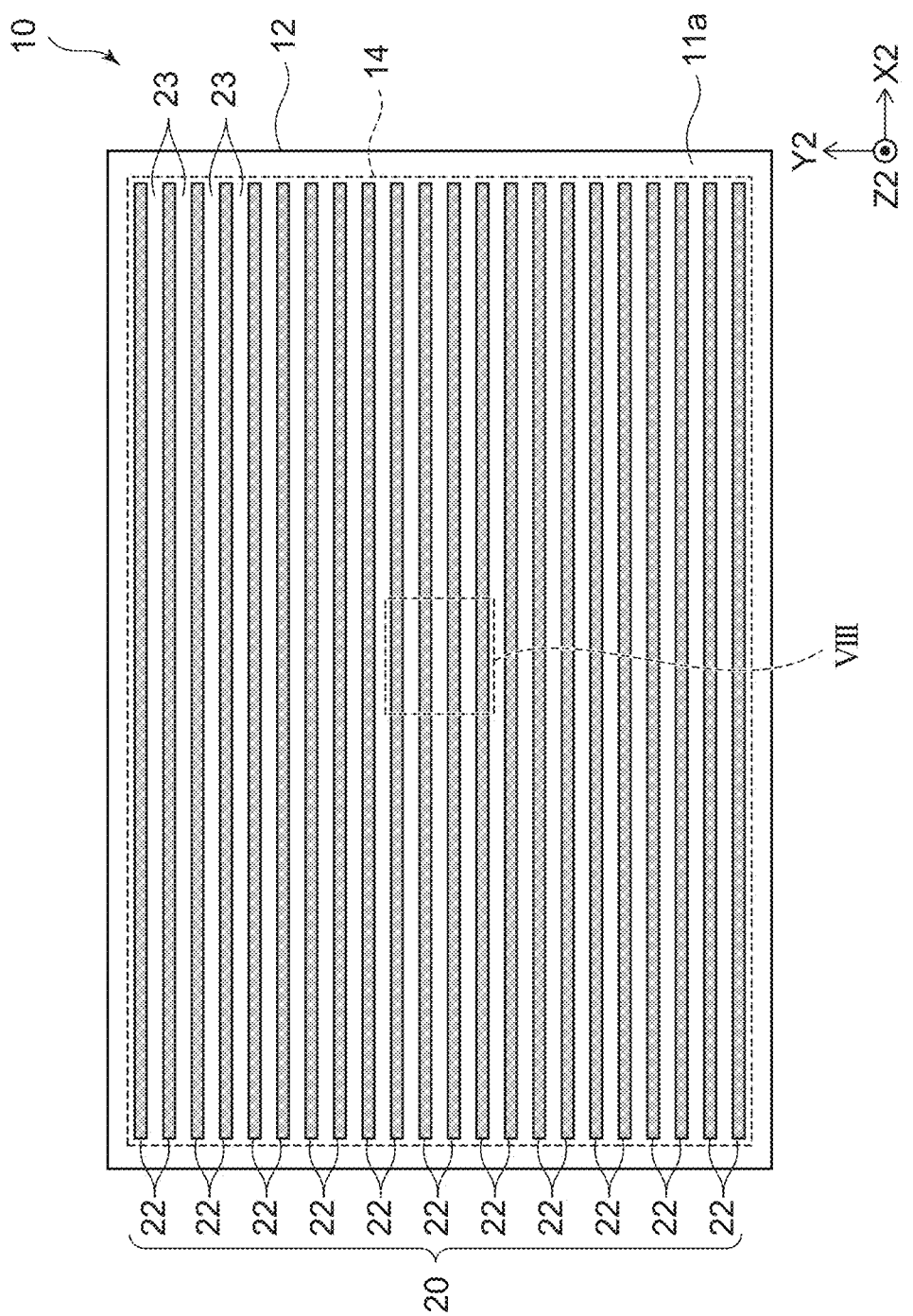
FIG. 6 is a schematic plan view illustrating a portion, i.e., an imaging element, of the image display device.

FIG. 6 is a schematic plan view illustrating a portion, i.e., the imaging element, of the image display device.

As shown in FIG. 1, the image display device 1000 according to the embodiment includes the imaging element 310*a*. The imaging element 310*a* shown in FIG. 1 is one of many variations of imaging element configurations. The following description includes the operation principle of the imaging element forming the floating image in mid-air. First, the configuration and operation of an imaging element 10 will be described.

As shown in FIG. 6, the imaging element 10 includes a base member 12 and a reflector array 20. The base member 12 includes a first surface 11*a*, and the reflector array 20 is provided on the first surface 11*a*. In the example shown in FIG. 6, the reflector array 20 is provided inside a reflector formation region 14 of the first surface 11*a*. The reflector array 20 includes multiple reflector rows 22. The reflector array 20 may be provided in the base member 12. That is, the reflector array 20 and the base member 12 may be formed as a continuous body. In such a case, the first surface 11*a* of the base member 12 is the dihedral corner reflectors of the reflector array 20 described below.

A configuration of the base member 12 will now be described.

Figure 7:
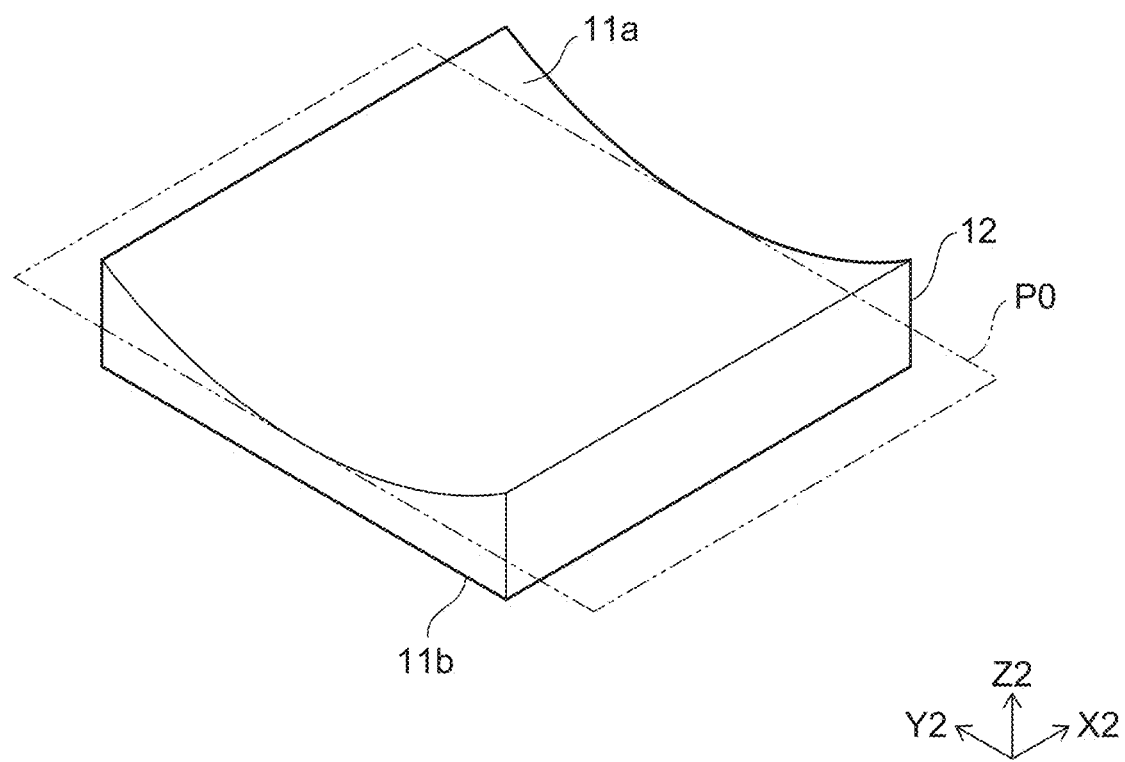
FIG. 7 is a schematic perspective view illustrating a portion, i.e., a base member, of the imaging element of FIG. 6.

FIG. 7 is a schematic perspective view illustrating a portion, i.e., the base member, of the imaging element of FIG. 6.

As shown in FIG. 7, the base member 12 includes the first surface 11*a* and a second surface 11*b*. The second surface 11*b* is positioned at the side opposite to the first surface 11*a*.

The three-dimensional orthogonal coordinate system used in the description of the imaging element may be different from the three-dimensional orthogonal coordinate system of the description of the display device 1100(S) shown in FIG. 3A, etc. The three-dimensional orthogonal coordinate system for the description of the imaging element is an orthogonal coordinate system including an X2-axis, a Y2-axis, and a Z2-axis. A direction parallel to the X2-axis may be called the "X2-direction." a direction parallel to the Y2-axis may be called the "Y2-direction," and a direction parallel to the Z2-axis may be called the "Z2-direction." The X2Y2-plane that includes the X2-axis and the Y2-axis is defined as a plane parallel to the virtual plane P0. The first surface 11*a* is located at the positive Z2-axis side of the second surface 11*b*. The first surface 11*a* includes a portion of a circular arc that is convex toward the negative Z2-axis side in a plan view of the Y2Z2-plane. In the specific example below, the virtual plane P0 is a virtual surface parallel to a tangent plane contacting a point on the circular arc positioned furthest in the negative direction of the Z2-axis.

As described above, the first surface 11*a* is a curved surface, and the reflector array 20 is located on the curved surface. The virtual plane P0 is used as a reference surface when setting the tilt in the Y2-axial direction of the reflector row 22. In other words, the reflector row 22 is arranged on the first surface 11*a* at an angle set with respect to the virtual plane P0.

The base member 12 is formed of a light-transmitting material and is formed of, for example, a transparent resin.

In the imaging element 10, when the light source is located at the first surface 11*a* side when referenced to the base member 12, the floating image is formed not at the second surface 11*b* side, but at the first surface 11*a* side at which the light source is located. The position at which the floating image is formed can be different from the position at which the light source is located and sufficiently separated from the position at which the light source is located.

The description continues now by returning to FIG. 6.

The reflector row 22 extends along the X2-direction. The multiple reflector rows 22 are arranged to be substantially parallel to each other along the Y2-direction. The multiple reflector rows 22 are arranged at substantially uniform spacing with a spacing 23 interposed in the Y2-direction respectively between the adjacent reflector rows 22. The length in the Y2-direction of the spacing 23 of the reflector rows 22 can be any length and can be, for example, about the length in the Y2-direction of the reflector row 22. When the light source is located at the first surface 11*a* side, light rays that are not reflected by the reflector rows 22, reflected light that is reflected once by the reflector row 22, and the like are incident on the region in which the spacing 23 of the reflector rows 22 is formed. Such light rays do not contribute to the floating image; therefore, the ratio of the light rays incident on the imaging element 10 that contribute to the floating image decrease as the spacing 23 increases. Therefore, the length in the Y2-direction of the spacing 23 is set to an appropriate length according to the efficiency of the reflecting surfaces, the dimensions of the dihedral corner reflector described below with reference to FIG. 8, etc.

Each of the reflector rows 22 includes many dihedral corner reflectors connected in the X2-direction and is therefore shown as filled-in to avoid complexity in FIG. 6. In the example shown in FIG. 6, the imaging element 10 has a laterally-long shape in the X2-direction. This is because the shape is advantageous for binocular viewing of the floating image. The shape of the imaging element 10 in a plan view of the X2Y2-plane is not limited thereto, and a longitudinally-long shape in the Y2-direction may be selected according to the application.

When an image is formed in the normal direction of the first surface 311a of the imaging element 310a as in the image display device 1000 shown in FIG. 1, the spacing of the adjacent reflector rows 22 may not be provided. When the spacing of the adjacent reflector rows 22 is provided, the spacing of the reflector rows may be a reflecting surface.

Figure 8:
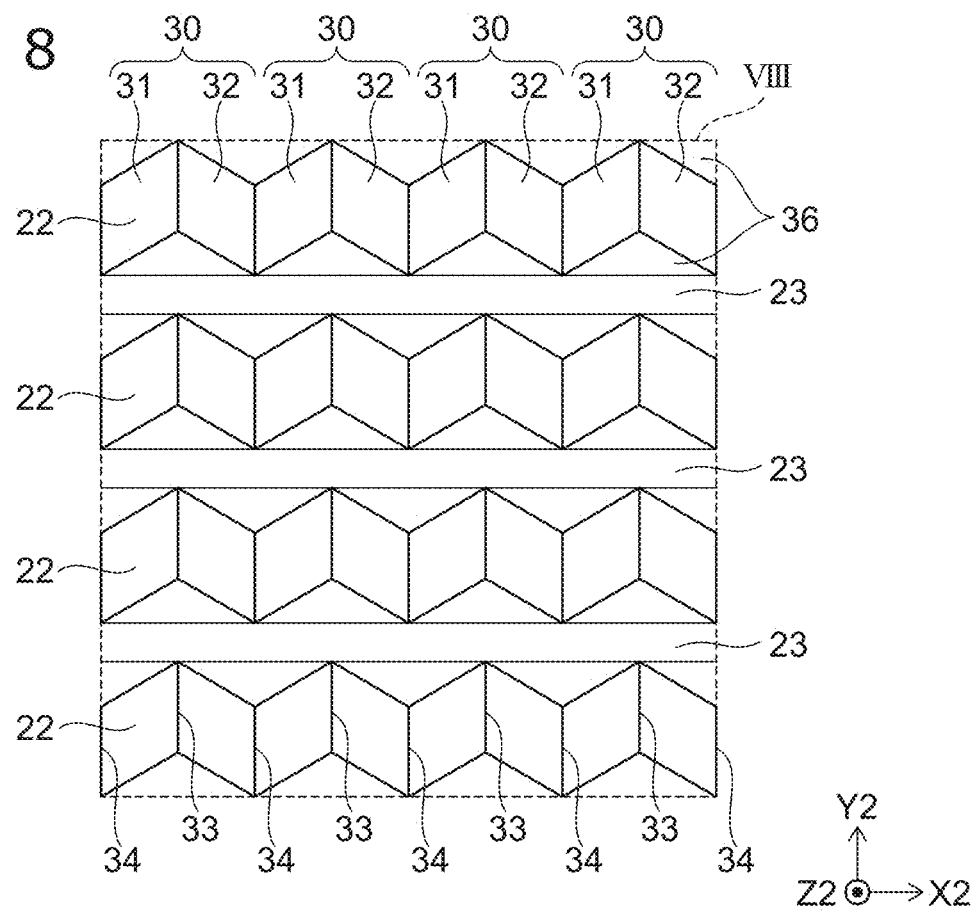
FIG. 8 is an enlarged schematic view of portion VIII of FIG. 6.

FIG. 8 is an enlarged schematic view of portion VIII of FIG. 6.

As shown in FIG. 8, the reflector row 22 includes the multiple dihedral corner reflectors 30. The multiple dihedral corner reflectors 30 are connected to each other along the X2-direction and are provided continuously. The dihedral corner reflector 30 includes the first reflecting surface 31 and the second reflecting surface 32. The dihedral corner reflector 30 is located on a base part 36 formed on the first surface 11a shown in FIG. 6. The first reflecting surface 31 and the second reflecting surface 32 each are substantially square when viewed in front-view, and the reflecting surfaces are connected to each other at one side of each of the squares so that the reflecting surfaces are substantially orthogonal to the orientation of the valley.

Hereinbelow, the connecting line between the first and second reflecting surfaces 31 and 32 of the dihedral corner reflector 30 is called a valley-side connecting line 33. The side of the first reflecting surface 31 positioned at the side opposite to the valley-side connecting line 33 and the side of the second reflecting surface 32 positioned at the side opposite to the valley-side connecting line 33 each are called hill-side connecting lines 34.

The first reflecting surface 31 of the dihedral corner reflector 30 is connected at the hill-side connecting line 34 to the second reflecting surface 32 of the dihedral corner reflector 30 adjacent at the negative X2-axis side. The second reflecting surface 32 of the dihedral corner reflector 30 is connected at the hill-side connecting line 34 to the first reflecting surface 31 of another dihedral corner reflector 30 adjacent at the positive X2-axis side. Thus, the multiple dihedral corner reflectors 30 are connected to each other along the X2-direction and are provided continuously.

In the imaging element 10 of the embodiment, the dimensions of the first and second reflecting surfaces 31 and 32 can be, for example, several μm to several hundred μm. For example, the number of integrated dihedral corner reflectors 30 is set according to the size, resolution, and the like of the image to be displayed. For example, several tens to several thousand dihedral corner reflectors 30 are integrated in one imaging element 10. For example, one thousand dihedral corner reflectors including 100 μm-square reflecting surfaces can be arranged over about 14 cm in the Y2-direction.

As in the enlarged view shown in FIG. 8, the reflector rows 22 of the imaging element 10 are arranged so that the positions in the X2-axial direction of the valley-side connecting line 33 and the hill-side connecting line 34 are respectively the same. This arrangement is not limited thereto; the positions in the X2-axial direction of the valley-side connecting line 33 and the hill-side connecting line 34 may be shifted between the reflector rows 22.

Figure 9A:
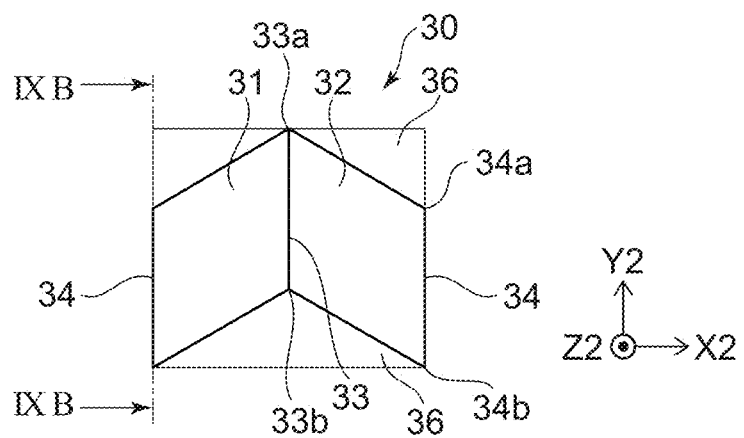
FIG. 9A is a schematic plan view illustrating a portion, i.e., a dihedral corner reflector, of the imaging element of FIG. 8.

FIG. 9A is a schematic plan view illustrating a portion, i.e., the dihedral corner reflector, of the imaging element of FIG. 8.

Figure 9B:
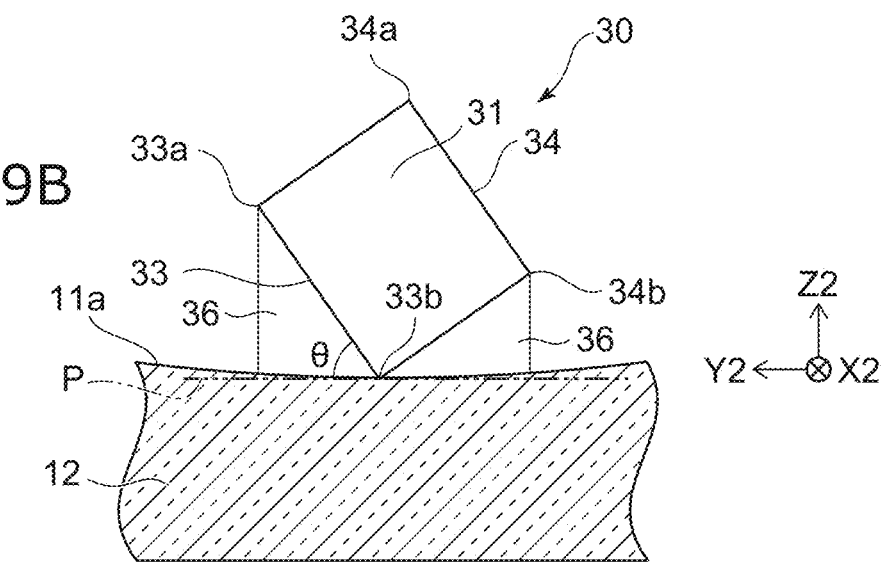
FIG. 9B is an example of a schematic auxiliary cross-sectional view along line IXB-IXB of FIG. 9A.

FIG. 9B is an example of a schematic auxiliary cross-sectional view along line IXB-IXB of FIG. 9A.

As shown in FIGS. 9A and 9B, the dihedral corner reflector 30 includes the first reflecting surface 31 and the second reflecting surface 32, and the first reflecting surface 31 and the second reflecting surface 32 are located on the base part 36. The base part 36 is arranged so that the first reflecting surface 31 and the second reflecting surface 32 have the desired angle with respect to a tangent plane P of the first surface 11a.

The base part 36 is a light-transmitting member formed in a V-shape, is formed of, for example, a transparent resin, and is formed as a continuous body with the base member 12. The first reflecting surface 31 and the second reflecting surface 32 are formed by thin film formation of a light-reflective metal material or the like at the formation location of the V-shape of the base member 12. The formation is not limited to such an example; each or a portion of the first reflecting surface 31, the second reflecting surface 32, the base part 36, and the base member 12 may be formed separately, and assembled as one to form the imaging element 10. For example, mirror finishing or the like of the surface of the transparent resin is performed, and the first reflecting surface 31 and the second reflecting surface 32 can be used as-is as the surface of the transparent resin when the surface reflectance of the transparent resin is sufficiently high. It is favorable for the spacing 23 and/or the base part 36 to be light-transmissive or light-absorbing to prevent false image observation, etc.

The dihedral corner reflector 30 may be formed as follows. The first reflecting surface 31 and the second reflecting surface 32 are formed in the surface of the transparent resin. The first reflecting surface 31 and the second reflecting surface 32 that are formed are exposed in air and arranged so that light is incident from the surface opposite to the surface at which the first reflecting surface 31 and the second reflecting surface 32 are formed. As a result, the first reflecting surface 31 and the second reflecting surface 32 can function as total reflection surfaces due to the refractive index difference between the transparent resin and the air.

The first reflecting surface 31 and the second reflecting surface 32 are connected at the valley-side connecting line 33 to be substantially orthogonal. The hill-side connecting line 34 of the first reflecting surface 31 is positioned at the side opposite to the valley-side connecting line 33, and the hill-side connecting line 34 of the second reflecting surface 32 is positioned at the side opposite to the valley-side connecting line 33.

The end portions of the valley-side connecting line 33 are called vertices 33a and 33b. The position of the vertex 33a is further toward the positive Z2-axis side than the position of the vertex 33b. That is, the vertex 33a is positioned to be more distal to the base member 12 than the vertex 33b. The end portions of the hill-side connecting line 34 are called vertices 34a and 34b. The position of the vertex 34a is further toward the positive Z2-axis side than the position of the vertex 34b. That is, the vertex 34a is positioned to be more distal to the base member 12 than the vertex 34b.

Accordingly, the vertex 34a is positioned to be furthest from the base member 12, and the vertex 33b is positioned to be most proximate to the base member 12.

FIG. 9B shows the relationship between the dihedral corner reflector 30, the first surface 11a, and the tangent plane P. The dihedral corner reflector 30 contacts the first surface 11a at the vertex 33b at the lower side of the valley-side connecting line 33. The tangent plane P contacts the first surface 11a at the position of the vertex 33b. The dihedral corner reflector 30 is located on the first surface 11a so that the valley-side connecting line 33 forms an angle with the tangent plane P.

Figure 9C:
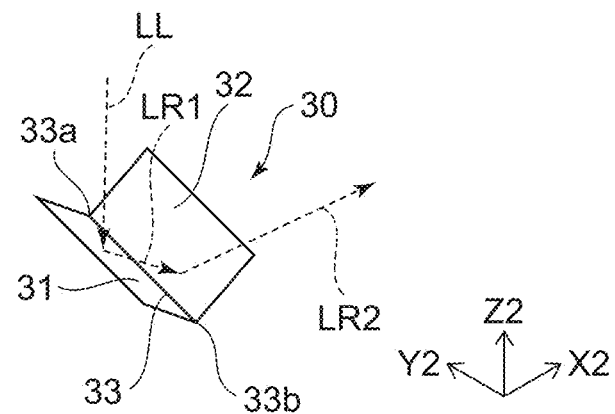
FIG. 9C is a schematic perspective view for describing an operation of the dihedral corner reflector of FIG. 9A.
Figure 9D:
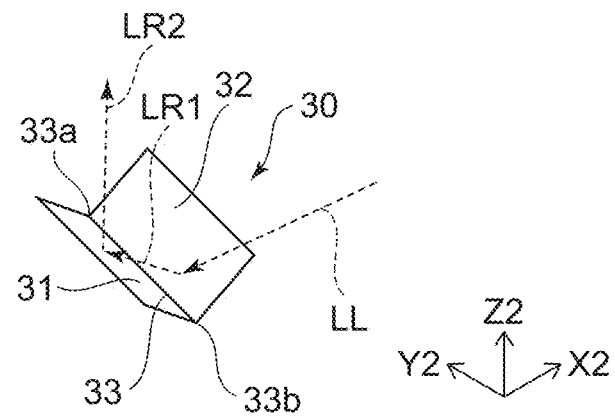
FIG. 9D is a schematic perspective view for describing an operation of the dihedral corner reflector of FIG. 9A.

FIGS. 9C and 9D are schematic perspective views for describing the operation of the dihedral corner reflector of FIG. 9A.

As shown in FIG. 9C, when a light ray LL is incident on the first reflecting surface 31, the light ray LL is reflected by the first reflecting surface 31. A once-reflected light LR1 that is reflected by the first reflecting surface 31 is re-reflected by the second reflecting surface 32. A twice-reflected light LR2 that is reflected by the second reflecting surface 32 is emitted toward the same side as the light source of the incident light. Thus, the dihedral corner reflector 30 emits the incident light from the first surface 11a side toward a different position from the light source at the first surface 11a side. Thus, the dihedral corner reflector 30 reflects the light twice by two reflecting surfaces, and reflects the twice-reflected light LR2 toward the side from which the incident light ray LL traveled.

The reflection operation of the dihedral corner reflector 30 is reversible. When the light ray that is incident on the dihedral corner reflector 30 is incident along the opposite direction along the twice-reflected light LR2 in FIG. 9C, the light ray is reflected in the opposite direction along the incident light ray LL. Specifically, as shown in FIG. 9D, the light ray LL that is incident on the dihedral corner reflector 30 is reflected by the second reflecting surface 32 and incident on the first reflecting surface 31 as the once-reflected light LR1. The once-reflected light LR1 is reflected by the first reflecting surface 31 and emitted as the twice-reflected light LR2.

As shown in FIGS. 8 and 9A, the dihedral corner reflector 30 is line-symmetric with respect to the valley-side connecting line 33, and is positioned so that the angle of the first reflecting surface 31 with respect to the tangent plane P is substantially equal to the angle of the second reflecting surface 32 with respect to the tangent plane P. Therefore, when the light ray is initially incident on the first reflecting surface 31, the dihedral corner reflector 30 emits the reflected light by an operation similar to when the light ray is initially incident on the second reflecting surface 32. For example, in FIG. 9C, the light ray LL is initially incident on the first reflecting surface 31 and reflected by the first reflecting surface 31; however, the operation of the dihedral corner reflector 30 can be similar to the description described above even when the light ray LL is initially incident on the second reflecting surface 32 and reflected by the second reflecting surface 32. In FIG. 9D, the light ray LL may be initially incident on the first reflecting surface 31, and the once-reflected light from the first reflecting surface 31 may be reflected by the second reflecting surface 32 and emitted as the second reflected light. Unless otherwise noted in the description of the operation of the imaging element hereinbelow, the case where the light ray LL is initially reflected by the first reflecting surface 31 will be described.

Figure 10:
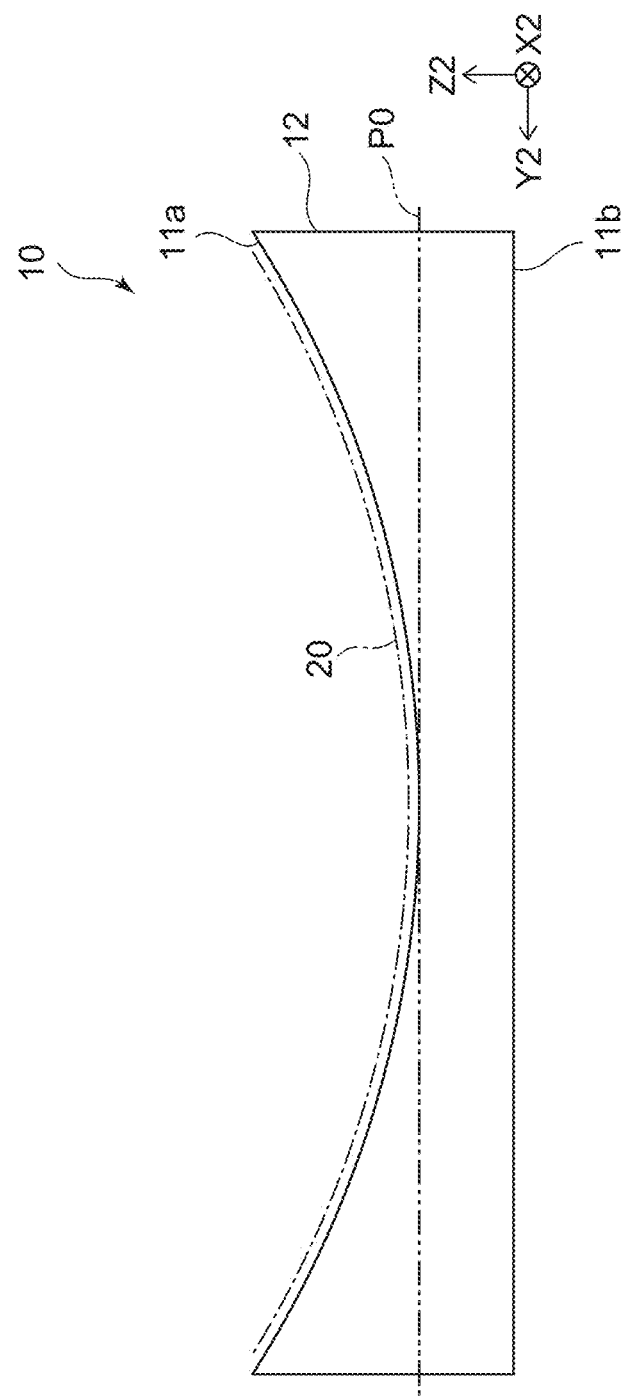
FIG. 10 is a schematic side view illustrating the imaging element of FIG. 6.

FIG. 10 is a schematic side view illustrating the imaging element of FIG. 6.

In FIG. 10, the reflector array 20 is shown by an envelope connecting the vertices 33a of the dihedral corner reflectors 30 shown in FIGS. 9A and 9B. In side views illustrating the imaging element hereinbelow, the reflector array 20 is illustrated by illustrating the envelope of the vertices 33a of the dihedral corner reflectors 30 as a single dot-dash line as shown in FIG. 10 unless it is necessary to show and describe the configuration of the dihedral corner reflector 30.

In the imaging element 10 as shown in FIG. 10, the reflector array 20 is provided in a curved shape because the first surface 11a is a curved surface. The first surface 11a includes a portion of a circular arc that is convex toward the negative Z2-axis side in a plan view of the Y2Z2-plane, the reflector array 20 also is provided in an arc-like shape, and the envelope of the vertices also is a circular arc. The radius of the circular arc is set based on the distance between the imaging element 10 and the light source provided at the first surface 11a side of the imaging element 10. For example, the radius of the circular arc of the reflector array 20 is set to about 2 times the distance between the imaging element 10 and the light source.

As described with reference to FIGS. 9C and 9D, the imaging element 10 is reversible with respect to the incidence and reflection directions of the light ray. When the incidence and reflection directions of the imaging element 10 are reversed, the radius of the circular arc is set based on the distance between the imaging element 10 and the floating image formed at the first surface 11a side. Similarly to the description described above, the radius of the circular arc of the reflector array 20 is set to about 2 times the distance between the imaging element 10 and the floating image.

In the imaging element 10, the tangent plane that contacts the first surface 11a at the lowest position in the negative Z2-axis side direction is the virtual plane P0 that is parallel to the XY-plane.

Figure 11:
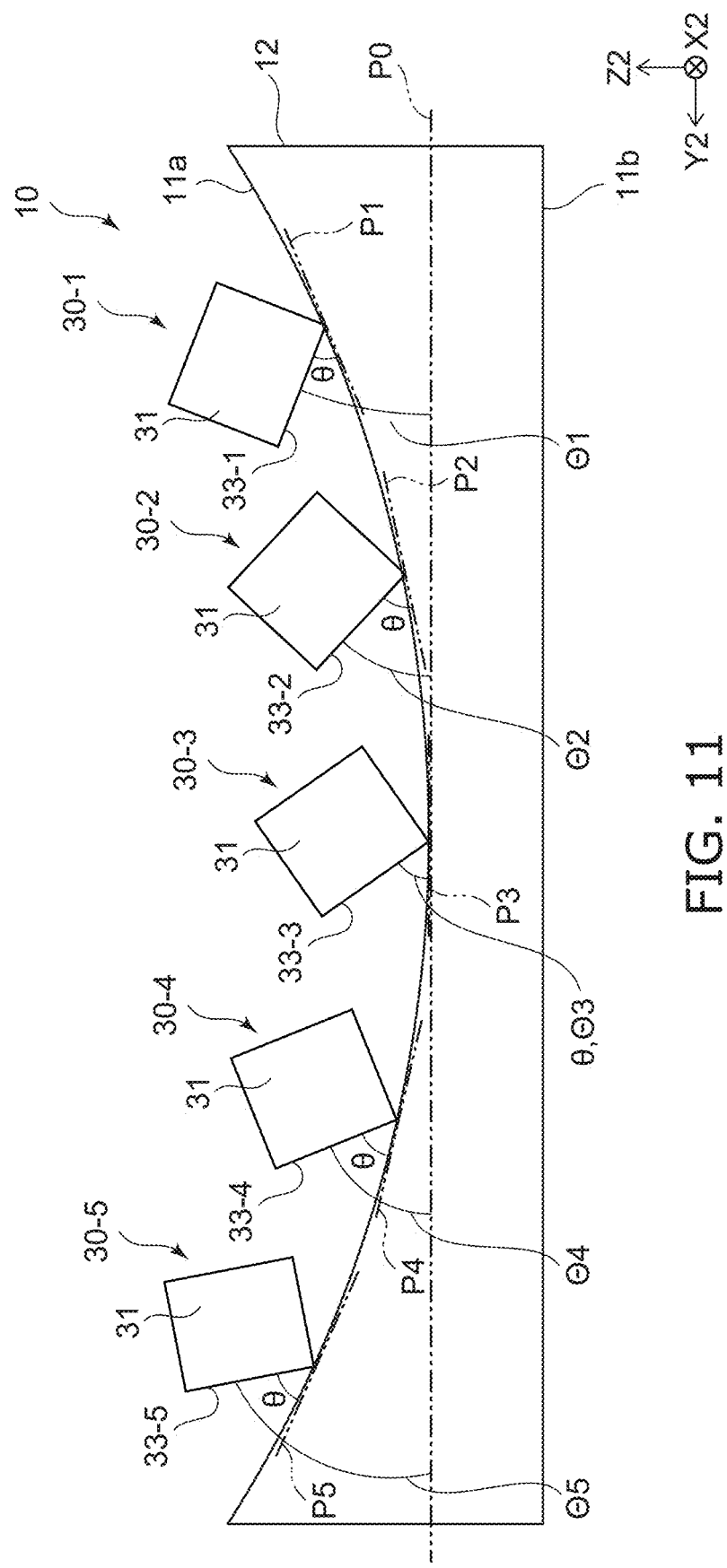
FIG. 11 is a schematic side view illustrating the imaging element of FIG. 6.

FIG. 11 is a schematic side view illustrating the imaging element of FIG. 6.

FIG. 11 shows one dihedral corner reflector included in the reflector rows 22 shown in FIGS. 6 and 8. As described with reference to FIGS. 6 and 8, the multiple reflector rows 22 each extend along the X2-direction and are arranged at substantially uniform spacing in the Y2-direction. The angles of the multiple dihedral corner reflectors included in one reflector row 22 with respect to the virtual plane P0 are substantially the same. Accordingly, the angle of the dihedral corner reflector 30 with respect to the virtual plane P0 refers to the angle with respect to the virtual plane P0 of the reflector row 22 to which the dihedral corner reflector 30 belongs.

FIG. 11 is an enlarged schematic illustration of five dihedral corner reflectors 30-1 to 30-5 among the many dihedral corner reflectors arranged in the Y2-direction. Although different reference numerals are used to differentiate the positions in the Y2-axis, the configurations of the dihedral corner reflectors 30-1 to 30-5 are the same as that of the dihedral corner reflector 30 described with reference to FIGS. 9A and 9B. The base part 36 shown in FIG. 9B is not illustrated to avoid complexity in the illustration.

As shown in FIG. 11, the dihedral corner reflectors 30-1 to 30-5 have different angles $\Theta 1$ to $\Theta 5$ with respect to the virtual plane P0 according to the positions in the Y2-axis along the first surface 11a. The angles $\Theta 1$ to $\Theta 5$ of the dihedral corner reflectors 30-1 to 30-5 are illustrated by the angles of the valley-side connecting lines (straight lines) 33-1 to 33-5 with respect to the virtual plane P0.

In the example shown in FIG. 11, the dihedral corner reflectors 30-1 to 30-5 are arranged in this order in the positive direction of the Y2-axis. The angles Θ1 to Θ5 of the dihedral corner reflectors 30-1 to 30-5 are set to increase in this order. That is, the sizes of the angles Θ1 to Θ5 are set to Θ1<Θ2<Θ3<Θ4<Θ5.

More generally, when referenced to the reflector row (a first reflector row) 22 of the dihedral corner reflector set to the smallest value, the angles Θ1 to Θ5 of the dihedral corner reflectors 30-1 to 30-5 increase away from the reflector row 22 in one direction along the Y2-axis. Also, the angles Θ1 to Θ5 decrease away from the reference reflector row 22 in the other direction along the Y2-axis. In the example of FIG. 11, when the position of the dihedral corner reflector 30-1 set to the smallest angle is used as the reference, the sizes of the angles Θ1 to Θ5 are Θ1<Θ2<Θ3<Θ4<Θ5 in the positive direction of the Y2-axis.

The angles Θ1 to Θ5 of the dihedral corner reflector can be set so that 0°<Θ1 to Θ5<90°. Although the angles between the first reflecting surface 31 and the virtual plane P0 are determined according to the angles Θ1 to Θ5, 45°<(the angle between the first reflecting surface 31 and the virtual plane P0)<90° can be set. The angle between the second reflecting surface 32 and the virtual plane P0 is equal to the angle between the first reflecting surface 31 and the virtual plane P0. Accordingly, 45°<(the angle between the second reflecting surface 32 and the virtual plane P0)<90° can be set.

The tilts of the dihedral corner reflectors 30-1 to 30-5 also may be set using the angles with respect to tangent planes P1 to P5 of the first surface 11a at which the dihedral corner reflectors 30-1 to 30-5 are located. The angles of the dihedral corner reflectors 30-1 to 30-5 with respect to the tangent planes P1 to P5 are set to a constant angle θ regardless of the positions of the dihedral corner reflectors 30-1 to 30-5 in the Y2-axis. For example, the angle θ is based on the angle between the horizontal plane and each reflecting surface of a corner cube reflector and is set to about 30°, and more specifically, 35.3°.

In the imaging element 10 of the example, when referenced to the base member 12, the angles Θ1 to Θ5 of the dihedral corner reflectors 30-1 to 30-5 are appropriately set so that the light rays incident from the light source provided at the first surface 11a side are imaged at the first surface 11a side. The imaging position is at a different mid-air position from the light source. The angles of the dihedral corner reflectors with respect to the virtual plane P0 are determined by, for example, experiments, simulations, etc.

The angles of the dihedral corner reflectors with respect to the virtual plane P0 are set to increase according to the position in the Y2-axis, or are set to decrease according to the position in the Y2-axis; therefore, the first surface 11a may not be a portion of a circular arc of a perfect circle. For example, the first surface 11a may be a portion of an arc of an ellipse, or may be a portion of a polygon corresponding to the number of reflector rows. It is sufficient to be able to set the angles of the dihedral corner reflectors according to the positions of the dihedral corner reflectors in the Y2-axis; therefore, the angles of the dihedral corner reflectors may be referenced to another plane having any angle with respect to the virtual plane P0 without using the virtual plane P0 as a reference.

Modifications of the imaging element will now be described.

Figure 12A:
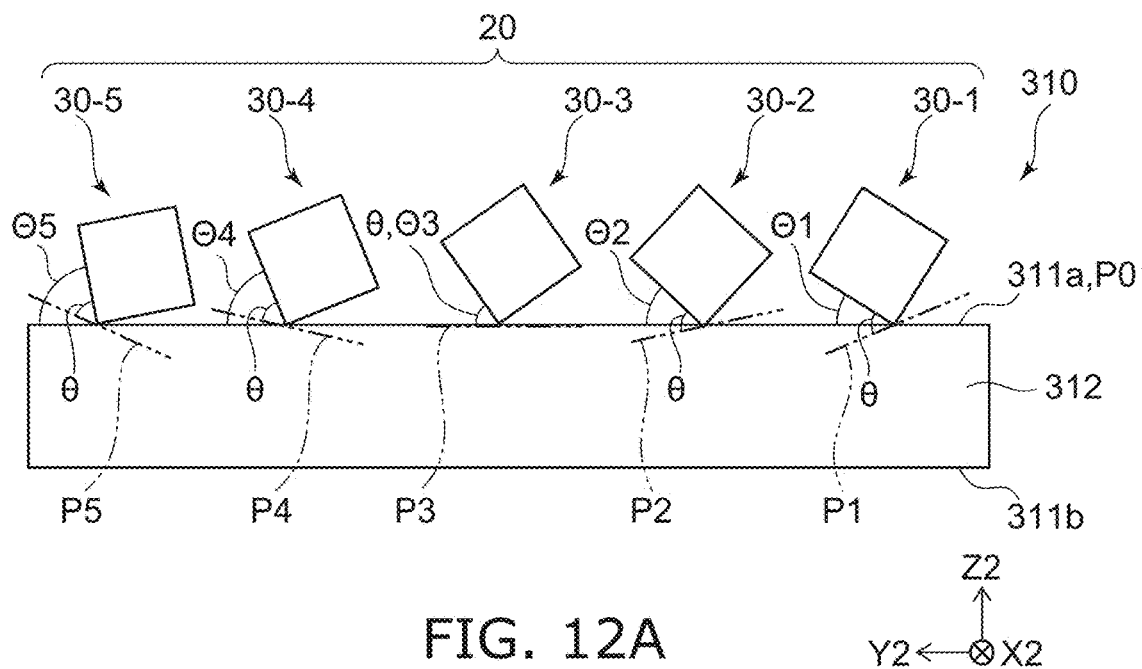
FIG. 12A is a schematic side view illustrating a portion, i.e., a modification of the imaging element, of the image display device according to the first embodiment.

FIG. 12A is a schematic side view illustrating a portion, i.e., a modification of the imaging element, of the image display device according to the first embodiment.

Figure 12B:
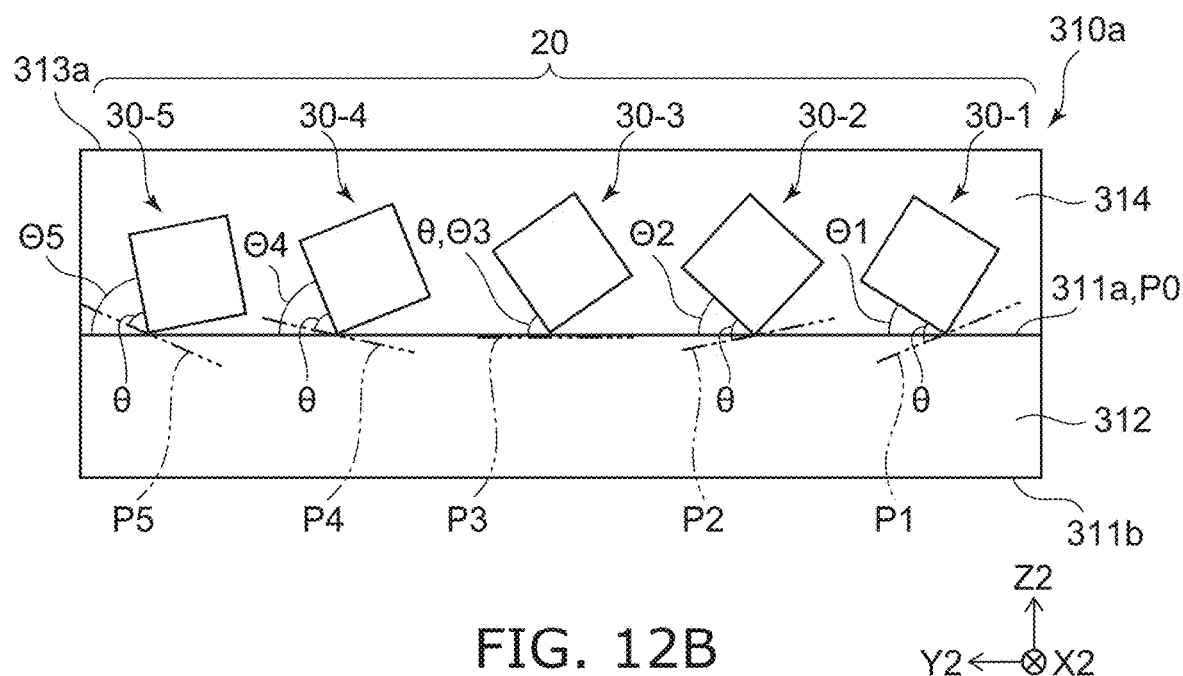
FIG. 12B is a schematic side view illustrating a portion, i.e., another modification of the imaging element, of the image display device according to the first embodiment.

FIG. 12B is a schematic side view illustrating a portion, i.e., another modification of the imaging element, of the image display device according to the first embodiment.

As long as the angles of the dihedral corner reflectors with respect to the virtual plane P0 can be set similarly to the imaging element 10 shown in FIG. 6, the reflector array 20 need not be formed on a curved surface, and may be provided on one plane.

Similarly to the description with reference to FIG. 11, FIGS. 12A and 12B are enlarged schematic illustrations of the five dihedral corner reflectors 30-1 to 30-5. The five dihedral corner reflectors 30-1 to 30-5 and their tilts corresponding to their positions are shown.

As shown in FIG. 12A, an imaging element 310 of the modification includes the reflector array 20 and a base member 312. The base member 312 includes the first surface 311a and a second surface 311b. The second surface 311b is positioned at the side opposite to the first surface 311a. The first surface 311a is a plane substantially parallel to the X2Y2-plane. The first surface 311a may be the virtual plane P0. Similarly to the example shown in FIG. 11, for example, the base member 312 is formed of a light-transmitting material.

The angles of the dihedral corner reflectors 30-1 to 30-5 with respect to the virtual plane P0 are respectively Θ1 to Θ5, and the sizes of the angles Θ1 to Θ5 are Θ1<Θ2<Θ3<Θ4<Θ5. The positions of the dihedral corner reflectors 30-1 to 30-5 in the Y2-axis are the same as the positions of the dihedral corner reflectors 30-1 to 30-5 in the Y2-axis shown in FIG. 11. Accordingly, for the tangent planes P1 to P5 of the circular arc corresponding to the positions in the Y2-axis of FIG. 11, the angles between the dihedral corner reflectors 30-1 to 30-5 and the tangent planes P1 to P5 all have the same value of the angle θ.

As shown in FIG. 12B, the imaging element 310a of the modification includes the reflector array 20 and the base member 312, and further includes a protective layer 314. The configurations of the reflector array 20 and the base member 312 are the same as those of the imaging element 310 described with reference to FIG. 12A. The protective layer 314 is provided to cover the reflector array 20 and the first surface 311a.

When the light rays are incident on the imaging element 310a via the protective layer 314, the protective layer 314 includes a material having high light transmissivity so that the transmitted amount of the light rays is substantially constant. It is favorable for a surface 313a of the protective layer 314 to be sufficiently flat so that the refraction angles of the incident light rays are substantially constant.

According to the modification, the base member 312 can be a flat plate, and so the thickness of the base member necessary to make the first surface and/or the second surface into a curved surface can be reduced; therefore, the imaging elements 310 and 310a can be thinned. The imaging element 310 shown in FIG. 12A is a member in which the reflector array 20 is formed at the first surface 311a of the base member 312, and the second surface 311b has a flat surface. Therefore, production by a press using a resin base member is favorable. Also, the production of the imaging element 310 is advantageous in that production by a roll-to-roll method is easy. The roll-to-roll method is a production technique in which a base member that is wound in a roll shape is continuously supplied to the process for patterning, processing, etc. The roll-to-roll method is widely utilized in the production of plate-shaped or film-like plastic molded products, etc.

The image display device 1000 according to the embodiment includes the imaging element 310*a* shown in FIG. 12B. The configuration is not limited thereto; the image display device may include any of the imaging elements 10 and 310 described above. The components of the imaging elements 10, 310, and 310*a* can be combined as appropriate. For example, the protective layer 314 may be provided at the first surface 11*a* side of the imaging element 10.

The operation of the imaging element, including the operation principle, will now be described. Unless otherwise noted hereinbelow, the imaging element 10 described with reference to FIGS. 6 to 11 will be described. The operations of the imaging elements 310 and 310*a* of the modifications can be understood similarly to the imaging element 10.

Figure 13:
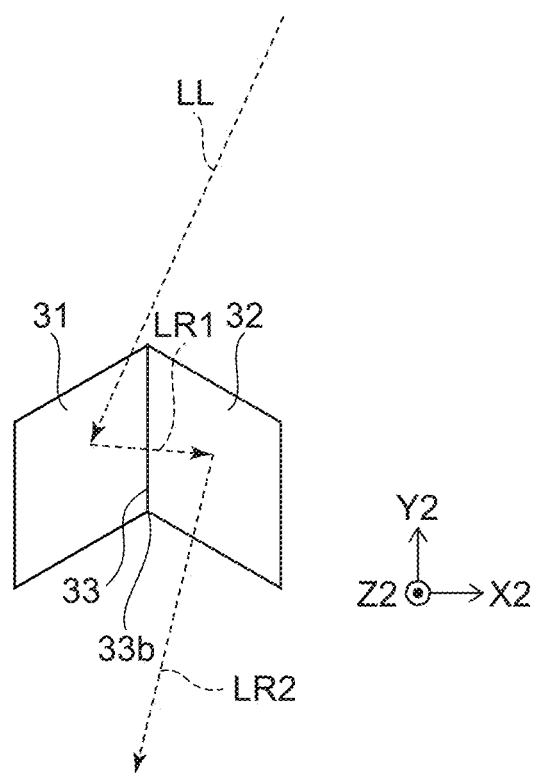
FIG. 13 is a schematic plan view for describing an operation of a portion, i.e., the imaging element, of the image display device according to the first embodiment.

FIG. 13 is a schematic plan view for describing a portion, i.e., an operation of the imaging element, of the image display device according to the first embodiment.

As shown in FIG. 13, the first reflecting surface 31 and the second reflecting surface 32 are provided to be substantially orthogonal and connected at the valley-side connecting line 33. The vertex 33*b* is provided to have a minimum value in the Z2-axis direction.

The light ray LL that is incident on the first reflecting surface 31 is reflected by the first reflecting surface 31. The once-reflected light LR1 that is reflected by the first reflecting surface 31 is reflected by the second reflecting surface 32. Unlike a corner cube reflector (e.g., Patent Literature 2), the dihedral corner reflector 30 does not include a third reflecting surface; therefore, the twice-reflected light LR2 that is reflected by the second reflecting surface 32 travels straight as-is. Here, the valley-side connecting line 33 is provided at a prescribed angle with respect to the X2Y2-plane; therefore, the twice-reflected light LR2 that is emitted from the dihedral corner reflector 30 is emitted toward the same side as the side at which the light ray LL is incident.

Figure 14:
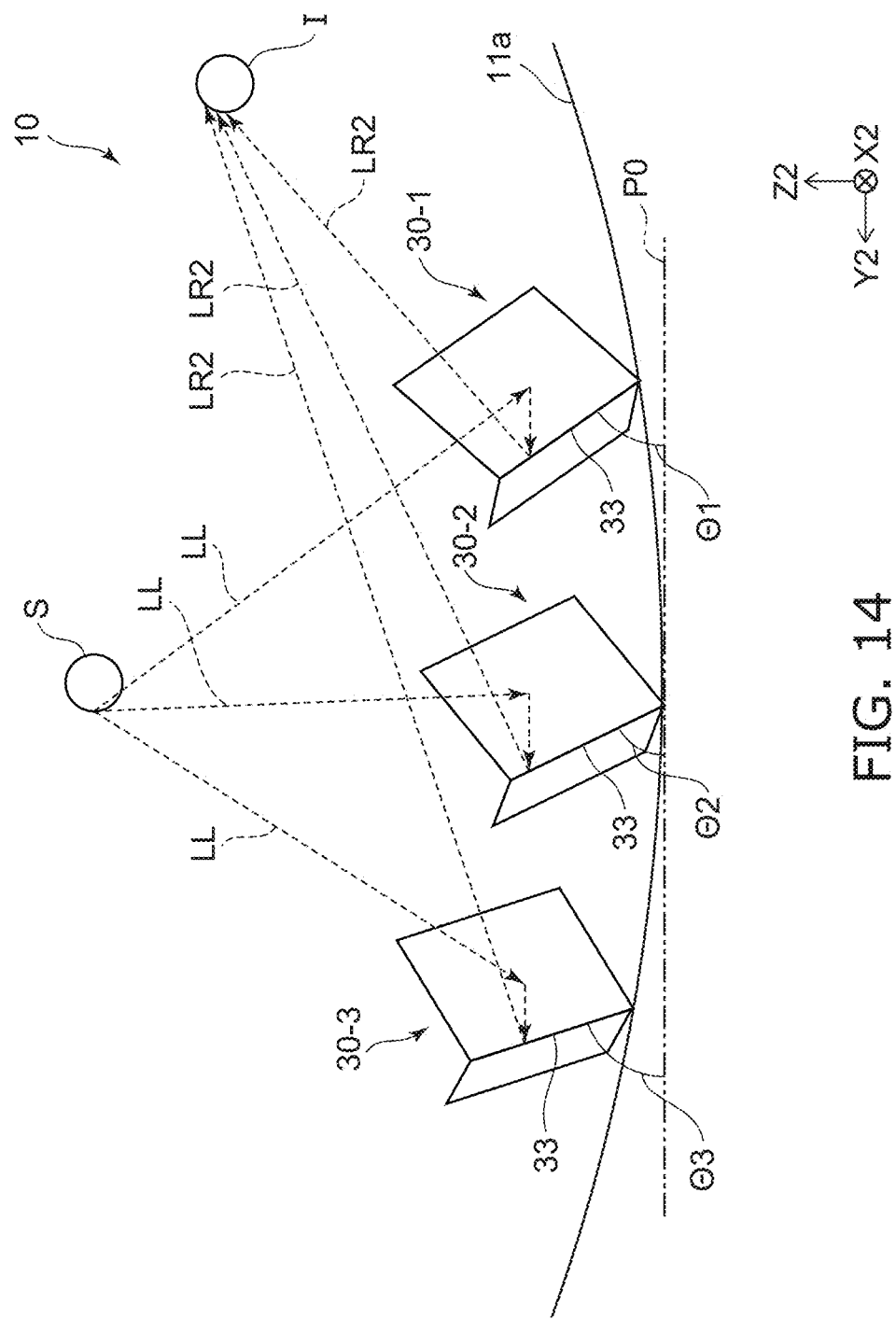
FIG. 14 is a schematic side view for describing the operation of a portion, i.e., the imaging element, of the image display device according to the first embodiment.
Figure 15:
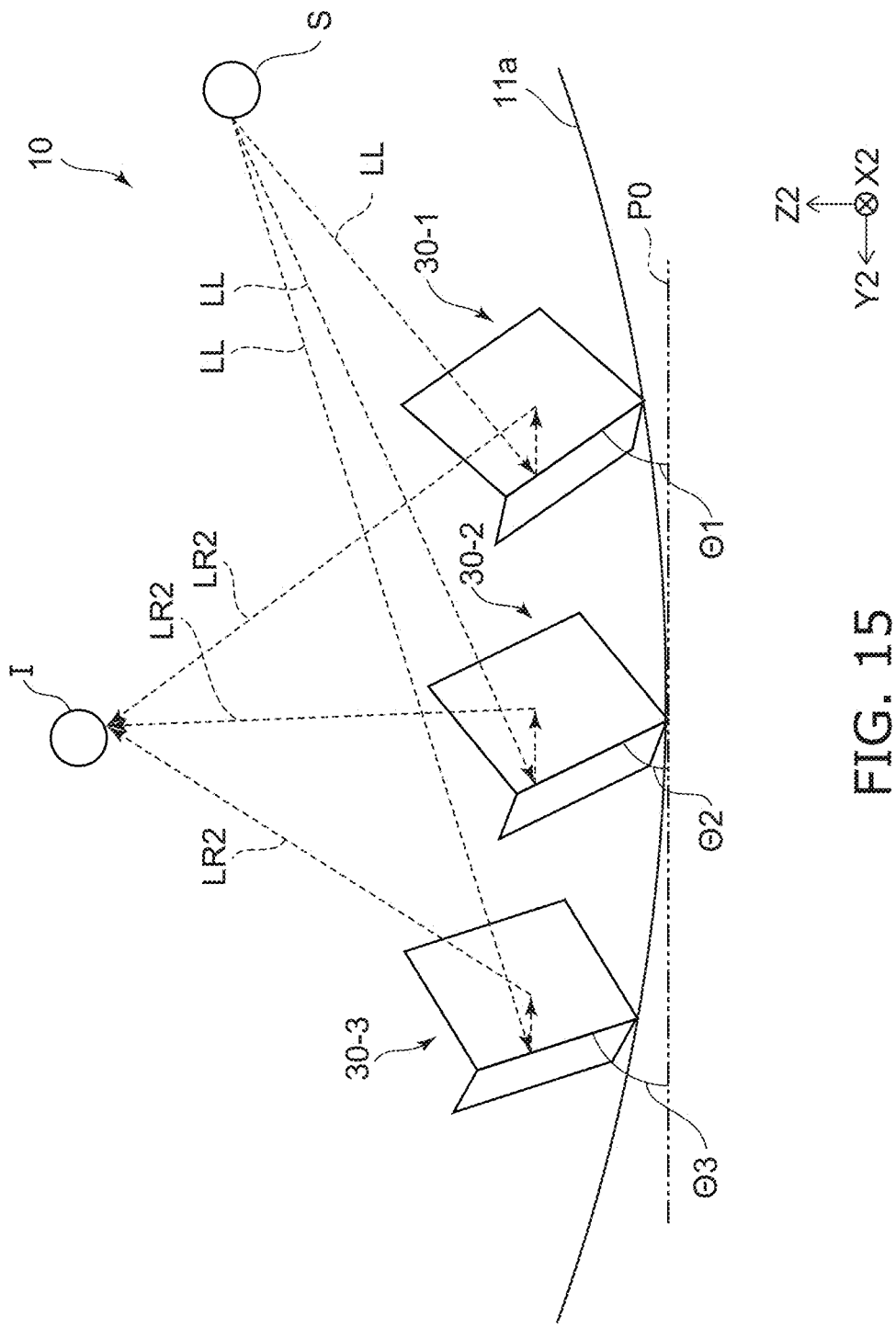
FIG. 15 is a schematic side view for describing the operation of a portion, i.e., the imaging element, of the image display device according to the first embodiment.

FIGS. 14 and 15 are schematic side views for describing a portion, i.e., an operation of the imaging element, of the image display device according to the first embodiment.

In the example of FIG. 14, a light source S is located in the normal direction of the virtual plane P0 at the first surface 11*a* side. In the imaging elements 310 and 310*a* of the modifications shown in FIGS. 12A and 12B, the light source is located in the normal direction of the first surface 311*a* at the first surface 311*a* side.

In the imaging element 10 as shown in FIG. 14, the first surface 11*a* is set to be a portion of a circular arc that is convex toward the negative Z2-axis side when projected onto the YZ-plane. The dihedral corner reflectors 30-1 to 30-3 are located on the first surface 11*a*. In the example shown in FIG. 14, the angles Θ1 to Θ3 that indicate the tilts of the dihedral corner reflectors 30-1 to 30-3 with respect to the virtual plane P0 are set to increase in the positive direction of the Y2-axis. Thus, by setting the angles Θ1 to Θ3, the twice-reflected light LR2 that is reflected twice by the dihedral corner reflector 30 forms a floating image I at the first surface 11*a* side at which the light source S is provided.

The imaging element 10 operates even when the position of the light source S and the position of the floating image I are interchanged.

In FIG. 15, the configurations of the dihedral corner reflectors 30-1 to 30-3 and the relationship of the dihedral corner reflectors 30-1 to 30-3, the first surface 11*a*, and the virtual plane P0 are the same as those described with reference to FIG. 14.

As shown in FIG. 15, the light source S is located at the position of the floating image I described with reference to FIG. 14; in such a case, the floating image I is formed at the position of the light source S in FIG. 14. The light rays LL that are emitted from the light source S each are reflected twice by the dihedral corner reflectors 30-1 to 30-3, and the twice-reflected light LR2 forms a floating image at the position of the floating image I. That is, in the example shown in FIG. 15, the floating image I is formed in the normal direction of the virtual plane P0 at the first surface 11*a* side. In the case of the imaging elements 310 and 310*a* according to the modification shown in FIGS. 12A and 12B, the floating image is formed in the normal direction of the first surface 311*a* at the first surface 311*a* side.

When the light source S is at either position, the angles of the dihedral corner reflectors can be appropriately set by using experiments, simulations, etc., to form the floating image at the desired position by reflecting the light ray incident on the dihedral corner reflector twice. For example, according to the embodiment shown in FIG. 14, the light source S is set to be substantially directly above the reflector array, and according to the embodiment shown in FIG. 15, the position at which the floating image I is formed is set to be substantially directly above the reflector array. It is also possible to appropriately modify the positions of the light source S and the floating image I by appropriately adjusting the angles of the dihedral corner reflectors with respect to the virtual plane P0. When making such a design modification, ray analysis tools such as ray tracing simulation, etc., can be effectively utilized.

In the image display device 1000 according to the embodiment, the floating image is formed directly above the reflector array. In such a case as well, it is possible to interchange the position of the display device 1100(S), which is the light source, and the position at which the floating image I is formed. For the image display device 1000 of FIG. 1, it goes without saying that if the position of the display device 1100(S) and the position at which the floating image is formed are interchanged, it is necessary to modify the configurations of the housing and the light-transmitting member according to the optical path after interchanging.

Effects of the image display device 1000 according to the embodiment will now be described.

The image display device 1000 according to the embodiment includes the imaging element 310*a*. In the imaging element 310*a* as shown in FIG. 8, FIG. 12B, etc., the angles of the dihedral corner reflectors 30 with respect to the virtual plane P0 are set to be greater than 0° and less than 90°. Also, the angles of the dihedral corner reflectors 30 with respect to the virtual plane P0 are set to be different according to the position at which the dihedral corner reflector 30 is located in the Y2-axial direction, are set to increase away from the dihedral corner reflector 30 of the reference position in one direction of the Y2-axial direction, and are set to decrease away from the dihedral corner reflector 30 in the other direction of the Y2-axial direction. By such a setting, the light ray from the first surface 311*a* side with respect to the base member 312 can be reflected twice, and a floating image can be formed at the first surface 311*a* side.

In the imaging element 310*a*, by appropriately setting the angles of the dihedral corner reflectors 30 with respect to the virtual plane P0, the display device 1100(S) can be located at any position at the first surface 311*a* side with respect to the base member 312, and the mid-air image I1 can be formed at the desired position directly above the reflector array.

Figure 16A:
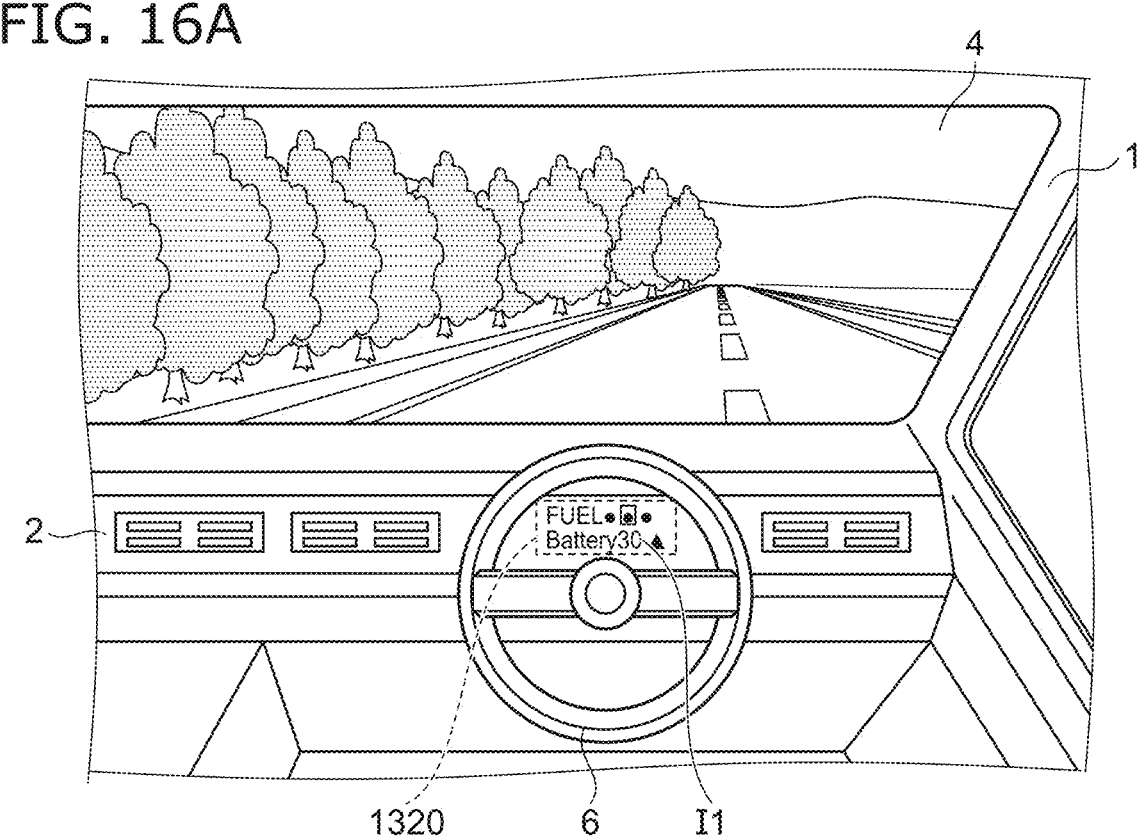
FIG. 16A is a schematic view for describing an operation of the image display device according to the first embodiment.
Figure 16B:
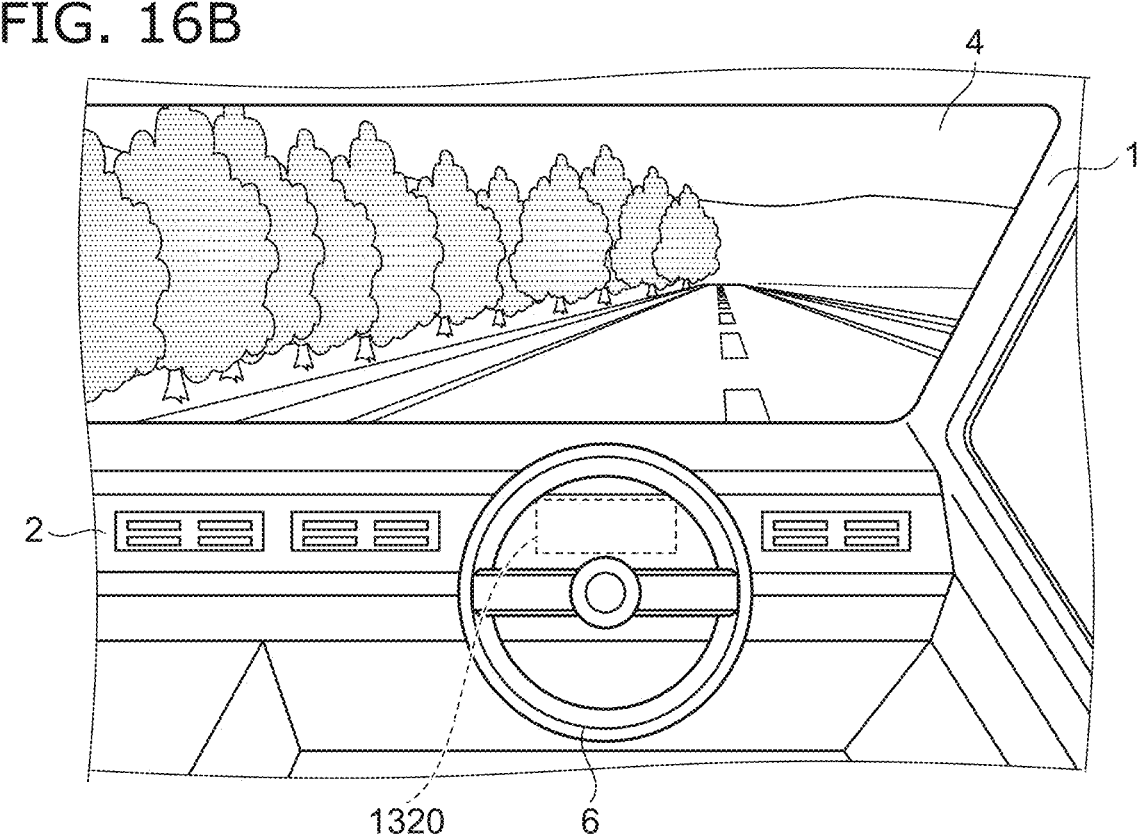
FIG. 16B is a schematic view for describing the operation of the image display device according to the first embodiment.

FIGS. 16A and 16B are schematic views for describing operations of the image display device according to the first embodiment.

The light that is emitted from the display device 1100(S) is reflected twice by the imaging element 310a to form a floating image in mid-air, and the image that is output by the display device 1100(S) is displayed in mid-air. Whether or not to display the image in mid-air is easily realized by controlling the output of the display device 1100(S). For example, the image display device 1000 is applicable to the display of an instrument panel of a vehicle.

FIGS. 16A and 16B schematically show visual information viewed by a driver seated on the driver's seat of the vehicle 1. The driver that is seated in the vehicle 1 drives the vehicle 1 while viewing the scene ahead through a front windshield 4. A dashboard 2 is located below the windshield 4, and the image display device 1000 shown in FIG. 1 is housed inside the dashboard 2. The light-transmitting member 1320 of the image display device 1000 is located in the dashboard 2 in front of the driver. In the example, the light-transmitting member 1320 has the same pattern as the dashboard 2.

As shown in FIG. 16A, information such as speed indication, fuel level, battery level, or the like is displayed in mid-air via the light-transmitting member 1320 as necessary. In the example, a steering wheel 6 is located in front of the driver, and the mid-air image I1 that is displayed in mid-air can be displayed at the dashboard 2 side of the steering wheel 6 or at the driver side of the steering wheel 6.

As shown in FIG. 16B, information such as speed indication and the like may not be displayed when unnecessary. By not displaying the mid-air image I1, for example, the driver can concentrate on driving. Or, by not displaying unnecessary information, a more comfortable space can be realized in automatic driving.

The display and non-display of the mid-air image I1 can be switched by, for example, an operation of the driver. The operation of the driver can be, for example, a button operation or key operation by the driver, driver voice recognition, etc. The display or non-display of the mid-air image I1 may be switched by another trigger. For example, when the information of the mid-air image I1 is the speed indication, the trigger can be when the speed reaches a prescribed speed. When the information of the mid-air image I1 is the fuel level and/or the battery level, the trigger can be when these remaining amounts reach a prescribed value or prescribed ratio. Such displays are examples; any information display can be appropriately set based on quantitative information that can be acquired.

The image display device 1000 according to the embodiment includes the infrared sensor 1431 and the control device 1410. The infrared sensor 1431 is located at a position at which a fingertip F1 of the operator O1 can be detected approaching the mid-air image I1. When the fingertip F1 approaches the image display device 1000, the infrared sensor 1431 generates the first signal D1 according to the approach of the operator O1 and outputs the first signal D1 to the control device 1410. The control device 1410 generates the second signal D2 in response to the first signal D1 and outputs the second signal D2 to the apparatus 8. Therefore, the mid-air image I1 functions as a switch for the operator O1 to perform an operation on the apparatus 8 by the second signal D2. By appropriately selecting the second signal D2, the mid-air image I1 can function not only as a switch, but also as another operation part of the apparatus 8.

By appropriately setting the display position of the mid-air image I1 and the detection position of the infrared sensor 1431, the detection is not limited to the fingertip F1 and may be performed using another detection object. The sensor is not limited to an infrared sensor and may be another sensor such as a camera or the like as long as the detection object that approached the mid-air image I1 can be detected.

The image display device 1000 according to the embodiment further includes the imaging part 1432. The imaging part 1432 is positioned to collect surrounding environmental information including the position at which the mid-air image I1 is formed. By imaging the mid-air image I1, the imaging part 1432 generates the data DE including environmental information that includes information related to the brightness around the mid-air image I1, and outputs the data DE to the control device 1410. Based on the data DE, the control device 1410 determines the brightness around the mid-air image I1, generates the command DO for selecting a reference image from the multiple reference images according to the brightness around the mid-air image I1, and outputs the command DO to the display controller 1416. The display controller 1416 sets the reference image according to the command DO, and the display device 1100(S) emits the light L that forms an image according to the reference image. Therefore, the operator O1 can clearly observe the mid-air image I1 regardless of the surrounding brightness.

When the imaging part 1432 generates the data DE including chromaticity information as well as the brightness, the control device 1410 determines the chromaticity around the mid-air image I1 from the data DE and sets the reference image to display the mid-air image I1 according to the chromaticity. Thus, the operator O1 can clearly observe the mid-air image I1 regardless of the chromaticity around the mid-air image I1.

Second Embodiment

Figure 17:
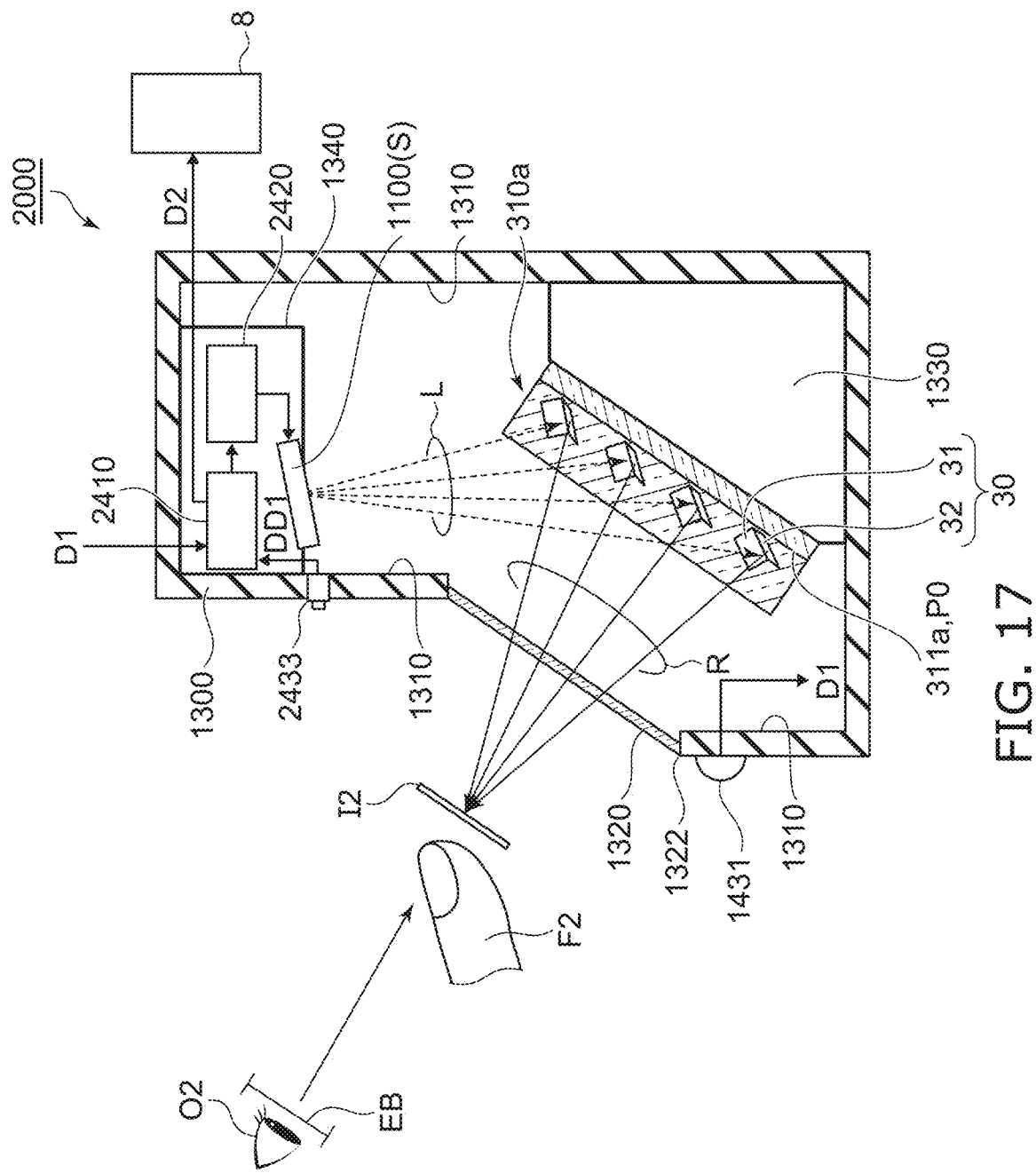
FIG. 17 is a schematic cross-sectional view illustrating an image display device according to a second embodiment.

FIG. 17 is a schematic cross-sectional view illustrating an image display device according to a second embodiment.

As shown in FIG. 17, the image display device 2000 according to the embodiment includes the display device 1100(S), the imaging element 310a, the infrared sensor 1431, an imaging part (a third sensor) 2433, a control device 2410, and a drive device 2420. The image display device 2000 according to the embodiment differs from the image display device 1000 according to the first embodiment in that the imaging part 2433 and the drive device 2420 are further included. The image display device 2000 differs from the image display device 1000 according to the first embodiment in that the control device 2410 is different from the control device 1410 of the image display device 1000. Otherwise, the components of the image display device 2000 according to the embodiment are the same as the components of the image display device 1000 according to the first embodiment; the same components are marked with the same reference numerals, and a detailed description is omitted as appropriate.

The imaging part 2433 is arranged to image an operator O2 of the image display device 2000. More specifically, the imaging part 2433 is arranged to continuously capture an image that includes an eyebox EB of the operator O2. For example, the imaging part 2433 is located at a portion of the front of the image display device 2000.

In the example shown in FIG. 17, the control device 2410, the drive device 2420, and the display device 1100(S) are located inside the display device mounting part 1340 located at the upper portion of the housing 1300. Because it is sufficient for the control device 2410 to be communicably connected with the drive device 2420, etc., the control device 2410 is not limited to being located inside the display device mounting part 1340 and may be located, for example, inside the imaging element mounting part 1330.

The imaging part 2433 is electrically connected to the control device 2410. The imaging part 2433 generates image data (first image data) DD1 including information of the position of the eyebox EB that includes the pupil of the operator O2, and outputs the generated image data DD1 to the control device 2410.

The drive device 2420 is mechanically connected with the display device 1100(S) and uses, for example, six-axis control to control the position at which the display device 1100(S) is located and the angle at which the display device 1100(S) emits the light L.

The drive device 2420 is electrically connected to the control device 2410. The drive device 2420 controls the position and angle of the display device 1100(S) based on the drive signal output by the control device 2410. The display position and display angle of a mid-air image I2 when forming the mid-air image I2 are changed by adjusting the position and angle of the display device 1100(S).

Operations of the image display device 2000 according to the embodiment will now be described.

In the image display device 2000 according to the embodiment, the imaging part 2433 generates the image data DD1 that includes information of the position of the eyebox EB of the operator O2. The imaging part 2433 outputs the generated image data DD1 to the control device 2410.

The control device 2410 performs image processing of the image data DD1 to detect the position of the eyebox EB. The control device 2410 generates a drive signal corresponding to the position of the eyebox EB and outputs the generated drive signal to the drive device 2420.

When the position of the eyebox EB is detected at a preset reference position, the control device 2410 generates the drive signal so that the display position and the display angle are those for when the operator O2 observes the mid-air image I2 straight-on.

When the position of the eyebox EB is detected toward the left, the control device 2410 generates the drive signal so that the display position and the display angle are those for when the operator O2 observes the mid-air image I2 from the left.

When the position of the eyebox EB is detected toward the right, the control device 2410 generates the drive signal so that the display position and the display angle are those for when the operator O2 observes the mid-air image I2 from the right.

The control device 2410 may detect the pupil position inside the eyebox EB. By detecting the pupil position inside the eyebox EB, the control device 2410 can determine the orientation of the line of sight of the operator O2. When the pupil position inside the eyebox EB is detected at substantially the center, the control device 2410 generates the drive signal so that the display position and the display angle are those for when the operator O2 observes the mid-air image I2 straight-on.

When the pupil position inside the eyebox EB is detected toward the left, the control device 2410 generates the drive signal so that the display position and the display angle are those for when the operator O2 observes the mid-air image I2 from the left.

When the pupil position inside the eyebox EB is detected toward the right, the control device 2410 generates the drive signal so that the display position and the display angle are those for when the operator O2 observes the mid-air image I2 from the right.

Figure 18A:
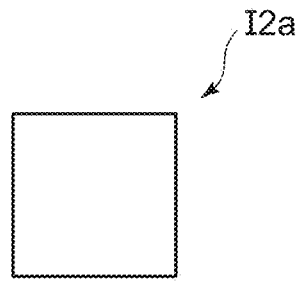
FIG. 18A is a schematic view illustrating a mid-air image displayed by the image display device according to the second embodiment.
Figure 18B:
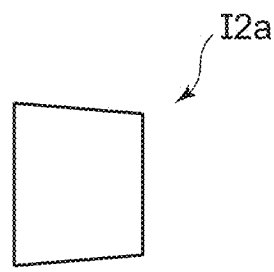
FIG. 18B is a schematic view illustrating a mid-air image displayed by the image display device according to the second embodiment.
Figure 18C:
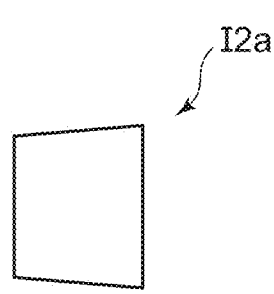
FIG. 18C is a schematic view illustrating a mid-air image displayed by the image display device according to the second embodiment.

FIGS. 18A to 18C are schematic views illustrating mid-air images displayed by the image display device according to the second embodiment.

FIGS. 18A to 18C show the appearance of the mid-air image I2 according to the pupil position inside the eyebox EB. The mid-air images I2 of FIGS. 18A to 18C are the display results of the same reference image. In the example, the reference image is a monochromatic square.

FIG. 18A shows the appearance of the mid-air image I2 when the operator O2 observes the mid-air image I2 straight-on. The imaging part 2433 detects the position of the eyebox EB at the preset reference position, and the control device 2410 generates the drive signal so that the reference image is output as-is.

FIG. 18B shows the appearance of the mid-air image I2 when the operator O2 observes the mid-air image I2 obliquely from the left. The imaging part 2433 detects the position of the eyebox EB to be toward the left, and the control device 2410 generates the drive signal so that the left side of the mid-air image I2 is tilted toward the operator O2 side and the right side of the mid-air image I2 is tilted toward the image display device 2000 side when viewed from the operator O2.

FIG. 18C shows the appearance of the mid-air image I2 when the operator O2 observes the mid-air image I2 obliquely from the right. The imaging part 2433 detects the position of the eyebox EB to be toward the right, and the control device 2410 generates the drive signal so that the right side of the mid-air image I2 is tilted toward the operator O2 side and the left side of the mid-air image I2 is tilted toward the image display device 2000 side when viewed from the operator O2.

Although these examples are of the appearance from obliquely left and right, the appearance can be reproduced from each direction such as obliquely vertically, upper left, lower right, etc., by generating the drive signal according to the position of the eyebox EB.

Although FIGS. 18A to 18C show examples when the reference image is a two-dimensional shape, the reference image may be a three-dimensional shape.

Figure 19A:
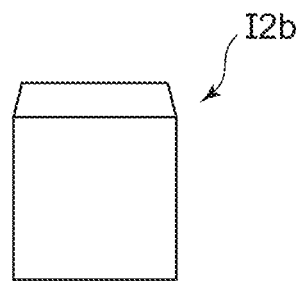
FIG. 19A is a schematic view illustrating a mid-air image displayed by the image display device according to the second embodiment.
Figure 19B:
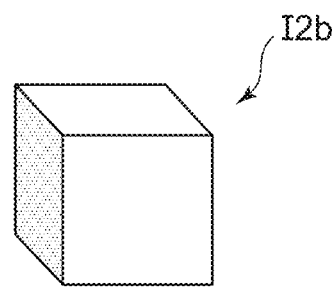
FIG. 19B is a schematic view illustrating a mid-air image displayed by the image display device according to the second embodiment.
Figure 19C:
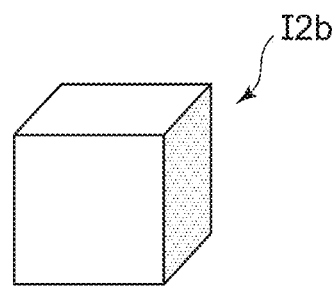
FIG. 19C is a schematic view illustrating a mid-air image displayed by the image display device according to the second embodiment.

FIGS. 19A to 19C are examples when the reference image is a cube.

FIG. 19A shows the appearance when the operator O2 views the mid-air image I2, i.e., the cube, from obliquely upward and the front.

FIG. 19B shows the appearance when the operator O2 views the mid-air image I2, i.e., the cube, from obliquely upward and the left side.

FIG. 19C shows the appearance when the operator O2 views the mid-air image I2, i.e., the cube, from obliquely upward and the right side.

In FIGS. 19A to 19C, similarly to the examples shown in FIGS. 18A to 18C, the control device 2410 generates the drive signal according to each position of the pupil inside the eyebox EB.

When displaying a circular mid-air image I2, a two-dimensional mid-air image is not very realistic because the shape merely deforms. Therefore, by using a sphere as the mid-air image I2, the change of the appearance due to the viewing direction can be expressed without diminishing the sense of realism.

Figure 20A:
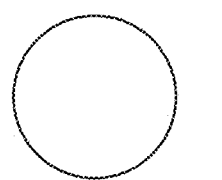
FIG. 20A is a schematic view illustrating a mid-air image displayed by the image display device according to the second embodiment.
Figure 20A:
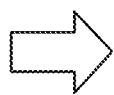
Figure 20A:
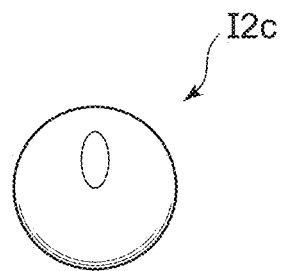
Figure 20B:
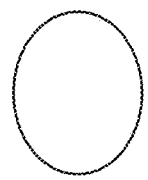
FIG. 20B is a schematic view illustrating a mid-air image displayed by the image display device according to the second embodiment.
Figure 20B:
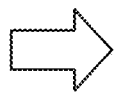
Figure 20B:
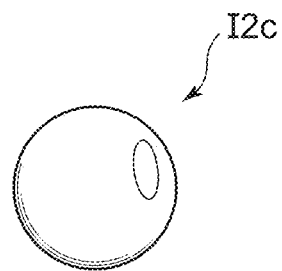
Figure 20C:
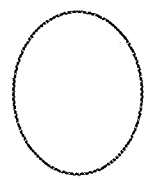
FIG. 20C is a schematic view illustrating a mid-air image displayed by the image display device according to the second embodiment.
Figure 20C:
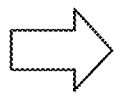
Figure 20C:
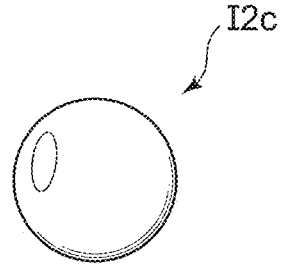

FIGS. 20A to 20C are schematic views illustrating mid-air images displayed by the image display device according to the second embodiment.

In each of FIGS. 20A to 20C, the drawing at the left side of the arrow shows when a two-dimensional shape is used, and the drawing at the right side of the arrow shows when a three-dimensional shape is used.

FIG. 20A illustrates the appearance when the operator O2 views the mid-air image I2 from the front.

FIG. 20B illustrates the appearance when the operator O2 views the mid-air image I2 obliquely from the left.

FIG. 20C illustrates the appearance when the operator O2 views the mid-air image I2 obliquely from the right.

Thus, by making the two-dimensional circular mid-air image three-dimensional, the appearance of the mid-air image I2 can be expressed with a sense of realism.

Similarly to the image display device 1000 according to the first embodiment, the image display device 2000 according to the embodiment operates as an operation signal generation device for the apparatus 8. In other words, the image display device 2000 uses the infrared sensor 1431 to detect the approach of a fingertip F2 and outputs the second signal D2 for the operation of the apparatus to the apparatus 8. The apparatus 8 is operated, etc., according to the second signal D2.

Effects of the image display device 2000 according to the embodiment will now be described.

The image display device 2000 according to the embodiment provides effects similar to those of the image display device 1000 according to the first embodiment. The image display device 2000 also provides the following effects. Namely, the image display device 2000 includes the imaging part 2433, and the imaging part 2433 generates the image data DD1 including information of the position of the eyebox EB that includes the pupil position of the operator O2. The control device 2410 detects the position of the eyebox EB based on the image data DD1 and generates the drive signal corresponding to the position of the eyebox EB. The image display device 2000 includes the drive device 2420 that controls the position at which the display device 1100(S) is located and the angle at which the light is emitted by the display device 1100(S) according to the drive signal. The image display device 2000 can deform and display the mid-air image I2 according to the position of the eyebox EB so that an operator O3 can observe the mid-air image I2 with a sense of realism.

Similar effects can be obtained by applying the configuration of the image display device according to the embodiment to the image display devices 1000 and 2000 according to the first and second embodiments described above. Also, similar effects can be obtained by applying the configuration of the image display device according to the embodiment to image display devices according to other embodiments described below.

Third Embodiment

Figure 21:
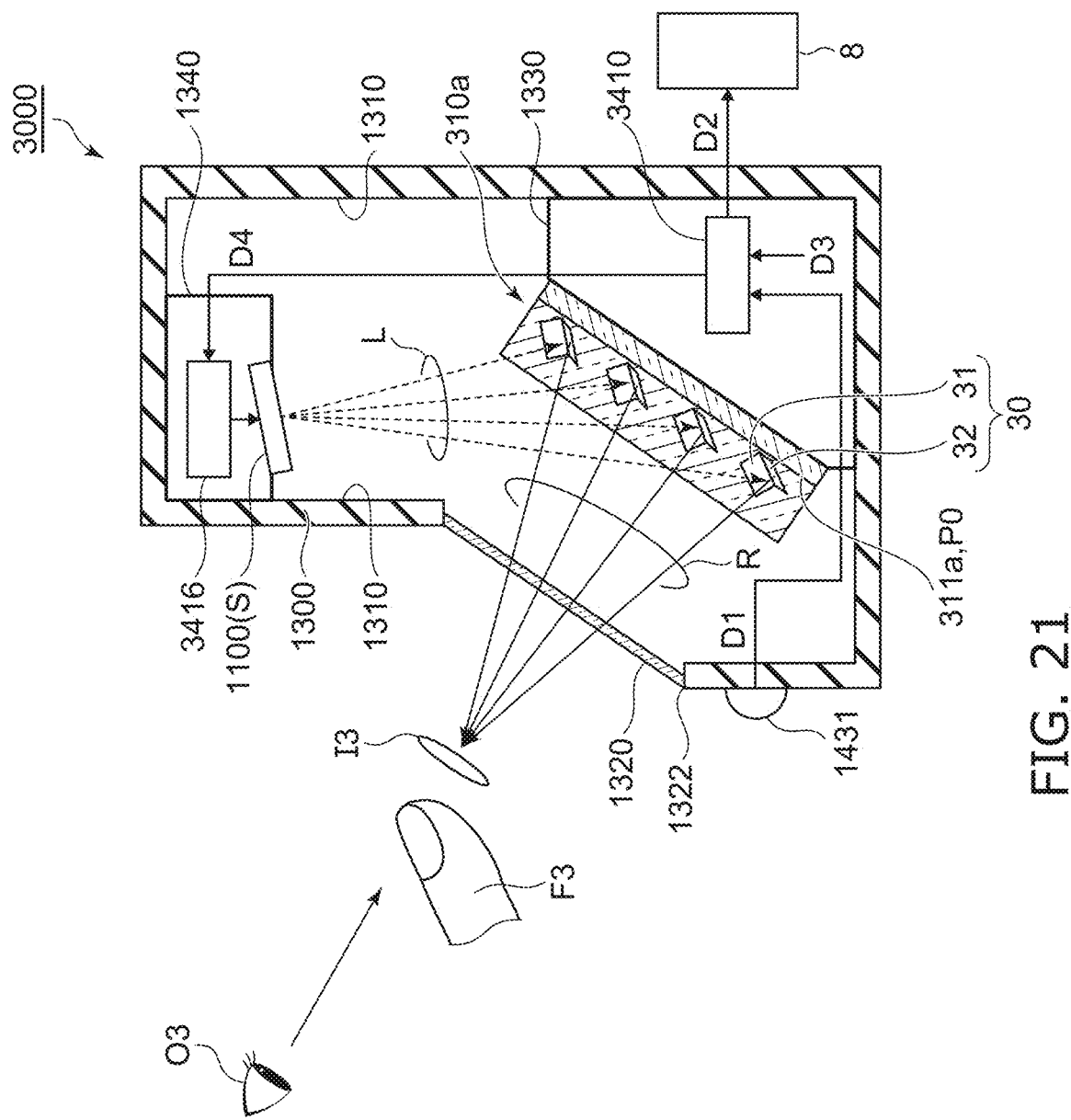
FIG. 21 is a schematic cross-sectional view illustrating an image display device according to a third embodiment.

FIG. 21 is a schematic cross-sectional view illustrating an image display device according to a third embodiment.

As shown in FIG. 21, the image display device 3000 according to the embodiment includes the display device 1100(S), the imaging element 310*a*, the infrared sensor 1431, a control device 3410, and a display controller 3416. The image display device 3000 according to the embodiment differs from the image display device 1000 according to the first embodiment in that the control device 3410 and the display controller 3416 are included. Otherwise, the components of the image display device 3000 according to the embodiment are the same as the components of the image display device 1000 according to the first embodiment, the same components are marked with the same reference numerals, and a detailed description is omitted as appropriate.

In the example of FIG. 21, the display controller 3416 is located inside the display device mounting part 1340 together with the display device 1100(S). It is sufficient for the display controller 3416 to be communicably connected with the control device 3410 and the display device 1100(S), and the display controller 3416 may be located in another location. Although the control device 3410 also is located inside the imaging element mounting part 1330, the control device 3410 may be located in another location.

The display controller 3416 is connected to the control device 3410. The display controller 3416 includes reference images for a mid-air image I3. The reference images are set as video image data. The display controller 3416 displays the mid-air image I3 as a video image by causing the display device 1100(S) to emit the light L forming the video image.

The control device 3410 receives input of a third signal D3 before the input of the first signal D1. For example, the third signal D3 is generated and output to the control device 3410 when the operator O3 is detected to be seated on a seat located in front of the image display device 3000. The control device 3410 generates a fourth signal D4 according to the input of the third signal D3 and outputs the fourth signal D4 to the display controller 3416.

The display controller 3416 causes the display device 1100(S) to output the light L to form a video image according to the input of the fourth signal D4.

Subsequently, the infrared sensor 1431 generates the first signal D1 indicating the approach of a fingertip F3 to the mid-air image I3, and the first signal D1 is output to the control device 3410. The control device 3410 generates the second signal D2 according to the input of the first signal D1 and outputs the second signal D2 to the apparatus 8.

Specific examples of the mid-air image I3 displayed as a video image will now be described.

FIGS. 22A to 22D are schematic views illustrating mid-air images displayed by the image display device according to the third embodiment.

FIGS. 22A to 22D show examples of video images MI3*a* to MI3*d* of four types of mid-air images I3, and each of the video images MI3*a* to MI3*d* shows the continuous change of the shape of the image as a time t elapses, and ends with the display of the mid-air image I3.

Figure 22A:
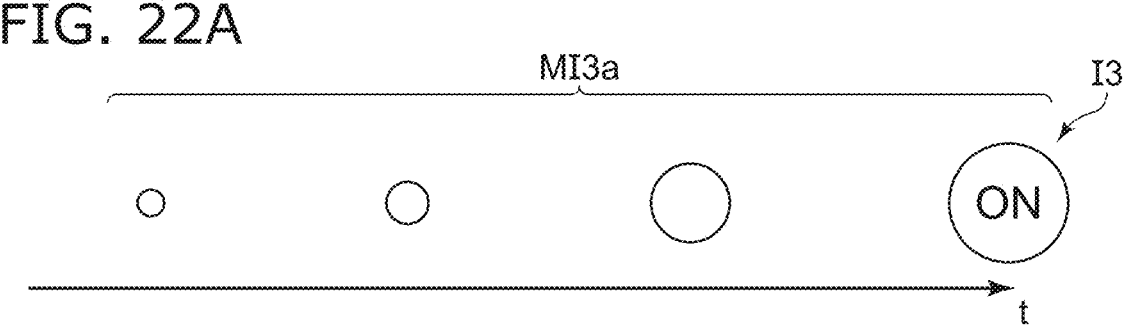
FIG. 22A is a schematic view illustrating a mid-air image displayed by the image display device according to the third embodiment.

In the video image MI3*a* of FIG. 22A, the diameter of the circle increases as the time t elapses.

Figure 22B:
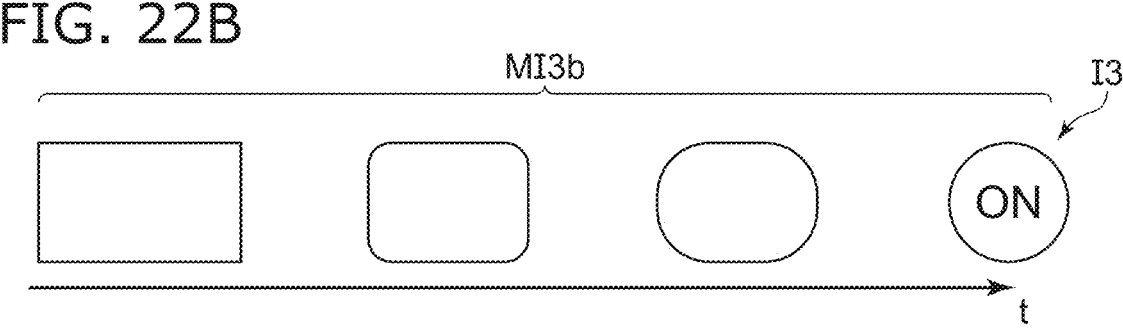
FIG. 22B is a schematic view illustrating a mid-air image displayed by the image display device according to the third embodiment.

In the video image MI3*b* of FIG. 22B, the corners of a rectangle gradually approach circular as the time t elapses.

Figure 22C:
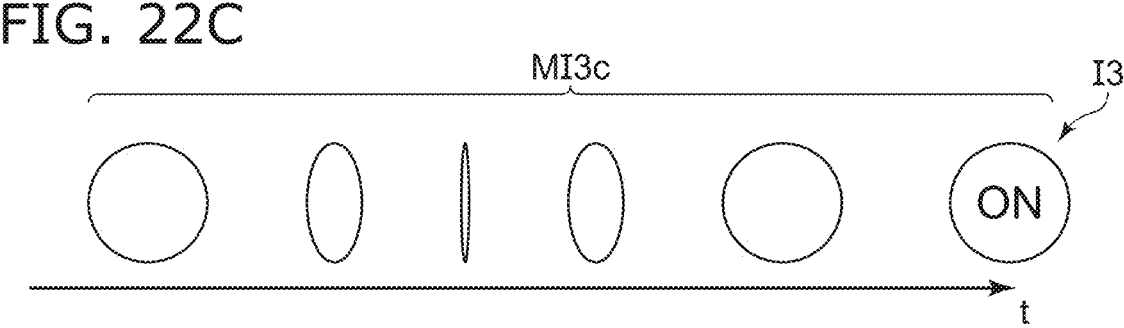
FIG. 22C is a schematic view illustrating a mid-air image displayed by the image display device according to the third embodiment.

In the video image MI3*c* of FIG. 22C, a circle rotates around an axis in the radial direction as the time t elapses.

Figure 22D:
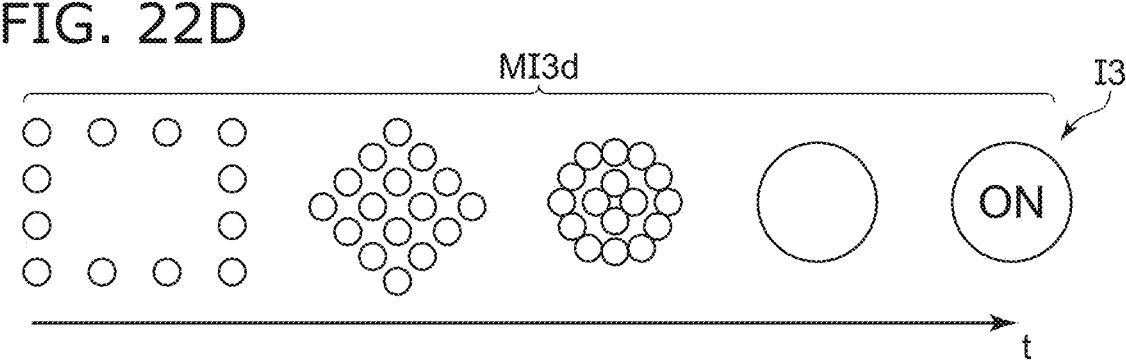
FIG. 22D is a schematic view illustrating a mid-air image displayed by the image display device according to the third embodiment.

In the video image MI3*d* of FIG. 22D, small circles repeatedly disperse and converge as the time t elapses, and finally return to a circle.

In addition to the specific examples described above, the size of the figure may be repeatedly increased and reduced, the color may be changed, or the figure may flash. Also, a sound and/or voice may be output according to the video image being shown.

Effects of the image display device 3000 according to the embodiment will now be described.

The image display device 3000 according to the embodiment provides effects similar to those of the image display device 1000 according to the first embodiment. The image display device 3000 also provides the following effects. Namely, the image display device 3000 includes the display controller 3416 that can show a video image, and the display controller 3416 begins showing the video image based on the third signal generated before the first signal D1 generated by the infrared sensor 1431. By using a video image as the mid-air image, the operator O3 can more clearly recognize the presence of the mid-air image I3.

Fourth Embodiment

The image that is displayed as the mid-air image is not limited to a simple figure such as those described above, and can be more complex figures, characters, symbols, etc. The image display device according to the embodiment can have a configuration similar to that of the image display device 1000 according to the first embodiment.

FIGS. 23A to 23D are schematic views illustrating mid-air images displayed by the image display device according to the fourth embodiment.

FIGS. 23A to 23D show examples in which the content of operations on the apparatus 8 shown in FIG. 1 are illustrated by figures illustrated in the mid-air image displayed by the image display device according to the fourth embodiment. These figures are called icons.

Figure 23A:
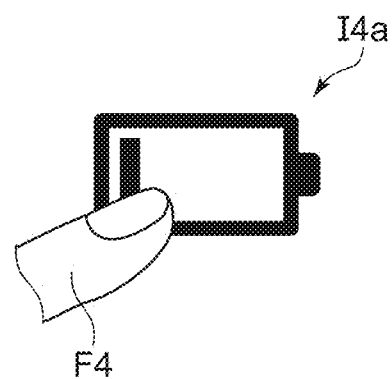
FIG. 23A is a schematic view illustrating a mid-air image displayed by an image display device according to a fourth embodiment.
Figure 23B:
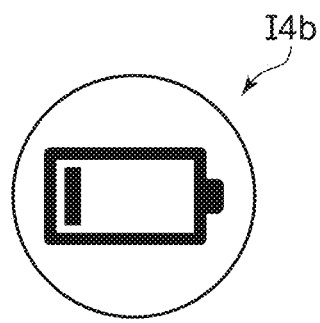
FIG. 23B is a schematic view illustrating a mid-air image displayed by the image display device according to the fourth embodiment.

FIGS. 23A and 23B are examples when icons illustrating the battery level are used as mid-air images I4a and I4b. FIG. 23A also shows a fingertip F4 of the operator in order to show the size of the mid-air image I4a. Thus, there are many cases where the mid-air image is not much larger than the fingertip F4, and a simplified shape is better when displaying a complex shape such as an icon. For comparison with the example of FIG. 23A, FIG. 23B shows the mid-air image I4b in which the icon is overlayed on a circle that represents a switch. When a complex figure is used as the mid-air image as shown in FIGS. 23A and 23B, it is favorable to simplify the figure as in the mid-air image I4a of FIG. 23A.

Figure 23C:
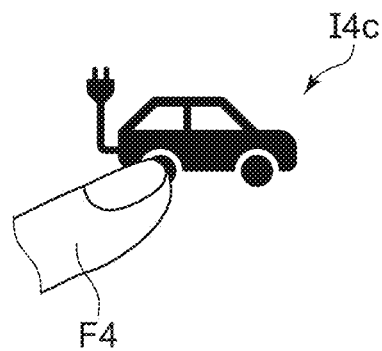
FIG. 23C is a schematic view illustrating a mid-air image displayed by the image display device according to the fourth embodiment.
Figure 23D:
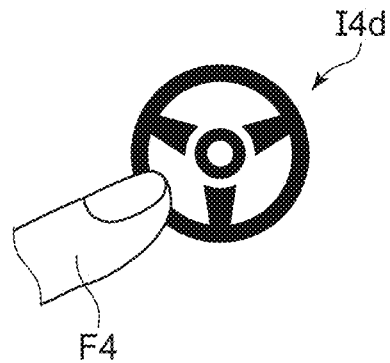
FIG. 23D is a schematic view illustrating a mid-air image displayed by the image display device according to the fourth embodiment.

FIGS. 23C and 23D are other examples when icons are used as mid-air images I4c and I4d. By using only icons as the mid-air images I4c and I4d, clearer mid-air images I4c and I4d can be displayed even for images of complex shapes.

FIGS. 24A to 24D are schematic views illustrating mid-air images displayed by the image display device according to the fourth embodiment.

FIGS. 24A to 24D show examples in which character strings are used to display the content of the operation on the apparatus 8 shown in FIG. 1.

Figure 24A:
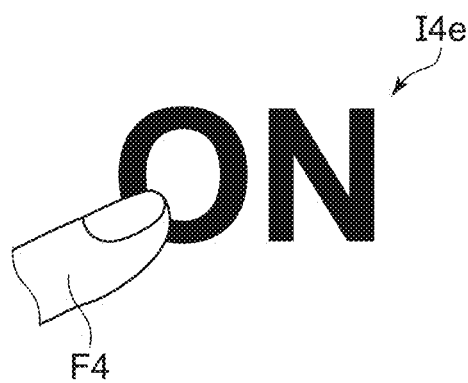
FIG. 24A is a schematic view illustrating a mid-air image displayed by the image display device according to the fourth embodiment.
Figure 24B:
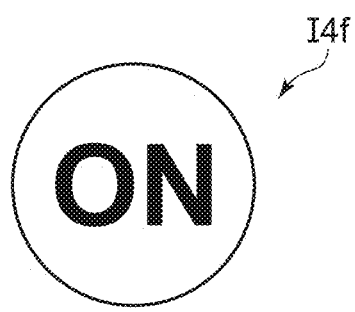
FIG. 24B is a schematic view illustrating a mid-air image of a comparative example.

FIGS. 24A and 24B are examples of mid-air images I4e and I4f that represent a power supply switch. Similarly to the examples of FIGS. 23A and 23B, by overlaying a circle representing a switch on characters, the configuration of the mid-air image I4f may become more complex as shown in FIG. 24B, and the display easily becomes unclear. As shown in FIG. 24A, the mid-air image I4e can be displayed more clearly by using only characters to illustrate the function of the mid-air image I4e as a switch.

Figure 24C:
FIG. 24C is a schematic view illustrating a mid-air image displayed by the image display device according to the fourth embodiment.

FIG. 24C is another example of the mid-air image I4g that uses characters, in which the display of the mid-air image I4g can be clearer than when other complex figures are overlayed.

Figure 24D:
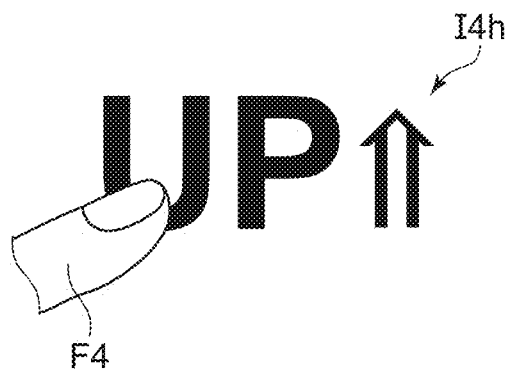
FIG. 24D is a schematic view illustrating a mid-air image displayed by the image display device according to the fourth embodiment.

FIG. 24D is an example in which the simple figure of an arrow is used with characters as the mid-air image I4h. When the characters impart much information, the clarity can be maintained and the operator can reliably recognize the information related to the mid-air image by arranging a simple figure with the characters without overlapping.

Effects of the image display device according to the embodiment will now be described.

The image display device according to the embodiment provides effects similar to those of the image display device 1000 according to the first embodiment. The image display device according to the embodiment also provides the following effects. Namely, the image display device can display more complex figures, characters, and symbols that include icons as the mid-air image. By displaying complex figures, characters, and symbols as solitary mid-air images without overlapping other figures having simple shapes, the information can be reliably communicated to the operator while maintaining a clear display.

Similar effects can be obtained by applying the configuration of the image display device according to the embodiment to the image display devices 1000 to 3000 according to the first to third embodiments described above. Similar effects can be obtained by applying the configuration of the image display device according to the embodiment to image display devices according to other embodiments described below.

Fifth Embodiment

Figure 25:
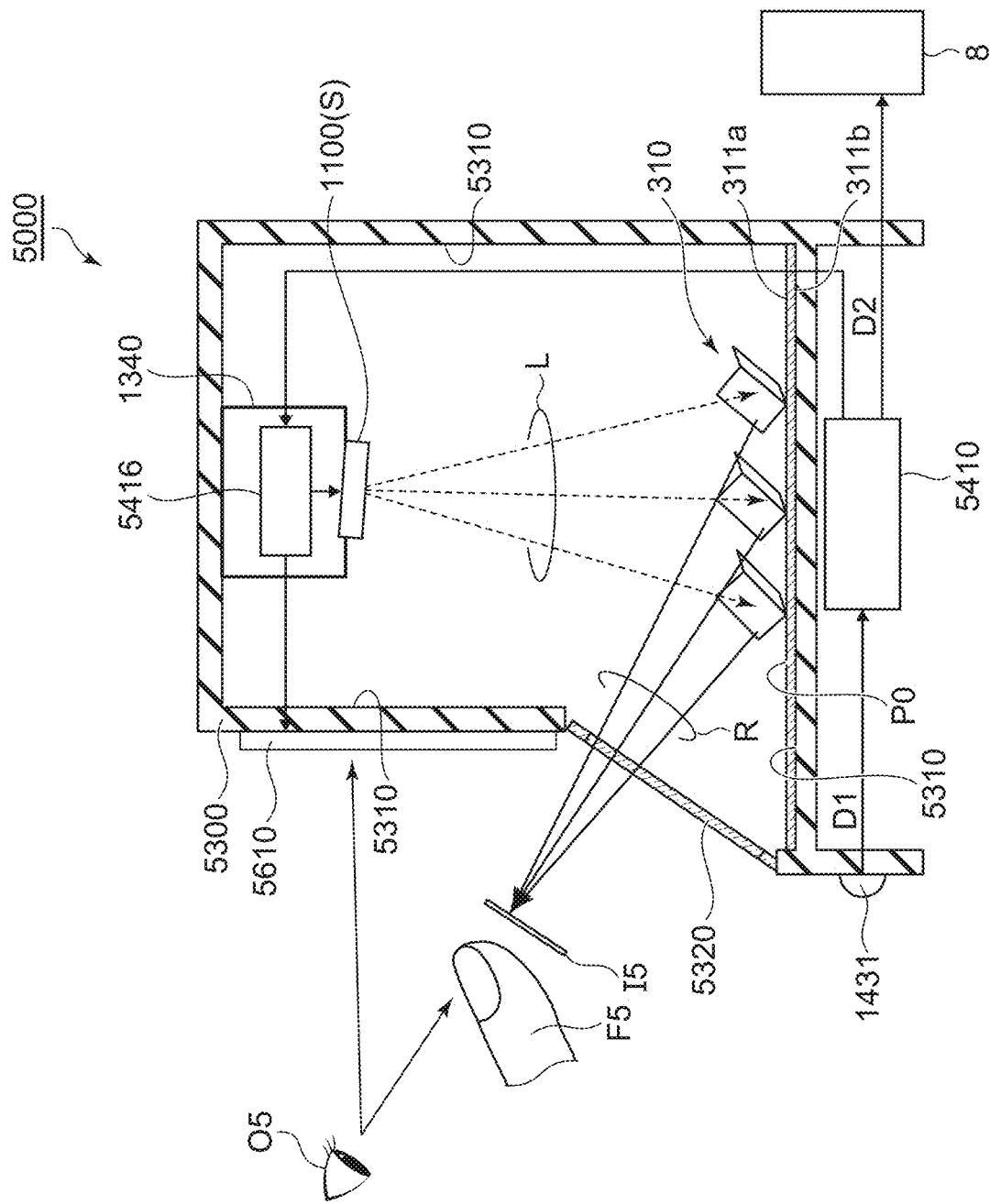
FIG. 25 is a schematic cross-sectional view illustrating an image display device according to a fifth embodiment.

FIG. 25 is a schematic cross-sectional view illustrating an image display device according to a fifth embodiment.

As shown in FIG. 25, the image display device 5000 according to the embodiment includes the display device 1100(S), the imaging element 310, the infrared sensor 1431, a control device 5410, an auxiliary display device 5610, and a display controller 5416. The image display device 5000 according to the embodiment differs from the image display device 1000 according to the first embodiment in that the auxiliary display device 5610 is included. The image display device 5000 differs from the image display device 1000 in that the display controller 5416 is different from the image display device 1000. The arrangement of the display device 1100(S) and the imaging element 310 of the image display device 5000 is different from that of the image display device 1000 according to the first embodiment. The image display device 5000 differs from the image display device 1000 in that the imaging element 310 is different from the imaging element 310a of the image display device 1000. Otherwise, the components of the image display device 5000 according to the embodiment are the same as the components of the image display device 1000 according to the first embodiment, the same components are marked with the same reference numerals, and a detailed description is omitted as appropriate.

The auxiliary display device 5610 is positioned so that an operator O5 can view the auxiliary display device 5610 while viewing a mid-air image I5. In the example of FIG. 25, the auxiliary display device 5610 is located at a portion of the front outside a housing 5300, and is positioned to face the operator O5 positioned in front of the image display device 5000.

The auxiliary display device 5610 is, for example, a liquid crystal display and is connected to the display controller 5416. In addition to the reference image for the display of the mid-air image I5, the display controller 5416 includes display data displayed by the auxiliary display device 5610. When displaying the mid-air image I5, for example, the display controller 5416 displays prescribed display data simultaneously with the display of the mid-air image I5.

The control device 5410 generates the second signal D2 according to the first signal D1 generated by the infrared sensor 1431 and outputs the second signal D2 to the apparatus 8. The control device 5410 generates a command related to the display of the auxiliary display device 5610 according to the first signal D1 and outputs the command to the display controller 5416. For example, the command related to the display of the auxiliary display device 5610 determines the content of the display of the auxiliary display device 5610 or modifies the content of the display of the auxiliary display device 5610 according to the first signal D1.

Based on the command from the control device 5410, the display controller 5416 sets the display content of the auxiliary display device 5610 and causes the auxiliary display device 5610 to display the display content.

The display data that is displayed by the auxiliary display device 5610 provides the operator O5 with more detailed information to supplement the information represented by the mid-air image I5.

Figure 26A:
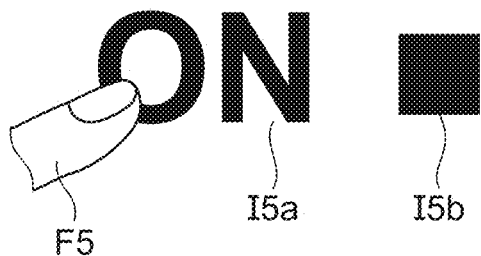
FIG. 26A is a schematic view illustrating a mid-air image and an image of an operation auxiliary display device displayed by the image display device according to the fifth embodiment.
Figure 26B:
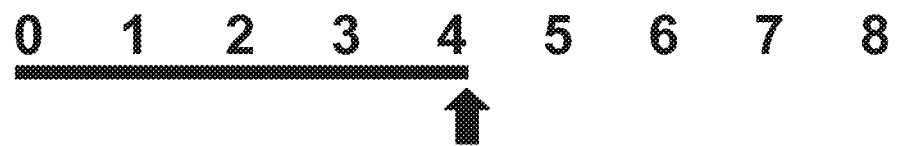
FIG. 26B is a schematic view illustrating a mid-air image and an image of an operation auxiliary display device displayed by the image display device according to the fifth embodiment.
Figure 26B:
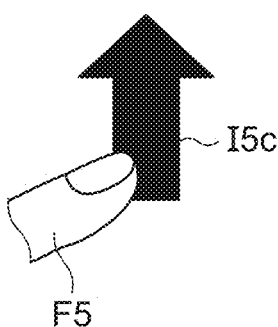

FIGS. 26A and 26B are schematic views illustrating a mid-air image and an image of the operation auxiliary display device displayed by the image display device according to the fifth embodiment.

The screen of the auxiliary display device 5610 is shown at the top of FIGS. 26A and 26B. In both FIGS. 26A and 26B, characters are used to display detailed information in the screen of the auxiliary display device 5610.

FIG. 26A shows a fingertip F5 of the operator operating one of mid-air images I5*a* and I5*b*, and a description for the mid-air image I5*a* and a description for the mid-air image I5*b* are displayed in the screen of the auxiliary display device 5610.

The infrared sensor 1431 generates the first signal D1 to indicate whether the fingertip F5 is at the position of the mid-air image I5*a* or at the position of the mid-air image I5*b*, and outputs the first signal D1 to the control device 5410. The control device 5410 generates the second signal D2 according to the first signal D1 and outputs a command to the display controller 5416. For example, when the fingertip F5 approaches the mid-air image I5*a*, the command for the display controller 5416 is a command to enhance the display of the auxiliary display device 5610 corresponding to the mid-air image I5*a*. For example, the control device 5410 generates a command to flash the display of the characters "ON" displayed in the auxiliary display device 5610.

FIG. 26B shows the fingertip F5 of the operator operating the mid-air image I5*c*, and the function of the mid-air image I5*c* is displayed in the screen of the auxiliary display device 5610.

The infrared sensor 1431 generates the first signal D1 corresponding to the movement of the fingertip F5 and outputs the first signal D1 to the control device 5410. The control device 5410 generates the second signal D2 according to the first signal D1 and outputs a command to the display controller 5416. The command for the display controller 5416 is, for example, a command indicating the lateral position to which the fingertip F5 moved when approaching the mid-air image I5*c*. The control device 5410 determines whether the fingertip F5 moved to a position at the left or right, and outputs a command corresponding to the position of the fingertip to the display controller 5416. The display controller 5416 causes the auxiliary display device 5610 to display the positions of the arrow and bar displayed in the auxiliary display device 5610 according to the command.

Figure 27:
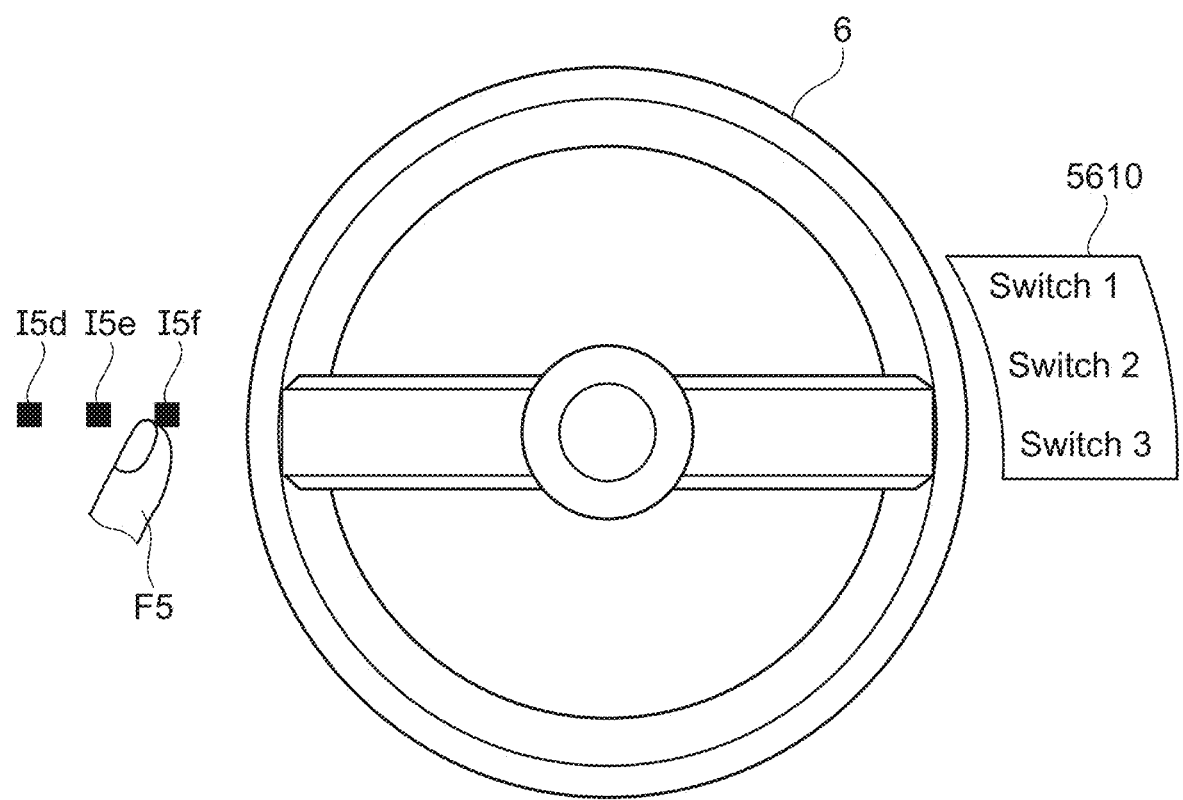
FIG. 27 is a schematic view illustrating a mid-air image and an image of an operation auxiliary display device displayed by the image display device according to the fifth embodiment.

FIG. 27 is a schematic view illustrating a mid-air image and an image of an operation auxiliary display device displayed by the image display device according to the fifth embodiment.

FIG. 27 shows the image display device 5000 mounted in a vehicle and used as an information display at the left and right of the steering wheel 6 of the vehicle. In the example of FIG. 27, the image display device 5000 displays the mid-air images I5*a* to I5*c* at the left side of the steering wheel 6, and displays the functions of the mid-air images I5*a* to I5*c* in the screen of the auxiliary display device 5610 at the right side of the steering wheel.

The description continues now by returning to FIG. 25.

The imaging element 310 of the image display device 5000 is different from the imaging element 310*a* of the other embodiments described above. As described with reference to FIGS. 12A and 12B, any configuration of the imaging elements 10, 310, and 310*a* can be provided as the imaging element according to the space inside the housing, the mounting location of the image display device, etc.

In the image display device 5000, the display device 1100(S) is located directly above the imaging element 310. Therefore, the light L that is emitted by the display device 1100(S) is irradiated on the imaging element 310 by traveling downward. A portion of the light incident on the imaging element 310 is reflected twice by the dihedral corner reflector and emitted as the reflected light R. A light-transmitting member 5320 is positioned to transmit the reflected light R reflected twice by the imaging element 310.

Light that is reflected only once by the dihedral corner reflector of the imaging element 310 and light that is not reflected by the dihedral corner reflector escape toward the second surface 311*b* side through the spacing 23 between the adjacent reflector rows 22 shown in FIG. 6. Accordingly, the imaging element 310 does not emit light other than the twice-reflected light toward the first surface 311*a* side. Therefore, in the image display device 5000, the spacing 23 between the adjacent reflector rows 22 is provided in the imaging element 310 because the display device 1100(S) used as the light source is located in the normal direction of the first surface 311*a* of the imaging element 310.

In the example, a light-shielding member 5310 is provided at the bottom surface inside the housing 5300 so that the light that escapes toward the second surface 311*b* does not become stray light by being re-reflected inside the housing 5300. The light-shielding member 5310 also is provided at the sidewall surface inside the housing 5300. Similarly to the light-shielding member 1310 shown in FIG. 1, the light-shielding member 5310 is, for example, a coated film of a black coating material formed at the bottom surface and wall surface of the housing 5300. The light-shielding member 5310 is sufficiently thin compared to the thickness of the constituent material of the housing 5300 and is therefore illustrated as a surface inside the housing 5300 in FIG. 25.

In the image display device 5000 according to the embodiment, the imaging element 310 emits only the twice-reflected light R of the incident light L, and does not reflect the other light toward the first surface 311*a* side. Therefore, as described with reference to FIG. 14, the imaging element 310 suppresses the formation of a ghost image other than the real image at the first surface 311*a* side.

Effects of the image display device 5000 according to the embodiment will now be described.

The image display device 5000 according to the embodiment provides effects similar to those of the image display device 1000 according to the first embodiment. The image display device 5000 also provides the following effects. Namely, the image display device 5000 according to the embodiment includes the auxiliary display device 5610 and the display controller 5416. The auxiliary display device 5610 is a display device such as a liquid crystal display, etc., and fine characters, figures, etc., can be clearly displayed by setting prescribed display data in the display controller 5416. Even when it is difficult to include detailed information in the mid-air image, the auxiliary display device 5610 can provide a clear display without reducing the overall amount of information. Therefore, the operator O5 can easily utilize the image display device 5000.

Similar effects can be obtained by applying the configuration of the image display device according to the embodiment to the image display devices according to the first to fourth embodiments described above. Similar effects can be obtained by applying the configuration of the image display device according to the embodiment to image display devices according to other embodiments described below.

In the image display device 5000 according to the embodiment, the display device 1100(S) is located directly above the imaging element 310 in the normal direction of the first surface 311a, and the twice-reflected light of the imaging element 310 is emitted and forms a floating image at the side of the imaging element 310. Therefore, the display of a ghost image other than the real image can be prevented.

In the image display device according to the embodiment, the display device, which is the light source, may be arranged to form a mid-air image directly above the imaging element as in the image display device 1000 shown in FIG. 1.

According to the first to fourth embodiments described above and sixth to ninth embodiments described below, the display of ghosts may be prevented by locating the display device directly above the imaging element. By such an arrangement, effects similar to those of the image display device 5000 according to the embodiment can be obtained even according to the first to fourth embodiments and the sixth to ninth embodiments described below.

Sixth Embodiment

Figure 28:
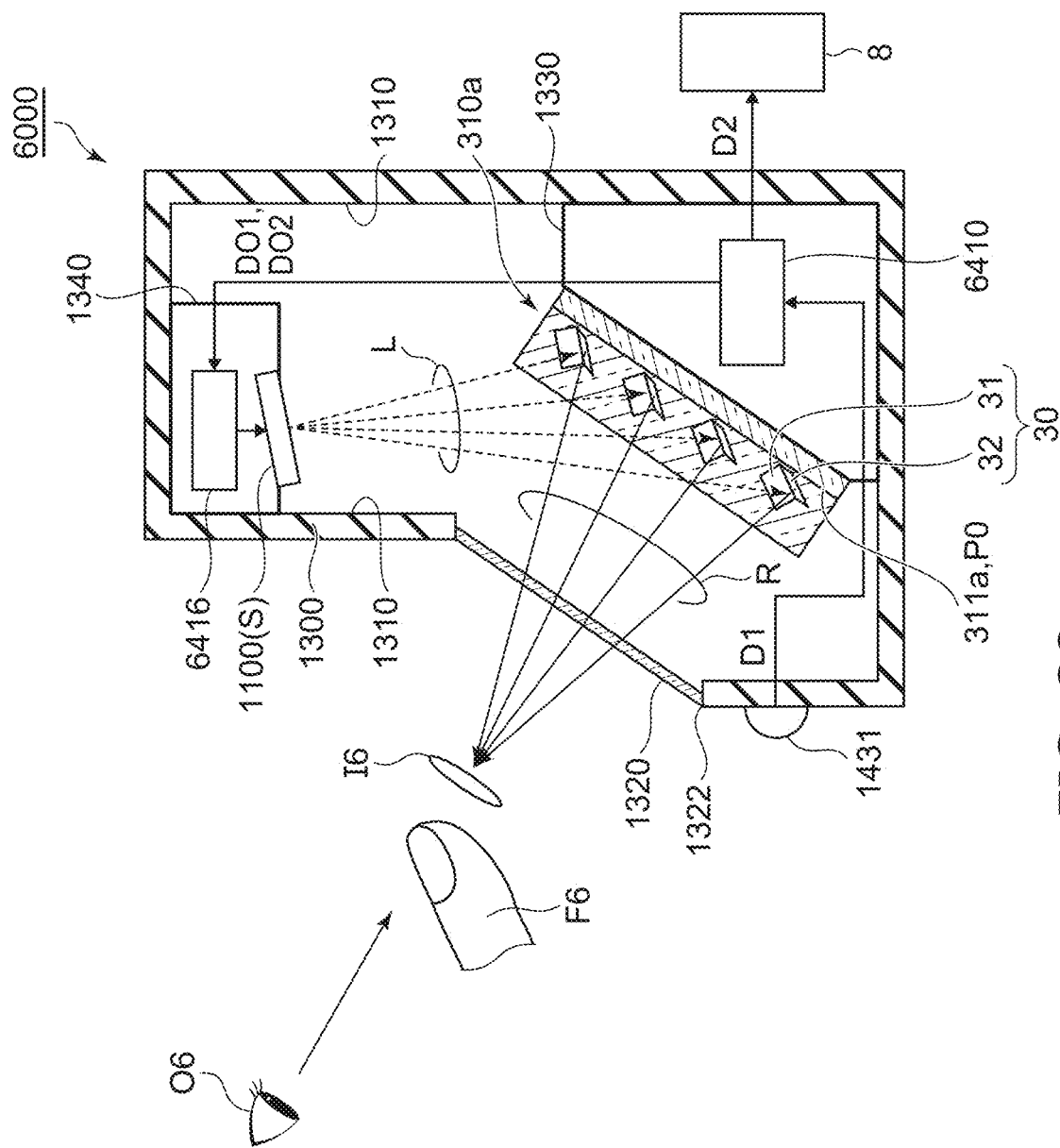
FIG. 28 is a schematic cross-sectional view illustrating an image display device according to a sixth embodiment.

FIG. 28 is a schematic cross-sectional view illustrating an image display device according to a sixth embodiment.

As shown in FIG. 28, the image display device 6000 according to the embodiment includes the display device 1100(S), the imaging element 310a, the infrared sensor 1431, a control device 6410, and a display controller 6416. The image display device 6000 according to the embodiment differs from the image display device 1000 according to the first embodiment in that the control device 6410 is different from the control device 1410 of the image display device 1000 according to the first embodiment, and the display controller 6416 is different from the display controller 1416 of the image display device 1000. Otherwise, the components of the image display device 6000 are the same as the components of the image display device 1000, the same components are marked with the same reference numerals, and a detailed description is omitted as appropriate.

Similarly to the example shown in FIG. 1, for example, the infrared sensor 1431 is positioned so that the approach of a fingertip F6 of an operator O6 to the position at which a mid-air image I6 is formed can be detected. The display device 1100(S), the imaging element 310a, the control device 6410, and the display controller 6416 are located inside the housing 1300. The control device 6410 is located inside the imaging element mounting part 1330, and the display controller 6416 is located inside the display device mounting part 1340; however, the control device 6410 and the display controller 6416 may be located at any position as long as the control device 6410 and the display controller 6416 are connected with the apparatus 8 mounted outside the display device 1100(S), the infrared sensor 1431, and the image display device 6000.

The infrared sensor 1431 is connected to the control device 6410. The control device 6410 is connected to the display controller 6416. The display controller 6416 is connected to the display device 1100(S).

The display controller 6416 includes multiple reference images corresponding respectively to multiple mid-air images. Based on a command from the control device 6410, the display controller 6416 selects one of the multiple reference images and emits the light L to form an image using the selected reference image.

When the first signal D1 is not received from the infrared sensor 1431, the control device 6410 outputs, to the display controller 6416, a command DO1 to select the initial reference image. When the first signal D1 is received, the control device 6410 outputs, to the display controller 6416, a command DO2 to select a reference image indicating a response has occurred. Similarly to the example shown in FIG. 1, when the first signal D1 is received, the control device 6410 generates the second signal D2 and outputs the second signal D2 to the apparatus 8.

FIGS. 29A to 29D are schematic views illustrating mid-air images displayed by the image display device according to the sixth embodiment.

Figure 29A:
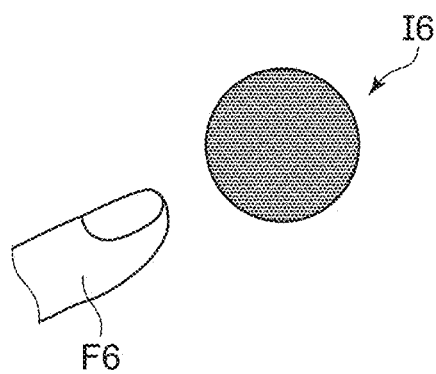
FIG. 29A is a schematic view illustrating a mid-air image displayed by the image display device according to the sixth embodiment.
Figure 29B:
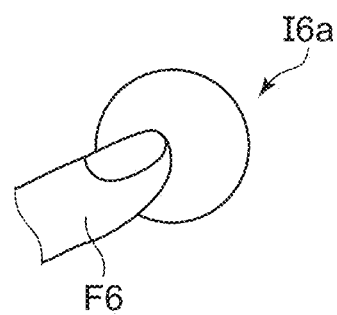
FIG. 29B is a schematic view illustrating a mid-air image displayed by the image display device according to the sixth embodiment.
Figure 29C:
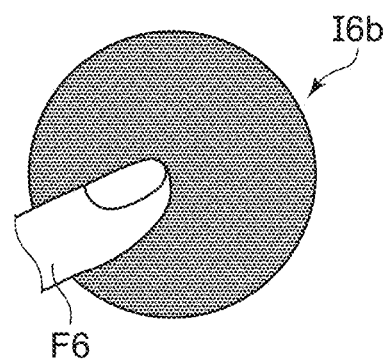
FIG. 29C is a schematic view illustrating a mid-air image displayed by the image display device according to the sixth embodiment.
Figure 29D:
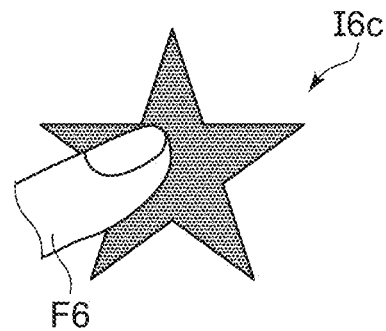
FIG. 29D is a schematic view illustrating a mid-air image displayed by the image display device according to the sixth embodiment.

FIG. 29A shows an example of the mid-air image I6 displayed based on an initial reference image. FIGS. 29B to 29D show examples of mid-air images I6a to I6c displayed based on reference images selected in response to the fingertip F6 approaching the mid-air image I6 shown in FIG. 29A.

Based on the initial reference image of FIG. 29A, the mid-air image I6 represents a circular switch and is set to be colored red. The mid-air image I6a based on a reference image selected by the response shown in FIG. 29B expresses the response of the switch by coloring the circular switch white. The mid-air image I6b based on a reference image selected by the response shown in FIG. 29C expresses the response of the switch by increasing the size of the circular switch. The mid-air image I6c based on a reference image selected by the response shown in FIG. 29D expresses the response of the switch by changing the shape of the switch to a star shape.

The control device 6410 may output a command to switch the reference image in response to the first signal D1 and may perform other response operations. For example, the control device 6410 may output a touch sound or voice in response to the first signal D1, or may generate, for example, a vibration in the seat in which the operator O6 is seated and/or the steering wheel operated by the operator O6 so that the operator O6 perceives the response.

Effects of the image display device 6000 according to the embodiment will now be described.

The image display device 6000 according to the embodiment provides effects similar to those of the image display device 1000 according to the first embodiment. The image display device 6000 according to the embodiment also provides the following effects. Namely, in the image display device 6000, the display device 1100(S) emits the light L to form an image based on a reference image selected from multiple reference images corresponding respectively to multiple mid-air images. When the first signal D1 is not input, the control device 6410 selects an initial reference image from the multiple reference images and outputs the initial reference image to the display device 1100(S). In response to the input of the first signal D1, the control device 6410 selects a different reference image from the initial reference image and outputs the reference image to the display device 1100(S). In response to the first signal D1, the control device 6410 generates the second signal D2 and outputs the second signal D2 to the apparatus 8. Because the first signal D1 can be generated by the fingertip F6 or the like approaching the mid-air image I6 based on the initial reference image, the operator O6 can operate the apparatus 8 by operating the mid-air image I6, and the operator O6 can visually perceive the operation of the apparatus 8 due to the change of the mid-air image.

Similar effects can be obtained by applying the configuration of the image display device according to the embodiment to the image display devices according to the first to fifth embodiments described above. Similar effects can be obtained by applying the configuration of the image display device according to the embodiment to image display devices according to other embodiments described below.

Seventh Embodiment

Figure 30:
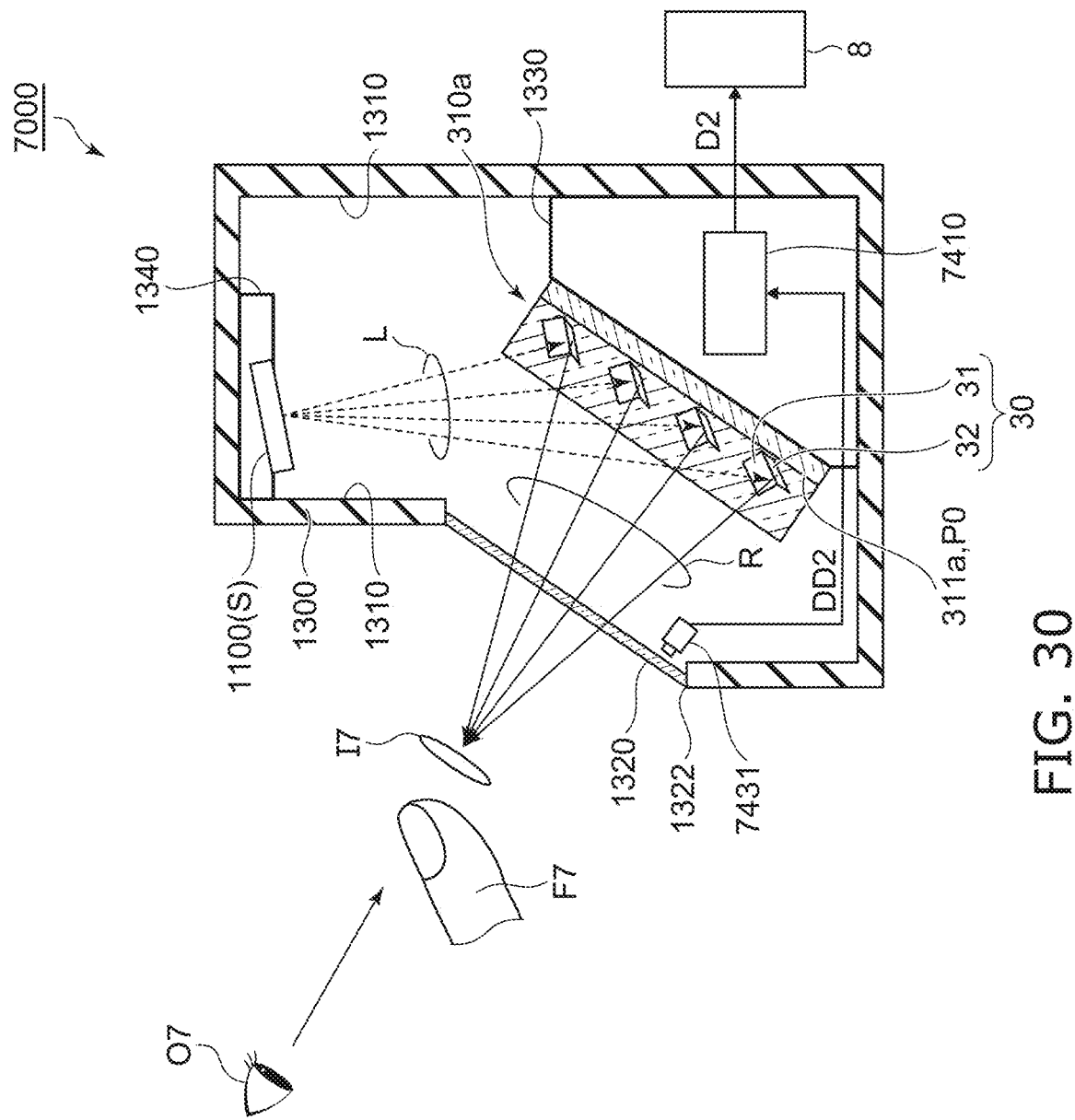
FIG. 30 is a schematic cross-sectional view illustrating an image display device according to a seventh embodiment.

FIG. 30 is a schematic cross-sectional view illustrating an image display device according to a seventh embodiment.

As shown in FIG. 30, the image display device 7000 according to the embodiment includes the display device 1100(S), the imaging element 310a, an imaging part (a first sensor) 7431, and a control device 7410. The image display device 7000 according to the embodiment differs from the image display device 1000 according to the first embodiment in that the imaging part 7431 and the control device 7410 are included. Otherwise, the components of the image display device 7000 are the same as the components of the image display device 1000, the same components are marked with the same reference numerals, and a detailed description is omitted as appropriate.

The imaging part 7431 is arranged to image a fingertip F7 of an operator O7 approaching a mid-air image I7 in the state in which the mid-air image I7 is displayed. The optical system of the imaging part 7431 is set to be focused at the position at which the mid-air image I7 is displayed.

More specifically, the imaging part 7431 successively images the fingertip F7, successively generates image data (second image data) DD2 including the image of the fingertip F7, and successively outputs the image data DD2 to the control device 7410.

The control device 7410 determines whether or not the imaging part 7431 is focused on the fingertip F7 by performing image processing of the input image data. For example, the control device 7410 can use the fingerprint of the fingertip F7 to determine whether or not the fingertip F7 is in focus. When the fingerprint of the fingertip F7 is determined to be in focus, the control device 7410 generates the second signal D2 and outputs the second signal D2 to the apparatus 8.

The control device 7410 may be configured to connect to a database for fingerprint authentication. When the image of the fingerprint of the fingertip F7 is determined to be in focus, the control device 7410 can access the database of fingerprint authentication and perform fingerprint authentication by comparing the fingerprint. For example, the control device 7410 generates the second signal D2 when the fingerprint is authenticated, and does not generate the second signal D2 when the fingerprint is not authenticated. Instead of fingerprint authentication or in addition to fingerprint authentication, the control device 7410 may cooperate with other personal authentication systems. Personal authentication systems include, for example, face authentication, voice print authentication, iris authentication, vein authentication, etc. The control device 7410 displays the mid-air image I7 when the operator O7 is authenticated by the personal authentication system.

Effects of the image display device 7000 according to the embodiment will now be described.

The image display device 7000 according to the embodiment provides effects similar to those of the image display device 1000 according to the first embodiment. The image display device 7000 according to the embodiment also provides the following effects. Namely, the image display device 7000 includes the imaging part 7431 that continuously images the detection object such as the fingertip F7 or the like and generates image data. The control device 7410 determines whether or not the image of the fingertip F7 is in focus by performing image processing of the image data DD2 including the image of the fingertip F7. By setting the position of the focal point of the image of the fingertip F7 to be the position at which the mid-air image I7 is displayed, the operation of the apparatus 8 can be realized by the fingertip F7 operating the mid-air image I7.

Similar effects can be obtained by applying the configuration of the image display device according to the embodiment to the image display device according to the first to sixth embodiments described above. Similar effects can be obtained by applying the configuration of the image display device according to the embodiment to an image display device according to a ninth embodiment described below.

Eighth Embodiment

Figure 31:
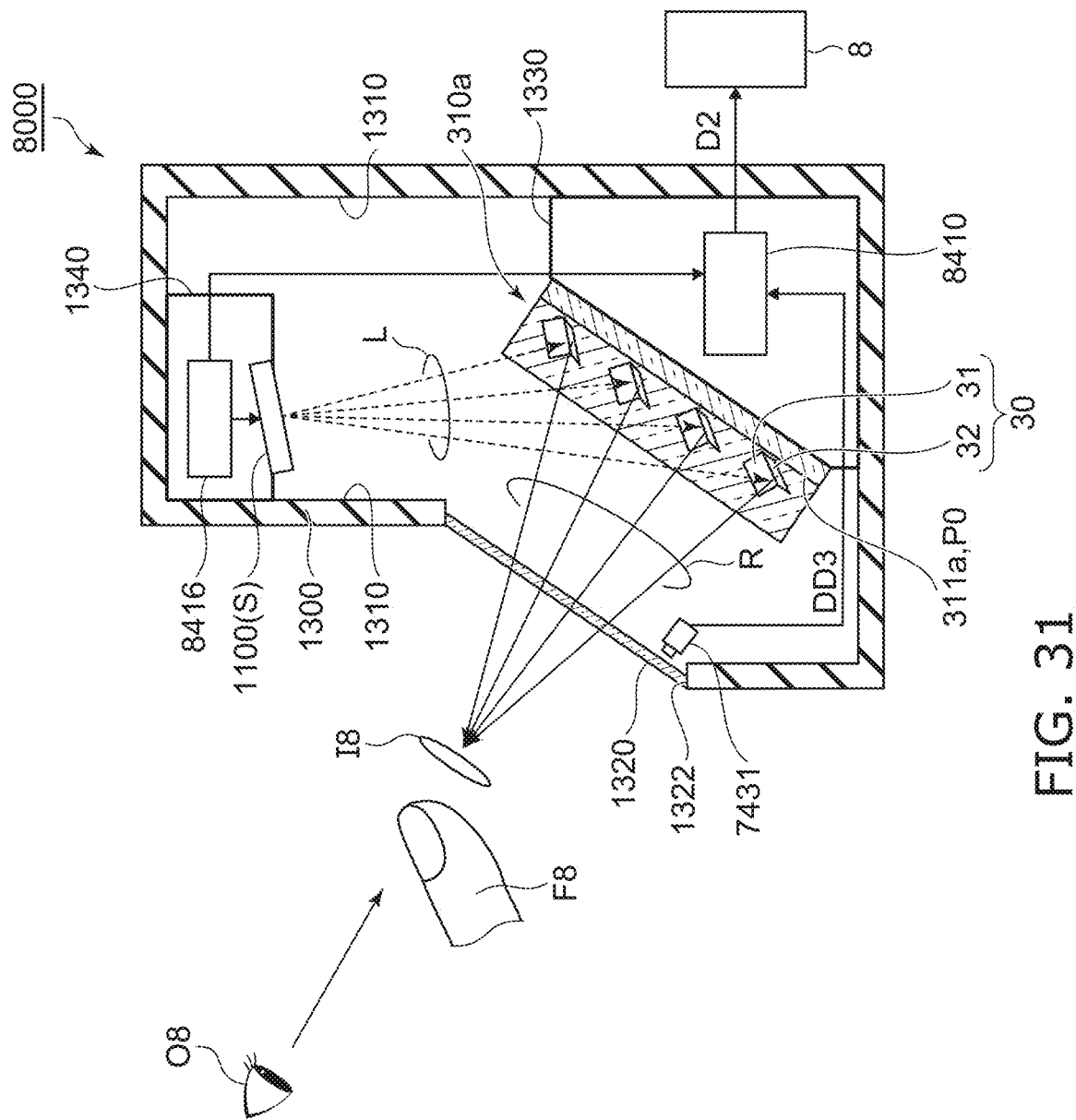
FIG. 31 is a schematic cross-sectional view illustrating an image display device according to an eighth embodiment.

FIG. 31 is a schematic cross-sectional view illustrating an image display device according to an eighth embodiment.

As shown in FIG. 31, the image display device 8000 according to the embodiment includes the display device 1100(S), the imaging element 310a, an imaging part (a first sensor) 7431, a control device 8410, and a display controller 8416. The image display device 8000 differs from the image display device 7000 according to the seventh embodiment in that the control device 8410 and the display controller 8416 are included. Otherwise, the components of the image display device 8000 according to the embodiment are the same as the components of the image display device 7000 according to the seventh embodiment, the same components are marked with the same reference numerals, and a detailed description is omitted as appropriate.

The control device 8410 is connected to the imaging part 7431. Similarly to the example shown in FIG. 30, the imaging part 7431 is arranged to image a fingertip F8 approaching a mid-air image I8. The imaging part 7431 continuously generates image data (third image data) DD3 including information of the image of the fingertip F8 and outputs the image data DD3 to the control device 8410.

A focus check reference image for displaying as the mid-air image I8 is preset in the display controller 8416. The display controller 8416 is connected with the control device 8410, and the control device 8410 can recognize the focus check reference image that is set. The display controller 8416 causes the display device 1100(S) to emit the light L to display an image matching the focus check reference image.

Because the fingertip F8 approaches the mid-air image I8, the image data DD3 that is continuously generated includes information of the mid-air image I8 corresponding to the focus check reference image irradiated on the fingertip F8.

The control device 8410 determines whether or not the mid-air image I8 irradiated on the fingertip F8 is in focus by performing image processing of the image data DD3 that is continuously generated. When the mid-air image I8 is determined to be in focus, the control device 8410 generates the second signal D2 and outputs the second signal D2 to the apparatus 8.

The display controller 8416 operates to switch the display between the mid-air image for an operator O8 to operate with the fingertip F8, and the reference image for the control device 8410 to detect the approach of the fingertip F8. For example, the period of the display of the focus check reference image is set to be sufficiently short compared to the period of the display of the mid-air image for the operation so that the operator O8 does not notice the focus check reference image. The period of imaging by the imaging part 7431 may be set to match the period of the display of the focus check reference image.

Figure 32A:
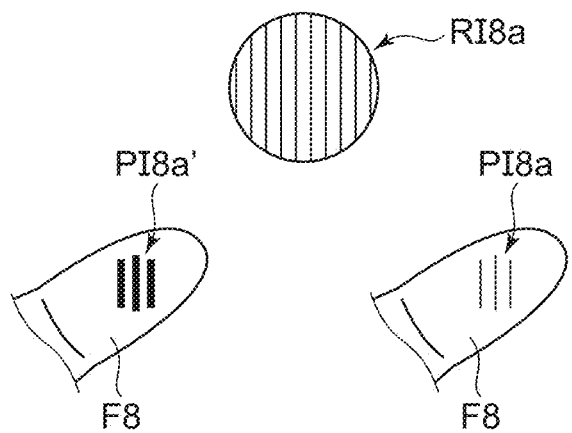
FIG. 32A is a schematic view of a reference image formed in mid-air by the image display device according to the eighth embodiment and irradiated on a fingertip of an operator before and after focusing.
Figure 32B:
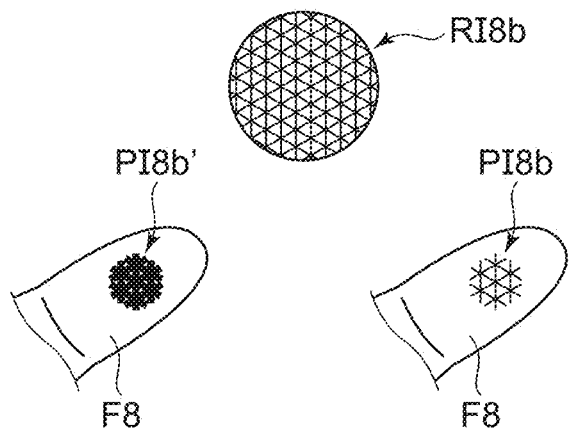
FIG. 32B is a schematic view of a reference image formed in mid-air by the image display device according to the eighth embodiment and irradiated on the fingertip of the operator before and after focusing.
Figure 32C:
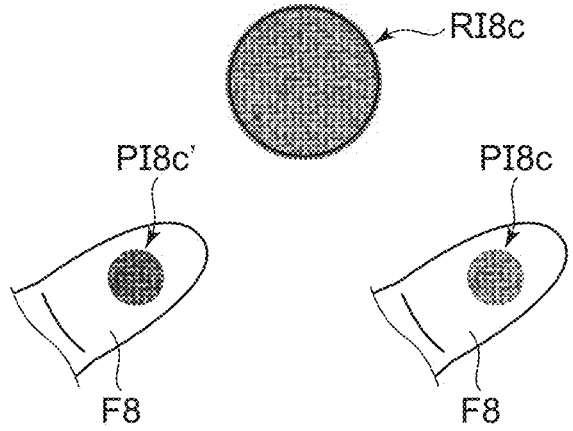
FIG. 32C is a schematic view of a reference image formed in mid-air by the image display device according to the eighth embodiment and irradiated on the fingertip of the operator before and after focusing.

FIGS. 32A to 32C are schematic views before and after reference images, which are formed in mid-air by the image display device according to the eighth embodiment, are irradiated on the fingertip of the operator and focused.

The upper drawings in FIGS. 32A to 32C show examples of reference images RI8a to RI8c set in the display controller 8416. A circular switch is represented. The lower drawings in FIGS. 32A to 32C show examples of patterns of mid-air images that are formed based on the reference images RI8a to RI8c and irradiated on the fingertip F8. The drawings at the lower left in FIGS. 32A to 32C illustrate patterns PI8a to PI8c that are not in focus, and the drawings at the lower right illustrate patterns PI8a to PI8c that are in focus.

The example of FIG. 32A is the reference image RI8a that includes a longitudinal stripe pattern. When the mid-air image displayed based on the reference image RI8a does not form a floating image on the fingertip F8, the stripes are thicker than the stripes of the reference image RI8a as in the pattern PI8a. When the mid-air image is formed on the fingertip F8, the stripes have about the same thicknesses as those of the reference image RI8a as in the pattern PI8a. The control device 8410 determines the presence or absence of the image formation by performing image processing of the image data DD3 including the information of the image irradiated on the fingertip F8 and by comparing with the data of the reference image RI8a.

The example of FIG. 32B is the reference image RI8b that includes a lattice pattern. Similarly to FIG. 32A, the control device 8410 determines the presence or absence of the image formation by performing image processing of the image data including the information of the image formed by the mid-air image irradiated on the fingertip F8, and by comparing with the data of the reference image RI8b.

The example of FIG. 32C is the reference image RI8c that includes a texture pattern. Similarly to FIGS. 32A and 32B, the control device 8410 determines the presence or absence of the image formation by performing image processing of the image data including the information of the image formed by the mid-air image irradiated on the fingertip F8, and by comparing with the data of the reference image RI8c.

The reference image for displaying the mid-air image can have the appropriate color, shape, etc., according to the detection object to be irradiated.

Effects of the image display device 8000 according to the embodiment will now be described.

The image display device 8000 according to the embodiment provides effects similar to those of the seventh image display device 7000. The following effects also are provided. Namely, the image display device 8000 according to the embodiment sets a reference image that includes a display pattern for determining the presence or absence of the image formation, and irradiates the mid-air image displayed based on the reference image on the detection object such as the fingertip F8, etc. It can be determined whether or not the display pattern is formed on the detection object by continuously imaging images of the detection object and the display pattern of the mid-air image irradiated on the detection object and by performing image processing of the image data including such information. The display pattern can be set to have the appropriate pattern, color, and shape according to the detection object to be irradiated; therefore, image data that includes a clear pattern can be generated, and the position of the detection object can be more accurately determined.

Similar effects can be obtained by applying the configuration of the image display device according to the embodiment to the image display device according to the first to sixth embodiments described above. Similar effects can be obtained by applying the configuration of the image display device according to the embodiment to an image display device according to a ninth embodiment described below.

Ninth Embodiment

Figure 33:
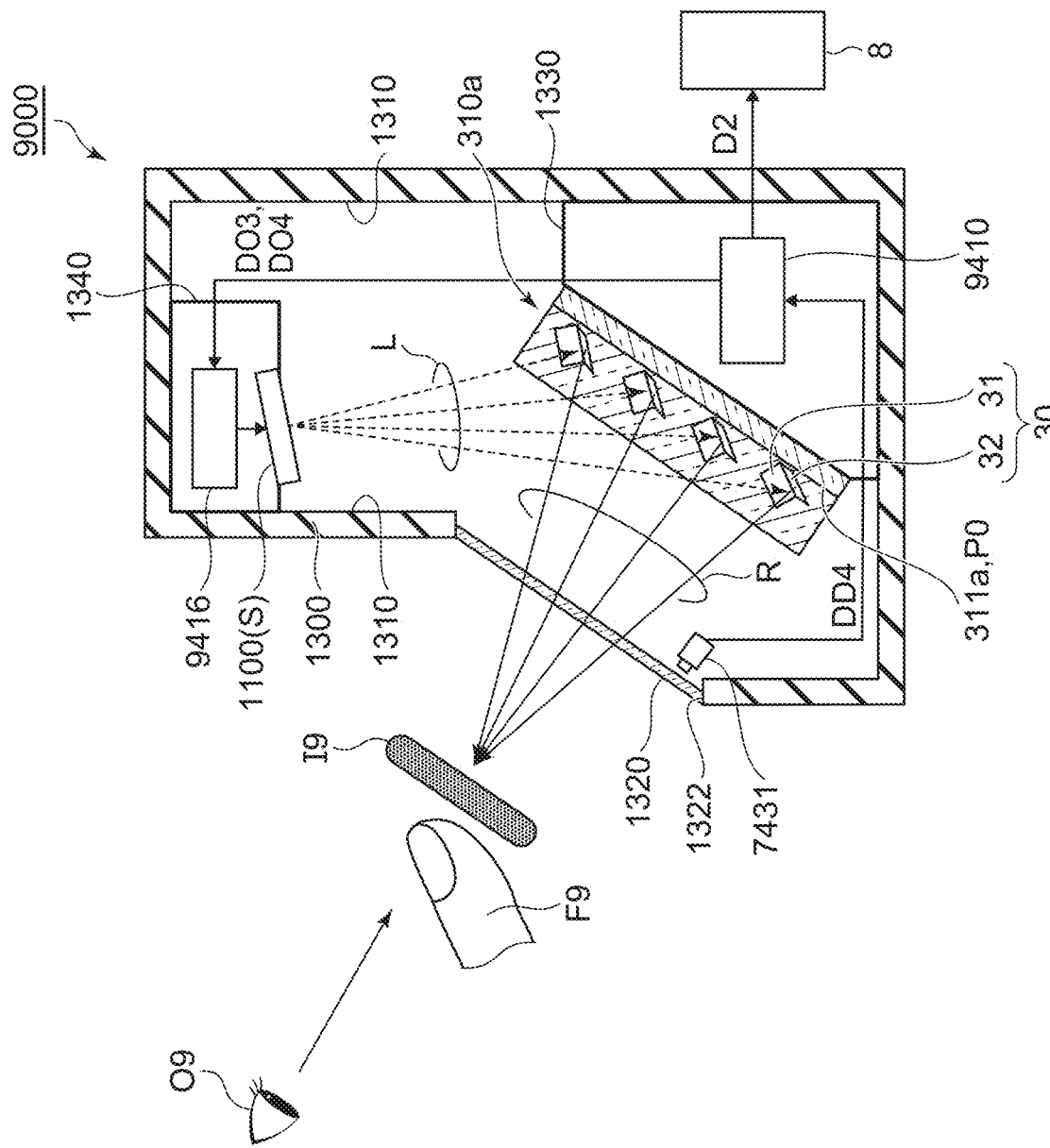
FIG. 33 is a schematic cross-sectional view illustrating an image display device according to a ninth embodiment.

FIG. 33 is a schematic cross-sectional view illustrating an image display device according to a ninth embodiment.

As shown in FIG. 33, the image display device 9000 according to the embodiment includes the display device 1100(S), the imaging element 310a, the infrared sensor 1431, a control device 9410, and a display controller 9416. The image display device 9000 according to the embodiment differs from the image display device 7000 according to the seventh embodiment in that the control device 9410 and the display controller 9416 are included. Otherwise, the components of the image display device 9000 are the same as the components of the image display device 7000, the same components are marked with the same reference numerals, and a detailed description is omitted as appropriate.

The control device 9410 is connected to the imaging part 7431. The control device 9410 is connected to the display controller 9416. The display controller 9416 is connected to the display device 1100(S).

Similarly to the examples of FIGS. 30 and 31, the imaging part 7431 is positioned to image a fingertip F9 of an operator O9 approaching a mid-air image I9. The imaging part 7431 continuously images the fingertip F9 and generates consecutive image data (fourth image data) DD4 including information of the movement of the fingertip F9. The imaging part 7431 outputs the generated image data DD4 to the control device 9410.

Multiple reference images for displaying the mid-air image I9 are preset in the display controller 9416. The display controller 9416 selects one of the multiple reference images based on a command from the control device 9410. The display controller 9416 causes the display device 1100(S) to emit the light L to form an image based on the selected reference image.

When the image data DD4 is not input, the control device 9410 outputs a command DO3 to the display controller 9416 to select the initial reference image. The control device 9410 determines the movement of the fingertip F9 by performing image processing of the image data DD4 that is continuously generated. Based on the determined movement of the fingertip F9, the control device 9410 generates a command DO4 of the selected reference image and outputs the command DO4 to the display controller 9416.

The display controller 9416 selects one of the multiple reference images based on the command of the control device 9410 and causes the display device 1100(S) to emit the light L to form an image based on the selected reference image.

FIGS. 34A to 34D are schematic views for describing operations of the image display device according to the ninth embodiment.

Figure 34A:
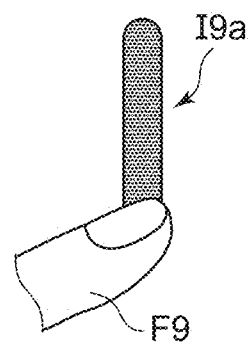
FIG. 34A is a schematic view for describing an operation of the image display device according to the ninth embodiment.
Figure 34B:
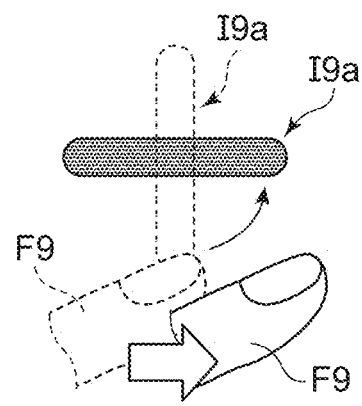
FIG. 34B is a schematic view for describing the operation of the image display device according to the ninth embodiment.
Figure 34C:
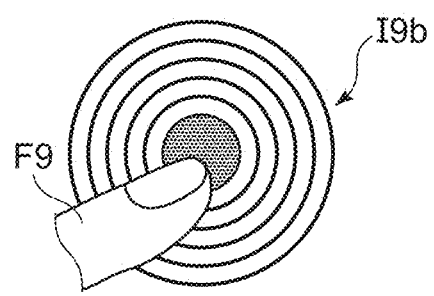
FIG. 34C is a schematic view for describing an operation of the image display device according to the ninth embodiment.
Figure 34D:
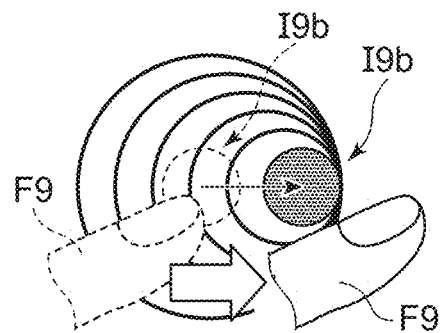
FIG. 34D is a schematic view for describing the operation of the image display device according to the ninth embodiment.

FIGS. 34A to 34D show examples of the mid-air images displayed based on the selected reference images and examples of how the fingertip F9 moves. FIGS. 34A and 34B show when a mid-air image I9a is a straight bar, and FIGS. 34C and 34D show when a mid-air image I9b has a concentric circular configuration.

FIG. 34A shows a state in which the fingertip F9 is stationary. FIG. 34B shows that when the fingertip F9 moves in the direction of the white thick arrow, the mid-air image I9a rotates about 90° counterclockwise around the center of the straight bar as shown by the solid-line arrow.

FIG. 34C shows a state in which the fingertip F9 is stationary. FIG. 34D shows that when the fingertip F9 moves in the direction of the wide thick arrow, the concentric circles of the mid-air image I9b move as shown by the solid-line arrow so that the centers of the inner circles move more in the direction of the solid-line arrow.

The movement of the fingertip F9 is determined by the control device 9410 performing image processing of the consecutive image data DD4 generated by the imaging part 7431. The movement of the mid-air images I9a and I9b is reproduced by selecting one of the multiple reference images based on the command from the control device 9410. An animated movement is possible by modifying the image so that the one of the multiple reference images that is selected changes over time.

Although one type of movement of the fingertip F9 reproduces one type of movement of the mid-air image I9 in the example of FIG. 33, it is also possible to generate multiple different second signals D2 for the movement of multiple mid-air images I9 that correspond to the movement of the fingertip F9. Thus, it is possible to combine different operations of different conversions of the mid-air image I9 according to the movement of the fingertip F9.

Effects of the image display device 9000 according to the embodiment will now be described.

The image display device 9000 according to the embodiment provides effects similar to those of the image display device 1000 according to the first embodiment. The image display device 9000 also provides the following effects. Namely, by detecting the movement of the detection object such as the fingertip F9, etc., the mid-air image I9 can be changed or operated according to the movement of the detection object. The multiple types of operations can be realized according to the movement of the finger by using the mid-air image I9 illustrating a single switch, and when movement of the fingertip F9 occurs, by determining the movement to be a swipe when the fingertip F9 moves in the vertical direction, and by determining the movement to be a flick when the fingertip F9 moves in the lateral direction.

Appropriate combinations of the embodiments described above are applicable.

What is claimed is:

1. An image display device comprising:
   a first display device configured to output a first image representing an operation part for an apparatus;
   an imaging element configured to reflect the first image and to form the first image in mid-air as a mid-air image;
   a first sensor configured to detect an approach of a detection object to the mid-air image and to output a first signal; and
   a controller configured to output a second signal to the apparatus based on the first signal; wherein:
   the imaging element comprises either:
     a base member, and a reflector array provided on the base member, the base member including a first surface, and a second surface positioned at a side opposite to the first surface, or
     a base member comprising a reflector array, the base member including a first surface and a second surface positioned at a side opposite to the first surface;
   the reflector array comprises a plurality of reflector rows, each of the plurality of reflector rows comprising a plurality of dihedral corner reflectors arranged along a first direction;
   each of the plurality of dihedral corner reflectors includes:
     a first reflecting surface configured to reflect light from a first surface side, and
     a second reflecting surface oriented to be orthogonal to the first reflecting surface and configured to reflect a reflected light from the first reflecting surface toward the first surface side;
   in each reflector row of the plurality of reflector rows, an angle between (i) a straight line at which the first reflecting surface and the second reflecting surface meet, and (ii) a plane in which the first direction and a second direction intersecting the first direction extend, is greater than 0° and less than 90°;
   an angle between the first reflecting surface and the plane is greater than 45° and less than 90°;
   the plurality of reflector rows include a first reflector row in which the angle between the straight line and the plane is set to a smallest value among those of the plurality of reflector rows;
   the reflector rows other than the first reflector row are configured such that the angle between the straight line and the plane is set to values that increase away from the first reflector row in the second direction;
   the first display device is located at the first surface side,
   each of the plurality of dihedral corner reflectors is configured to cause a portion of once-reflected light to travel toward the second reflecting surface, the once-reflected light being light that is emitted from the first display device and reflected at the first reflecting surface; and
   the light-transmitting member is configured to transmit twice-reflected light, the twice-reflected light being a portion of the once-reflected light that is reflected at the second reflecting surface.

2. The image display device according to claim 1, further comprising:
   a second sensor configured to acquire environmental information related to an environment around the mid-air image; wherein:
   the first display device is configured to selectively output a plurality of the first images; and
   the controller is configured to output a command to the first display device based on the environmental information acquired by the second sensor so that the first display device selects and outputs one of the plurality of first images.

3. The image display device according to claim 1, further comprising:

a third sensor configured to continuously acquire first image data including position information of an eyebox of an operator observing the mid-air image; and a drive device configured to modify a mounting position and a light emergence angle of at least one of the first display device and the imaging element; wherein:

the controller is configured to perform image analysis of the first image data and to drive the drive device based on a change of the position information.

4. The image display device according to claim 1, wherein:

the first display device is configured to output a video image as the first image; and the controller is configured to output a command to the first display device to output the video image before the first signal.

5. The image display device according to claim 1, wherein:

the first display device is configured to output the first image such that at least one of an icon or a character in the first image is preset.

6. The image display device according to claim 1, wherein:

the first display device is configured to output a plurality of the first images; and the controller is configured to output a command to the first display device to switch from an output of one of the plurality of first images to another one of the plurality of first images based on the first signal.

7. The image display device according to claim 1, wherein:

the first sensor is configured to acquire second image data that includes identification information identifying an operator operating the detection object; and the controller is configured to:
perform image analysis of the second image data,
identify the operator based on the identification information, and
output a command to the display device when the identification information is present in a database, the command permitting the first display device to output the first image, the database being preset.

8. The image display device according to claim 1, wherein:

the first sensor is configured to acquire third image data including information of the mid-air image irradiated on the detection object; and the controller is configured to:
perform image analysis of the third image data,
compare reference image data and the third image data, the reference image data being preset, and
output the second signal to the apparatus when the third image data matches the reference image data.

9. The image display device according to claim 1, wherein:

the first sensor is configured to continuously acquire fourth image data including information of the mid-air image and an operation of an operator operating the detection object;

the first display device is configured to selectively output a plurality of the first images; and the controller is configured to:
continuously perform image analysis of the fourth image data, and
output, based on a change of the fourth image data, a command to the first display device to select and output one of the plurality of first images.

10. The image display device according to claim 1, wherein:

the first sensor is configured to continuously acquire fifth image data including information of the mid-air image and an operation of an operator operating the detection object; and the controller is configured to:
continuously perform image analysis of the fifth image data, and
generate the second signal based on a change of the information of the operation and the mid-air image.

11. An image display device comprising:

a first display device configured to output a first image, the first image representing an operation part for an apparatus;

an imaging element configured to reflect the first image and to form the first image in mid-air as a mid-air image;

a first sensor configured to detect an approach of a detection object and to output a first signal; and a controller configured to output a second signal to the apparatus based on the first signal; wherein:

the imaging element comprises either:
a base member, and a reflector array provided on the base member, the base member including a first surface, and a second surface positioned at a side opposite to the first surface, or
a base member, comprising a reflector array provided in a base member, the base member including a first surface, and a second surface positioned at a side opposite to the first surface;

the reflector array comprises a plurality of reflector rows, each of the plurality of reflector rows including a plurality of dihedral corner reflectors arranged along a first direction;

the plurality of reflector rows are arranged in a second direction to be parallel to each other with a spacing therebetween, the second direction intersecting the first direction;

each of the plurality of dihedral corner reflectors includes:
a first reflecting surface configured to reflect light from a first surface side, and
a second reflecting surface orthogonal to the first reflecting surface and configured to reflect a reflected light reflected from the first reflecting surface toward the first surface side;

in each reflector row of the plurality of reflector rows, an angle between (i) a straight line at which the first reflecting surface and the second reflecting surface meet, and (ii) a plane in which the first direction and the second direction intersect, is greater than 0° and less than 90°;

an angle between the first reflecting surface and the plane is greater than 45° and less than 90°, the plurality of reflector rows include a first reflector row in which the angle between the straight line and the plane is set to a smallest value among those of the plurality of reflector rows;

the reflector rows other than the first reflector row are configured such that the angle between the straight line and the plane is set to values that increase away from the first reflector row in one direction along the second direction;

the first display device is located at the first surface side;

each of the plurality of dihedral corner reflectors is configured such that a portion of a reflected light travels toward the second reflecting surface, and another portion of the reflected light travels toward a second surface side, the reflected light being light that is emitted from the first display device and reflected once at the first reflecting surface, the light-transmitting member is configured to transmit twice-reflected light, the twice-reflected light being a portion of the reflected light, the portion being reflected at the second reflecting surface.

12. The image display device according to claim 11, further comprising:
a second sensor configured to acquire environmental information related to an environment around the mid-air image; wherein:
the first display device is configured to selectively output a plurality of the first images; and
the controller is configured to output a command to the first display device based on the environmental information acquired by the second sensor so that the first display device selects and outputs one of the plurality of first images.

13. The image display device according to claim 11, further comprising:
a third sensor configured to continuously acquire first image data including position information of an eyebox of an operator observing the mid-air image; and
a drive device configured to modify a mounting position and a light emergence angle of at least one of the first display device and the imaging element; wherein:
the controller is configured to perform image analysis of the first image data and to drive the drive device based on a change of the position information.

14. The image display device according to claim 11, wherein
the first display device is configured to output a video image as the first image; and
the controller is configured to output a command to the first display device to output the video image before the first signal.

15. The image display device according to claim 11, wherein
the first display device is configured to output the first image such that at least one of an icon or a character in the first image is preset.

16. The image display device according to claim 11, wherein
the first display device is configured to output a plurality of the first images; and
the controller is configured to output a command to the first display device to switch from an output of one of the plurality of first images to an other one of the plurality of first images based on the first signal.

17. The image display device according to claim 11, wherein:
the first sensor is configured to acquire second image data that includes identification information identifying an operator operating the detection object; and
the controller is configured to:
perform image analysis of the second image data,
identify the operator based on the identification information, and
output a command to the display device when the identification information is present in a database, the command permitting the first display device to output the first image, the database being preset.

18. The image display device according to claim 11, wherein:
the first sensor is configured to acquire third image data including information of the mid-air image irradiated on the detection object; and
the controller is configured to:
perform image analysis of the third image data,
compare reference image data and the third image data, the reference image data being preset, and
output the second signal to the apparatus when the third image data matches the reference image data.

19. The image display device according to claim 11, wherein:
The first sensor is configured to continuously acquire fourth image data including information of the mid-air image and an operation of an operator operating the detection object;
the first display device is configured to selectively output a plurality of the first images; and
the controller is configured to:
continuously perform image analysis of the fourth image data, and
output, based on a change of the fourth image data, a command to the first display device to select and output one of the plurality of first images.

20. The image display device according to claim 11, wherein:
the first sensor is configured to continuously acquire fifth image data including information of the mid-air image and an operation of an operator operating the detection object; and
the controller is configured to:
continuously perform image analysis of the fifth image data, and
generate the second signal based on a change of the information of the operation and the mid-air image.

* * * * *